(12) United States Patent
Shimokawa et al.

(10) Patent No.: US 10,380,676 B2
(45) Date of Patent: Aug. 13, 2019

(54) INFORMATION PROCESSING SYSTEM, INFORMATION PROCESSING DEVICE, INFORMATION PROCESSING METHOD AND PROGRAM

(71) Applicant: Rakuten, Inc., Tokyo (JP)

(72) Inventors: Tsukasa Shimokawa, Tokyo (JP); Motoya Tanaka, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 0 days.

(21) Appl. No.: 15/514,554

(22) PCT Filed: Oct. 9, 2015

(86) PCT No.: PCT/JP2015/078828
§ 371 (c)(1),
(2) Date: Mar. 27, 2017

(87) PCT Pub. No.: WO2017/061054
PCT Pub. Date: Apr. 13, 2017

(65) Prior Publication Data
US 2018/0204274 A1    Jul. 19, 2018

(51) Int. Cl.
*G06Q 30/06* (2012.01)
*G06F 16/957* (2019.01)
*G06Q 10/08* (2012.01)

(52) U.S. Cl.
CPC ..... *G06Q 30/0643* (2013.01); *G06F 16/9577* (2019.01); *G06Q 10/083* (2013.01); *G06Q 30/06* (2013.01); *G06Q 30/0621* (2013.01)

(58) Field of Classification Search
CPC .................................................. G06Q 30/06
USPC ........................................................... 705/27
See application file for complete search history.

(56) References Cited

FOREIGN PATENT DOCUMENTS

| JP | 2005-338960 | * | 12/2005 | ............. G06F 17/60 |
| JP | 2005-338960 A | | 12/2005 | |
| WO | 2015/155885 A1 | | 10/2015 | |
| WO | WO-2015155855 A1 | * | 10/2015 | ............. F24F 13/14 |

OTHER PUBLICATIONS

U.S. Appl. No. 15/514,687, Tsukasa Shimokawa, filed Mar. 27, 2017.

* cited by examiner

*Primary Examiner* — Russell S Glass
(74) *Attorney, Agent, or Firm* — Sughrue Mion, PLLC

(57) ABSTRACT

An information processing system includes a server device and a terminal device, the system configured to: present an object corresponding to each of a plurality of product categories on the terminal device; set a placement region for placing the object therein on a display unit of the terminal device; accept a setting operation for the object placed in the placement region and make a change in a placement mode of the object; acquire delivery destination area information; acquire order people number information; specify an order quantity for each product category in response to a ratio of the object occupying the placement region and the order people number information; and then acquire a product in accordance with the specified order quantity and the delivery area information from a database and cause the terminal device to present the product.

12 Claims, 33 Drawing Sheets

INFORMATION PROCESSING SYSTEM, INFORMATION PROCESSING DEVICE, INFORMATION PROCESSING METHOD AND PROGRAM

CROSS REFERENCE TO RELATED APPLICATIONS

This application is a National Stage of International Application No. PCT/JP2015/078828, filed Oct. 9, 2015, the contents of which are incorporated herein by reference in its entirety.

TECHNICAL FIELD

The present invention relates to an information processing system, an information processing device, an information processing method and a program, and particularly to a technology for setting an order quantity when a product (especially food) capable of being delivered from various shops is ordered.

CITATION LIST

Patent Literature

Patent Document 1: JP2005-338960 A

BACKGROUND ART

In accordance with development of a communication network such as the Internet, shopping via the communication network has become popular. Together with this, the technique for delivery of a dish is changing from a technique of directly ordering over the phone to a technique of inputting various kinds of information on a webpage to perform an order through a communication network.

Further, through a unified user interface, a highly convenient delivery service which absorbs an order system differing among different stores is being provided.

In such a delivery service as described above, dish images are often presented to users. Patent Document 1 discloses a technology wherein an operation for changing the size of a dish image is permitted to a user, an order quality is changed on the basis of the size of the dish image changed in response to the operation, and a nutrition calculation included in a dish (menu) to be ordered is performed.

SUMMARY OF INVENTION

Technical Problem

However, in the case where a product to be ordered is not decided particularly although a category of the product to be order is decided, the nutrition calculation cannot be performed and an order quantity cannot be presented either. In the technology disclosed in Patent Document 1, "a quantity of each of nutrients configuring a dish included in an image specified as a dish image is displayed, and the quantity of the pertaining nutrients is changed in response to a change in magnitude of the image," and a nutrition calculation or an order quantity is not displayed as long as a dish is not decided particularly.

Therefore, it is an object of the present invention to provide, taking such a situation as described above into consideration, an environment in which, even when contents of an order are not decided particularly, a required order quantity can be grasped.

Solution to Problem

The information processing system according to the present invention is an information processing system which includes a server device and a terminal device, including an object presentation unit configured to present an object corresponding to each of a plurality of product categories on the terminal device, a placement region setting unit configured to set a placement region for placing the object therein on a display unit of the terminal device, an object placement mode changing unit configured to accept a setting operation for the object placed in the placement region and make a change in a placement mode of the object, a delivery destination area information acquisition unit configured to acquire delivery destination area information, an order people number information acquisition unit configured to acquire order people number information, an order quantity specification unit configured to specify an order quantity for each product category in response to a ratio of the object occupying the placement region and the order people number information, and a presentation unit configured to acquire a product in accordance with the specified order quantity and the delivery area information from a database and cause the terminal device to present the product.

Consequently, an order quantity for each product category is presented to the user at a stage before a product to order is decided, in particular when only a product category is decided (for example, assume a state where just "pizza" is decided to be ordered, but what pizza to order has not been decided).

Preferably, the information processing system described above is configured such that, in the presentation of the objects, only the object corresponding to the delivery destination area information is presented in a state where the object is capable of being a target of the setting operation.

Consequently, an object relating to a product which cannot be delivered in the delivery destination area is not presented in a state where a setting operation can be performed for the object.

Preferably, the object presentation unit of the information processing system described above identifiably presents a combination of the objects relating to a shop which is capable of delivering the objects collectively.

Consequently, the presentation allows the user to identify a combination of shops from which can be delivered at a time.

Preferably, the object placement mode changing unit of the information processing system described above performs changing of the object on the basis of an order quantity estimated using an order history of an ordering user.

In particular, a change (for example, deformation in shape) of each object placed in the placement region is automatically performed in response to the order history of the user.

Preferably, the object placement mode changing unit of the information processing system described above performs the changing of the object on the basis of an order quantity estimated using, from among one or more order histories, the order history in which at least part of a placement sequence of the objects is same.

An order quantity of each product category relating to an object sometimes varies depending on the placement sequence of the object. For example, an object selected first is frequently a product the user wants to eat most.

In such a case as just described, the order quantity of each product category is estimated from an order history in which the placement sequence is same as that of the object to be ordered at present.

Preferably, the object placement mode changing unit of the information processing system described above estimates, when the object is placed into the placement region, another object to be added to the placement region in response to the estimated order quantity and places the other object into the placement region.

Before the user performs an operation for placing another object, the object is placed into the placement region.

Preferably, the object placement mode changing unit of the information processing system described above changes, when a setting operation for changing the placement mode of one of the plurality of objects placed in the placement region is accepted, the placement mode of the remaining objects in response to the estimated order quantity.

Consequently, in response to a changing operation performed for one object by the user, the other objects are also changed automatically.

Preferably, the object placement mode changing unit of the information processing system described above accepts, as a setting operation for setting both of an upper limit value and a lower limit value to a ratio of the objects occupying the placement region, an operation for placing the same objects on one another in an overlapping relationship with each other in the placement region.

Even when a fixed order quantity is not decided for each product category, the user can decide the placement mode for each object in accordance with an approximate order quantity. At this time, the operation to be performed by the user is an operation for placing the same objects with different sizes on one another in an overlapping relationship with each other.

Preferably, the object placement mode changing unit of the information processing system described above acquires range information of a ratio of the object occupying the placement region from sizes of two kinds of the object set by two contact points detected on a display screen of the terminal device and a third contact detected additionally.

Even when a fixed order quantity is not decided for each product category, the user can decide a placement mode for each object in accordance with an approximate order quantity. At this time, the operation to be performed by the user is, for example, an operation for having three fingers to touch at tips thereof with the screen to perform range designation. That is, the operation is simple and operable with one hand.

Preferably, the order quantity specification unit of the information processing system described above calculates correction order people number information by correction of the order people number information using an order history of the ordering user and specifies the order quantity using the correction order people number information.

Consequently, the order quantity is automatically corrected in accordance with the order history of the user. In other words, an order quantity is set, with the taste of the user taken into consideration.

The information processing device according to the present invention includes a webpage data generation unit configured to generate webpage data including a program for causing a terminal device to execute an object presentation process for presenting an object corresponding to each of a plurality of product categories, a placement region setting process for setting a placement region for placing the object therein on a display unit of a terminal device, an object placement mode changing process for accepting a setting operation for the object placed in the placement region and make a change in a placement mode of the object in response to information of the setting operation, a delivery destination area information acquisition process for acquiring delivery destination area information, an order people number information acquisition process for acquiring order people number information, an order quantity specification process for specifying an order quantity for each product category in response to a ratio of the object occupying the placement region and the order people number information, and a presentation process for causing a product in accordance with the specified order quantity and the delivery area information to be presented, and a webpage data transmission unit configured to transmit the webpage data to the terminal device.

With the information processing device, an environment is provided in which, even when a product to be ordered is not decided particularly although a category of the product to be ordered is decided, a required order quantity can be grasped.

The information processing method according to the present invention causes an information processing system to execute a delivery destination area information acquisition step of acquiring delivery destination area information, an order people number information acquisition step of acquiring order people number information, an object presentation step of presenting an object corresponding to respective product categories of a plurality of product categories on a terminal device, a placement region setting step of setting a placement region for placing the object therein on a display unit of the terminal device, an object placement mode changing step of accepting a setting operation for the object placed in the placement region and making a change to a placement mode of the object, an order quantity specification step of specifying an order quantity for each product category in response to a ratio of the object occupying the placement region and the order people number information, and a presentation step of acquiring a product in accordance with the specified order quantity and the delivery area information from a database and causing the terminal device to present the product.

By this information processing method, a process for providing an environment in which, even when a product to be ordered is not decided particularly although a category of the product to be ordered is decided, a required order quantity can be grasped is executed.

The program according to the present invention is a program for causing an arithmetic processing device to execute a process to be executed as the information processing method described above.

Advantageous Effects of Invention

With the present invention, an environment can be provided in which, even when a product to be ordered is not decided particularly although a category of the product to be ordered is decided, a required order quantity can be grasped.

DESCRIPTION OF EMBODIMENTS

In description of embodiments, description is given taking a delivery system 1, which provides a delivery service for delivering a dish as an example of a product, as an example.

In the following, the embodiments are described in the following order.
<1. General Configuration>
<2. Hardware Configuration>
<3. DB>
[3-1. User DB]
[3-2. Shop DB]
[3-3. Menu DB]
[3-4. Webpage DB]
<4. Flow of Processing>
[4-1. Flow of First Embodiment]
[4-2. Process Example 1 Relating to Setting Operation]
[4-3. Process Example 2 Relating to Setting Operation]
[4-4. Flow of Second Embodiment]
[4-5. Process Example 3 Relating to Setting Operation]
[4-6. Process Example 4 Relating to Setting Operation]
[4-7. Process Example 5 Relating to Setting Operation]
[4-8. Process Example 6 Relating to Setting Operation]
[4-9. Process Example 7 Relating to Setting Operation]
<5. Modifications to First and Second Embodiments>
[5-1. Modification 1]
[5-2. Modification 2]
[5-3. Modification 3]
[5-4. Modification 4]
[5-5. Modification 5]
<6. Summary of First and Second Embodiments>
<7. Different Example of Flow of Processing>
[7-1. Flow of Third Embodiment]
[7-2. Example of Satisfaction Condition Acquisition Process]
[7-3. First Example of Allocation Quantity Setting Process]
[7-4. Second Example of Allocation Quantity Setting Process]
[7-5. Flow of Fourth Embodiment]
[7-6. Different Example of Allocation Quantity Modification Process]
<8. Summary of Third and Fourth Embodiments>
<9. Program>

1. General Configuration

A general configuration of a network system including a delivery system 1 as an embodiment is described with reference to FIG. 1 and FIG. 2.

Figure 1:
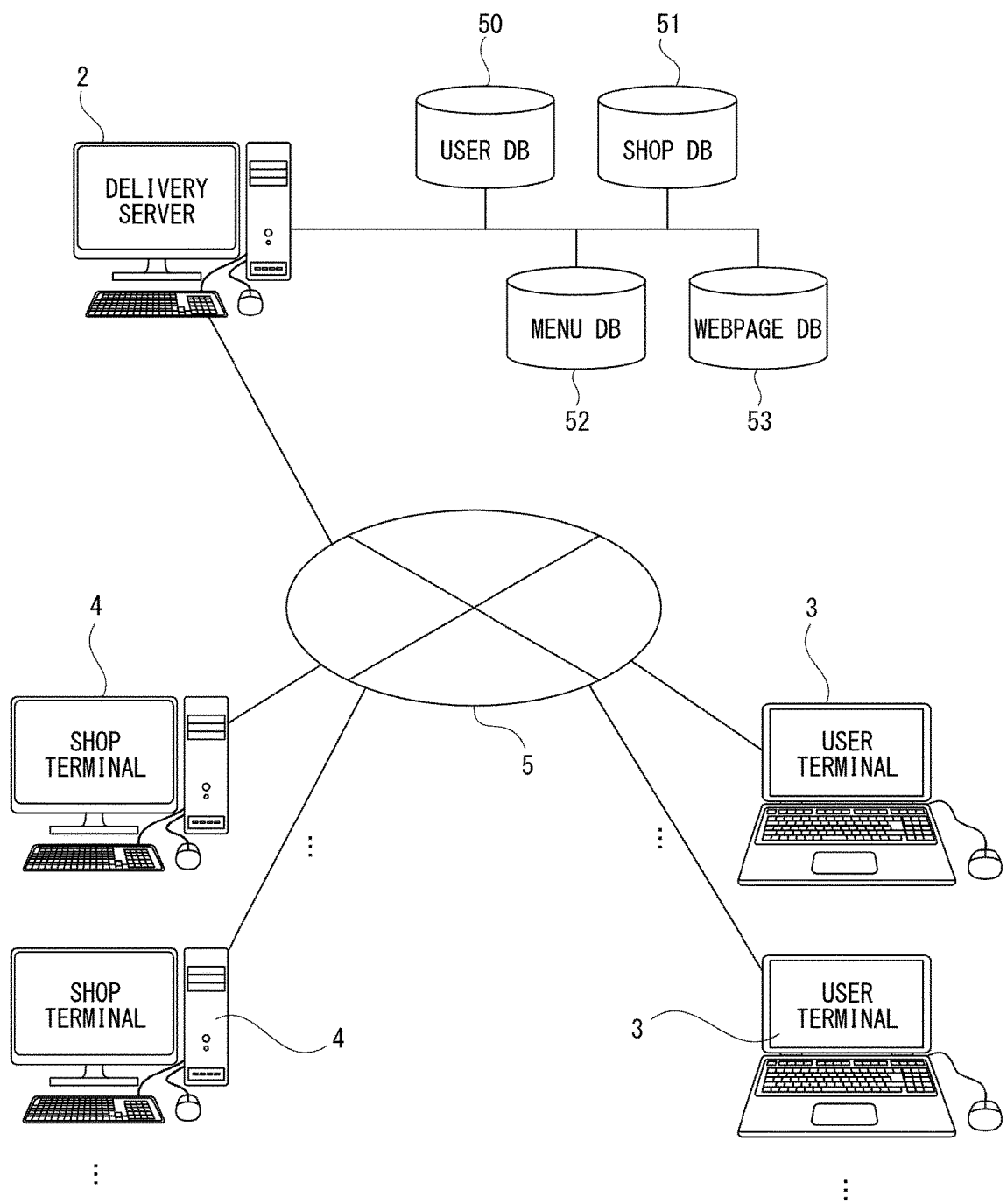
FIG. 1 is a view depicting a general configuration of an embodiment of the present invention.
Figure 2:
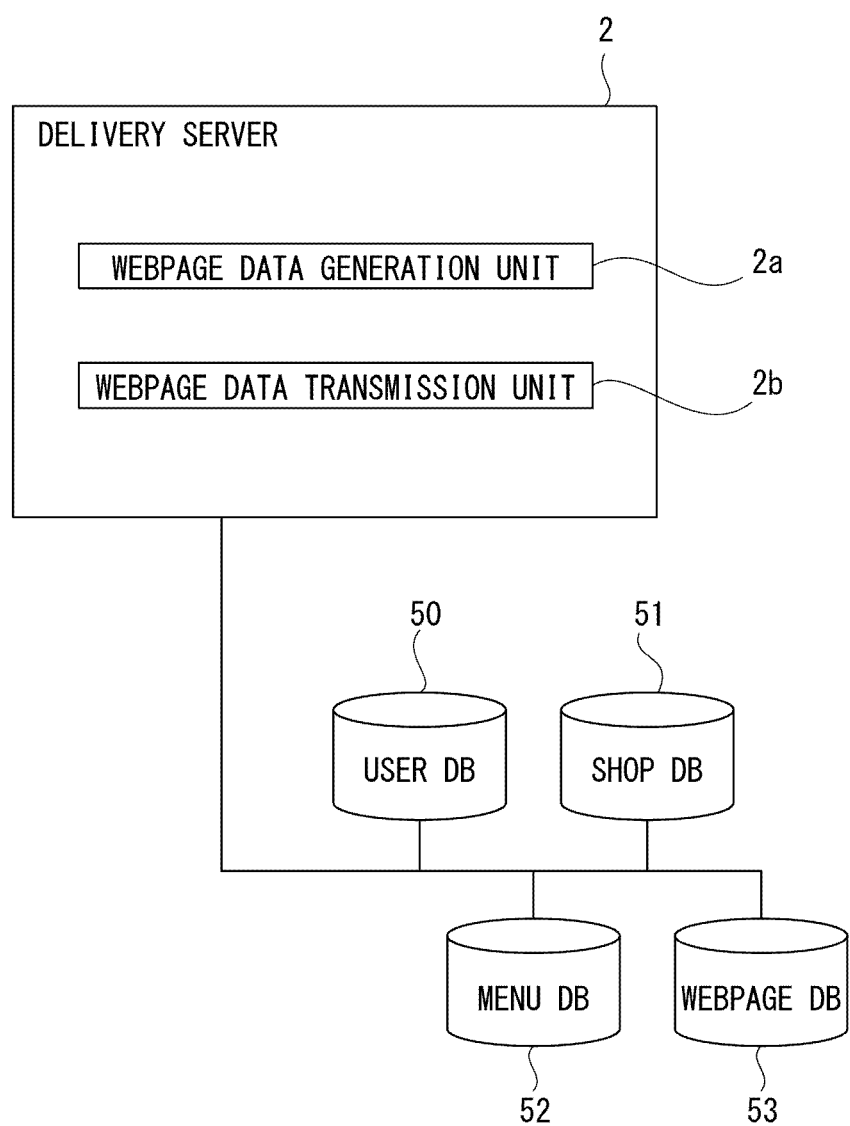
FIG. 2 is a block diagram of a delivery server in the present embodiment.

As depicted in FIG. 1, the delivery system 1 of the present embodiment is configured from a delivery server 2, user terminals 3, 3, 3, . . . and shop terminals 4, 4, 4, . . . .

The delivery server 2, user terminals 3, 3, 3, . . . and shop terminals 4, 4, 4, . . . are connected to each other in a mutually communicable condition through a communication network 5.

The delivery system 1 is a system which provides a delivery service of delivering a dish whose order is received by a shop to a place designated by a user. The delivery service is provided to a user through various kinds of communication with a user terminal 3 or a shop terminal 4 by the delivery server 2 provided in the delivery system 1.

The delivery server 2 provides various functions for delivering a dish whose order is accepted by a shop to a user.

In particular, the delivery server 2 provides an order mediation site, through which dishes provided by various shops can be ordered, to a user whose utilizes a user terminal 3. Accordingly, the delivery server 2 has a function for transmitting webpage data for causing a webpage to be displayed for browsing on a user terminal 3.

Webpage data is a structured document file, for example, of HTML (Hyper Text Markup Language) or XHTML (Extensible Hyper Text Markup Language). Text data of description of products, image data of product images, and placement or display modes (character color, font, size, decoration and so forth) of them are described in a structured document file.

The delivery server 2 provides product information through an order mediation cite. The product information is information, for example, of dishes as a target of delivery (menu information) including a dish image, information of foodstuff used for cooking, price information, nutrition information, quantity information and so forth.

Further, the delivery server 2 provides delivery time information for each shop, which is received from the shop terminal 4 to a user.

Further, the delivery server 2 has a function for accepting an order request including order information from a user and issuing an order for a dish to each shop. From the delivery server 2 to each shop, information of the ordering user (ordering person information), information of ordered dishes (ordered menu information) and an order quantity are notified as information included in the order information.

Furthermore, the delivery server 2 has a settlement processing function for mediating exchange of charges when an order is satisfied, a notification function to a user and so forth.

In order to provide the various functions, the delivery server 2 manages a user DB (Database) 50 in which attribute information of users is stored, a shop DB 51 in which information of shops from which dishes are provided is stored, a menu DB 52 in which information of dishes is stored and a webpage DB 53 in which various webpage data of order mediation sites and so forth is stored.

It is to be noted that the menu DB 52 corresponds to a form of a product database.

Each user terminal 3 is a terminal used by a user who orders a dish utilizing the various functions provided by the delivery server 2.

Each shop terminal 4 is a terminal utilized by a person (hereinafter referred to as seller) involved in a shop by which sales and deliveries of a dish are performed, utilizing the various functions provided by the delivery server 2.

Each of the user terminals 3 and the shop terminals 4 executes various transmission and reception processes and display processes as occasion demands. Further, each of the user terminals 3 and the shop terminals 4 is, for example, a PC (Personal Computer) including a communication function, a feature phone, a PDA (Personal Digital Assistant) or a smart device such as a smartphone or a tablet terminal.

The delivery system 1 is configured from the delivery server 2, user terminals 3, 3, 3, . . . and shop terminals 4, 4, 4, . . . described above such that it provides the various functions relating to delivery services to users or sellers.

The configuration of the communication network 5 is not limited particularly and may be, for example, the Internet, an intranet, an extranet, a LAN (Local Area Network), a CATV (Community Antenna TeleVision) communication network, a virtual dedicated network (Virtual Private Network), a telephone network, a mobile communication network, a satellite communication network or the like.

As regards a transmission media which configures the entirety or part of the communication network 5, various transmission media are available. For example, not only wire transmission media such as IEEE (Institute of Electrical and Electronics Engineers) 1394, USB (Universal Serial Bus), power-line carrier or a telephone line but also wireless transmission media such as infrared rays like IrDA (Infrared Data Association), Bluetooth (registered trademark), 802.11 wireless, a portable telephone network, a satellite circuit or a terrestrial digital network are applicable.

Characteristic components of the delivery server 2 in the present embodiment are described with reference to FIG. 2.

The delivery server 2 includes a webpage data generation unit 2a and a webpage data transmission unit 2b.

The webpage data generation unit 2a executes a webpage data generation process for causing a web browser, which operates on a user terminal 3, to generate webpage data for displaying a predetermined webpage such as an order mediation site or the like.

Webpage data relating to an order mediation site generated by the webpage data generation unit 2a include a program for causing the user terminal 3 to execute several processes.

The several processes include an object presentation process for presenting an object corresponding to each of a plurality of cooking categories on the order mediation site, a placement region setting process for setting a particular region (placement region) on the order mediation site in which an object is placed, and a delivery destination area information acquisition process for acquiring delivery destination area information. The processes further include an order people number information acquisition process for acquiring order people number information and an object placement mode changing process for accepting a setting operation for an object placed in the placement region by a user and making a change in the placement mode of the object in response to the setting operation information. The processes still further include an order quantity specification process for specifying an order quantity for each cooking category in response to a ratio of an object occupying the placement region and the order people number information and a presentation process for presenting a menu in response to the specified order quantity and the delivery area information. Details of the processes are hereinafter described.

The webpage data transmission unit 2b executes a process for transmitting the webpage data described above to a user terminal 3.

The delivery system 1, which includes the delivery server 2 and a user terminal 3, includes an object presentation unit 1a for presenting an object corresponding to each of a plurality of cooking categories on the user terminal 3, a placement region setting unit 1b for setting a placement region, in which an object is to be placed, on a display unit (for example, a display) of the user terminal 3, and an object placement mode changing unit 1c for accepting a setting operation for the object placed in the placement region and making a change to a placement mode of the object. The delivery system 1 further includes a delivery destination area information acquisition unit 1d for acquiring delivery distribution area information and an order people number information acquisition unit 1e for acquiring order people number information. The delivery system 1 still further includes an order quantity specification unit 1f for specifying an order quantity for each category in response to a ratio of the object occupying the placement region and the order people number information and a presentation unit 1g for acquiring a product in response to the specified order quantity and the delivery area information from a database and presenting the product on the device.

The object presentation unit 1a executes a process for presenting an object corresponding to a cooking category (product category) on the user terminal 3. The object corresponding to a cooking category is, for example, an object corresponding to a cooking category such as "pizza," "potato," or "salad" and is an icon or the like to which a representative dish image of an individual cooking category is attached.

Figure 3:
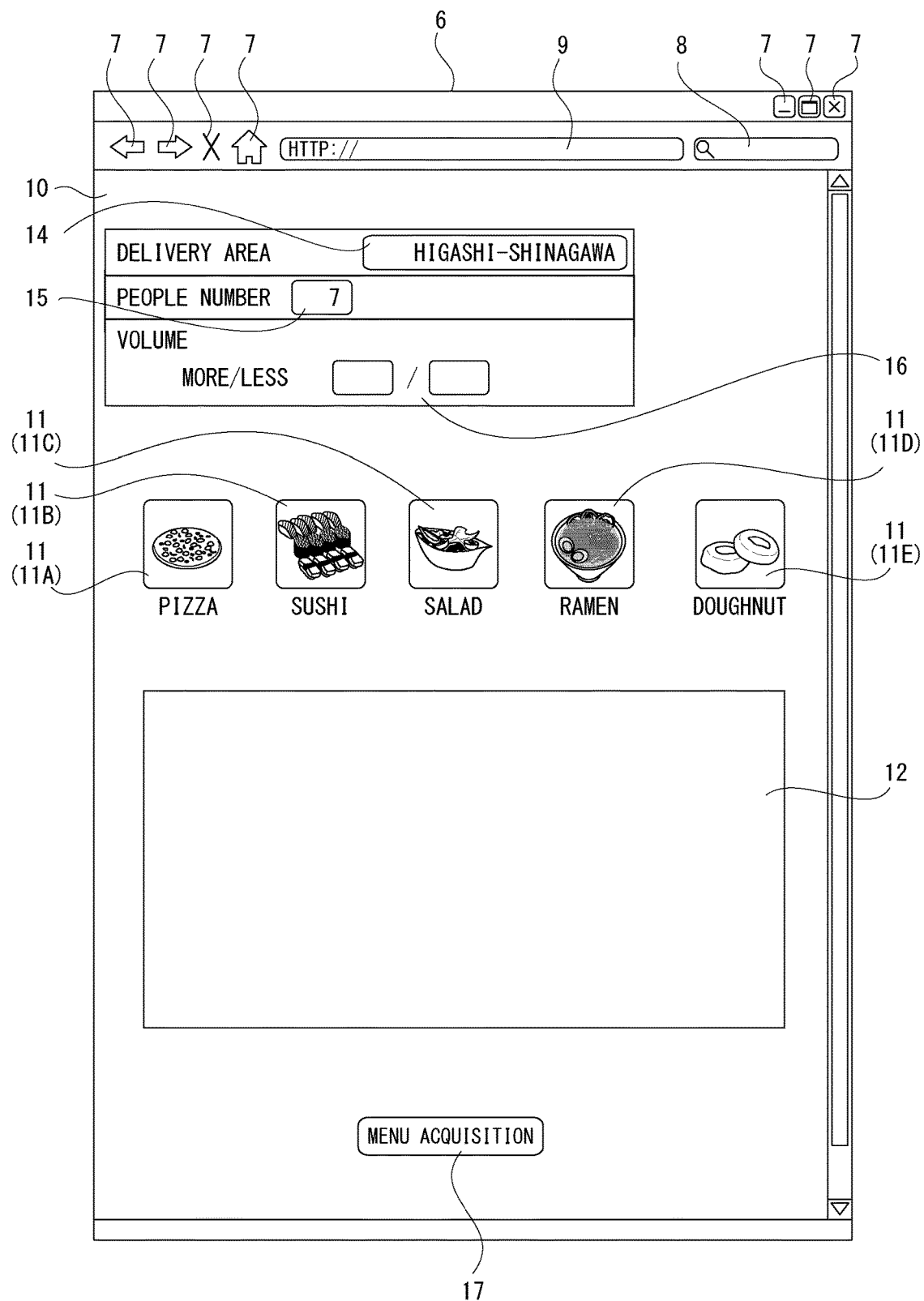
FIG. 3 is a view depicting an example of a search page.

Detailed description is given with reference to FIG. 3.

FIG. 3 illustrates a state in which a search page when ordering is performed on an order mediation site is displayed on a screen of a user terminal 3.

In the proximity of an upper end portion of a web browser 6 installed in the user terminal 3, various operation elements 7, 7, 7, . . . for making a change of a webpage or making a change of a display mode are provided. Further, a search form 8 for searching for a webpage and an address display portion 9 in which a URL (Uniform Resource Locator) of the displayed webpage is to be displayed are placed.

Below them, a webpage display portion 10 in which a webpage is to be displayed is placed.

FIG. 3 represents a state in which a search page is displayed in the webpage display portion 10.

In the webpage display portion 10, objects 11, 11, 11, . . . corresponding to cooking categories are displayed. In FIG. 3, as examples of an object 11, five objects 11, 11, 11, . . . of "pizza," "sushi," "salad," "ramen" and "doughnut" are displayed.

It is to be noted that, in the following description, the object 11 relating to the cooking category of "pizza" is referred to as object 11A; the object 11 relating to the cooking category of "sushi" is referred to as object 11B; the object 11 relating to the cooking category of "salad" is referred to as object 11C; the object 11 relating to the cooking category of "ramen" is referred to as object 11D; and the object 11 relating to the cooking category of "doughnut" is referred to as object 11E.

The placement region setting unit 1b executes a process for setting a placement region, in which a user can place the icon or the like freely, on the user terminal 3.

Describing particularly with reference to FIG. 3, a placement region 12 is provided below the objects 11. In the placement region 12, an object 11 for which a drag operation is performed can be placed freely.

The object placement mode changing unit 1c executes a process for accepting a setting operation of a user for an object placed in the placement region and performing deformation or the like of the object. Here, the placement mode includes a shape, a size, a position, a color and so forth of the object (where the object includes a character, including a font, a size of the character, a character color and so forth). Thus, a change of the placement mode refers to a change of these modes and includes, for example, a change of the shape, a change of the size (enlargement or reduction), a change of the position, a change of the color or the like.

Here, a specific example of a change of the placement mode is described.

Figure 4:
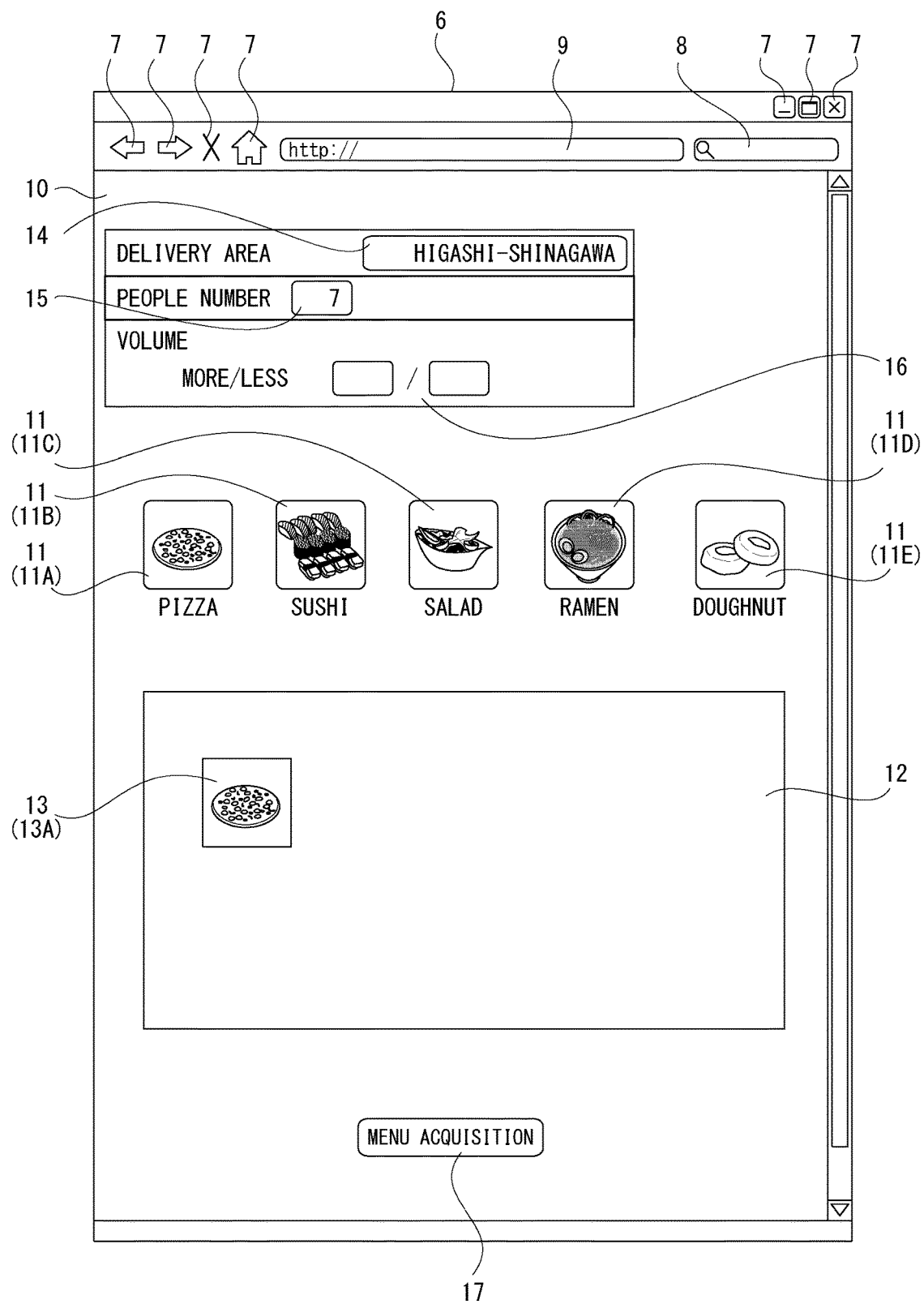
FIG. 4 is a view illustrating a state in which an icon is placed in a placement region.

A state in which the object 11A "pizza" is dragged to the placement region 12 of FIG. 3 is depicted in FIG. 4.

It is to be noted that, in the following description, a dragged object 11 is referred to as placement icon 13. Further, the placement icon 13 relating to the cooking category of "pizza" is referred to as placement icon 13A; the placement icon 13 relating to the cooking category of "sushi" is referred to as placement icon 13B; the placement icon 13 relating to the cooking category of "salad" is referred to as placement icon 13C; the placement icon 13 relating to the cooking category of "ramen" is referred to as placement icon 13D; and the placement icon 13 relating to the cooking category of "doughnut" is referred to as placement icon 13E.

Figure 5:
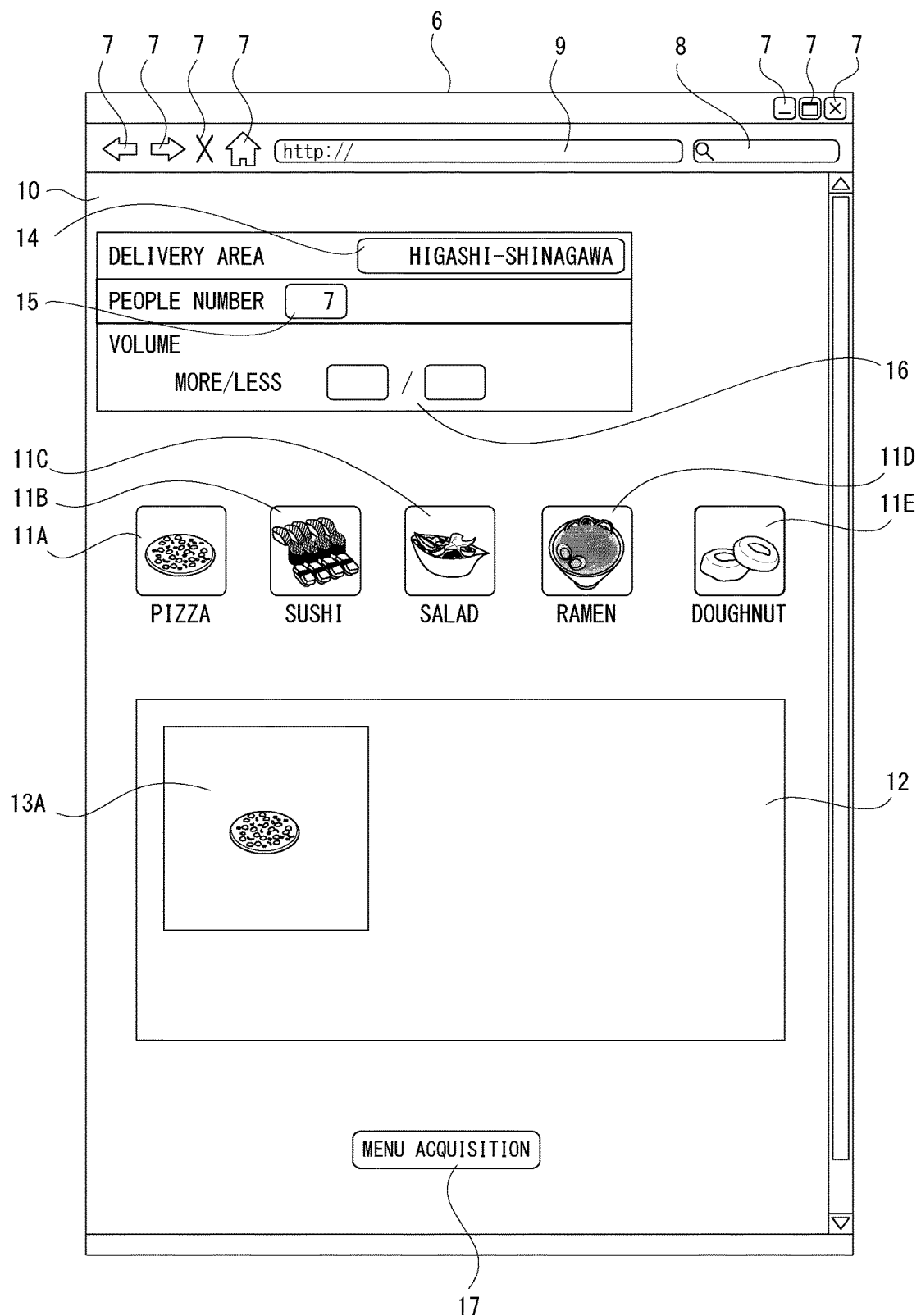
FIG. 5 is a view illustrating a state in which the icon placed in the placement region is enlarged.

If the user performs an enlargement operation for a placement icon 13 (for example, an operation for dragging a corner of the placement icon 13A in order to enlarge the icon), then the object placement mode changing unit 1c executes a process for changing the size of the displayed placement icon 13 as depicted in FIG. 5.

The delivery destination area information acquisition unit 1d executes a process for acquiring delivery destination area information inputted to a delivery area input field 14 of FIG. 3. It is to be noted that the delivery destination area information acquisition unit 1d may not acquire information inputted directly to the delivery area input field 14 but acquire delivery destination area information from an area designated by the user on a map and displaying the information in the delivery area input field 14. In this case, the delivery area input field 14 functions not as an inputting field but as a displaying field.

The order people number information acquisition unit 1e executes a process for acquiring an order people number inputted to a people number input field 15 of FIG. 3. Further, the order people number information acquisition unit 1e executes a process for correcting the order people number information from information inputted to a volume information input field 16.

For example, in the volume information input field 16 of FIG. 3, a people number input field for "more" for inputting a number of people who would eat more in volume, and a people number input field for "less" for inputting a number of people who would eat less in volume, are provided. In a case where it is set that the people number for "more" is three and the people number for "less" is 1 while the number of people whose volume information is not designated (number of people who are considered to designate an ordinary volume) is three and therefore the total order people number is 7, for example, the people number for "more" is converted into 1.5 times the number of people and the people number for "less" is converted into 0.8 times the number of people. In this case, the order people number information acquisition unit 1e corrects the order people number from 7 as inputted to 8.3 (3+3×1.5+0.8).

Figure 6:
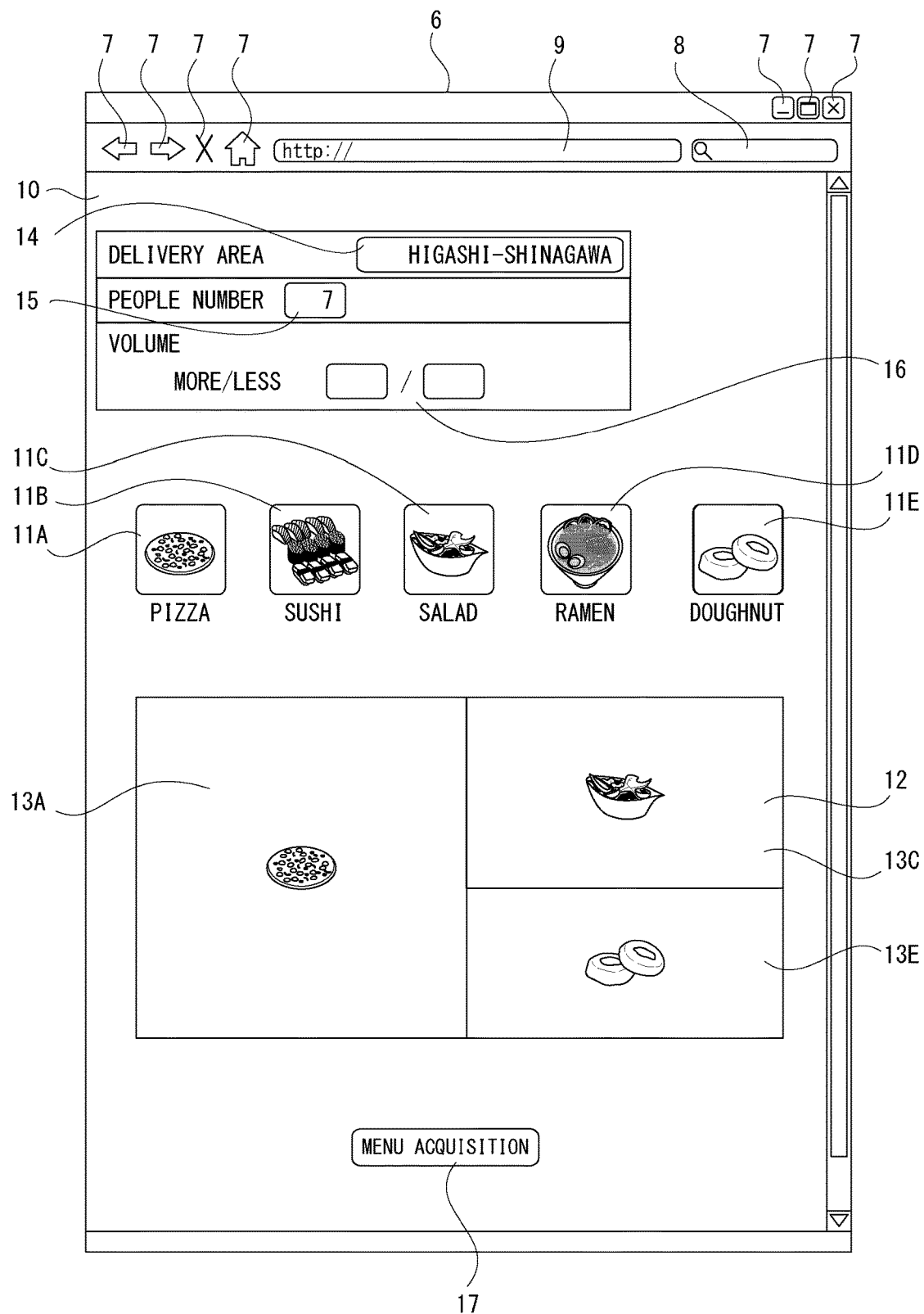
FIG. 6 is a view illustrating a state in which a plurality of icons are placed in the placement region.

The order quantity specification unit 1f executes a process for specifying (calculating) an order quantity for each cooking category (for each of "pizza," "salad" and "doughnut") in response to the size of the three placement icons 13A, 13C and 13E placed in the placement region 12 of FIG. 6 and the order people number information calculated by the order people number information acquisition unit 1e. In particular, if it is assumed that the ratio of the placement icons of "pizza," "salad" and "doughnut" occupying the placement region 12 is 50%, 30% and 20%, respectively, then the order quantity specification unit 1f calculates an order quantity for each cooking category corresponding to the order quantity for 8.3 people calculated by the order people number information acquisition unit 1e (calculated on the basis of calorie and weight). That is, the order quantity of the cooking category of "pizza" is for 4.15 people; the order quantity of the cooking category of "salad" is for 2.49 people; and the order quantity of the cooking category of "doughnut" is for 1.66 people.

The presentation unit 1g presents menu information on the user terminal 3 in accordance with the order quantity for each cooking category specified by the order quantity specification unit 1f and the delivery area information. This process is executed, for example, by depressing a menu acquisition button 17 of FIG. 3. Further, a dish menu is presented to the user for the first time by the process.

The components provided in the delivery system 1 may be provided in any of the delivery server 2 and the user terminals 3.

As an example, the delivery server 2 includes an object presentation unit 1a, a placement region setting unit 1b, an object placement mode changing unit 1c, a delivery destination area information acquisition unit 1d, an order people number information acquisition unit 1e, an order quantity specification unit 1f, and a presentation unit 1g.

Meanwhile, as an example in which the user terminal 3 configuring the delivery system 1 is a portable terminal in which an application for utilizing a delivery service is installed, the delivery server 2 may include an object presentation unit 1a and a presentation unit 1g, and the user terminal 3 may include a placement region setting unit 1b, an object placement mode changing unit 1c, a delivery destination area information acquisition unit 1d, an order people number information acquisition unit 1e, and an order quantity specification unit 1f. In particular, the deliver server 2 transmits to the user terminal 3 object information in accordance with the delivery destination area information acquired by the user terminal 3, and presents order information finally decided by the user terminal 3 on the user terminal 3.

The delivery system 1 further provides an environment in which, where there is some restrictive condition for selecting a dish, an allocation quantity for each dish planned to order can be grasped. To this end, the delivery system 1 includes, in addition to the functions of the components described hereinabove, an order request acquisition unit 1h for acquiring an order request including identification information and an order quantity of a plurality of order menus, an order product information acquisition unit 1i for acquiring order menu information (information including a parameter relating to a restrictive condition) on the basis of identification information of an order menu, and a user information acquisition unit 1j for acquiring various restrictive conditions and demand conditions for dishes for each user. The delivery system 1 further includes an allocation quantity setting unit 1k for setting/modifying an allocation quantity for each order menu on the basis of various restrictive conditions, a condition estimation unit 1m for estimating a demand condition, and a modification condition acquisition unit 1n for acquiring a modification condition for modifying the allocation quantity for each ordered product.

The order request acquisition unit 1h acquires an order request including identification information and order quantities of a plurality of order menus and identification information of a user. In particular, when an order request is received, the delivery system 1 can grasp an ordering person, an ordered menu and an order quantity.

The order product information acquisition unit 1i acquires product information of each order menu from the menu DB 52 in response to a received order request. Although details are hereinafter described, in the menu DB 52, information in accordance with a restrictive condition is stored in association with each dish. In particular, information on calorie, salt or the like is stored. Accordingly, the order product information acquisition unit 1i acquires, for a user who has an intake limit of salt or a user who dislikes green peppers, nutrient information or used foodstuff information for each order menu from the menu DB 52, in order to execute various processes for allocating an appropriate dish having an appropriate quantity. In the following description, to acquire an order request from received information is described as to receive an order request.

The user information acquisition unit 1j acquires a first condition as restrictive information (information as a restrictive condition) of an ordering user and a second condition (for example, a satisfaction condition) as demand information (information as a demand condition) for a dish (meal) of the user.

The first condition is, for example, information of foodstuff the user cannot ingest for religious reasons, information of a nutrient whose ingestion is restricted for some reasons, information of foodstuff the user dislikes or the like.

The second condition is, for example, information of a quantity which a user orders on average, or the like. In particular, where a certain user is a user who orders by a quantity more than average intake calories per one person (for example, 700 kcal), the second condition is information indicating that the user orders by a quantity more than average intake calories (for example, attribute information such as "more" or particular numerical value information such as 1.3 times). The second condition may also be information of the age or the like.

The second condition may be inputted for each order by a user or may be stored in the user DB 50.

The allocation quantity setting unit 1k sets an allocation quantity for each order product on the basis of the first condition and the second condition for each user. For example, where a user X and another user Y are planning to order an dish A, another dish B and a further dish C, the allocation quantity setting unit 1k sets in what manner each of the dishes A, B and C are to be allocated to the users X and Y. At this time, the first condition as a restrictive information and the second condition as demand information of each of the users X and Y are taken into consideration.

Further, where a first condition is set for each of the user X and the user Y, as regards setting of an allocation quantity such as which one of the conditions is to be applied preferentially, several examples are available. These examples are hereinafter described.

Furthermore, the allocation quantity setting unit 1k modifies the allocation quantities of the dishes A, B and C in response to a modification condition hereinafter described to set modification allocation quantities.

The condition estimation unit 1m executes a process for estimating the second condition for each user.

The modification condition acquisition unit 1n acquires a modification condition for modifying an allocation quantity of an order product. The modification condition is, for example, information inputted by a user, to whom an allocation quantity is presented, for modifying the allocation quantity.

Further, information of an allocation quantity set (or modified) for each order product is presented to a user through the presentation unit 1g described hereinabove.

Each of the components described above is provided in one of the delivery server 2 and the user terminals 3. For example, the order request acquisition unit 1h is provided in the delivery server 2. Meanwhile, each of the other components (order product information acquisition unit 1i, user information acquisition unit 1j, allocation quantity setting unit 1k, condition estimation unit 1m and modification condition acquisition unit 1n) may be provided in any of the delivery server 2 and the user terminals 3.

2. Hardware Configuration

Figure 7:
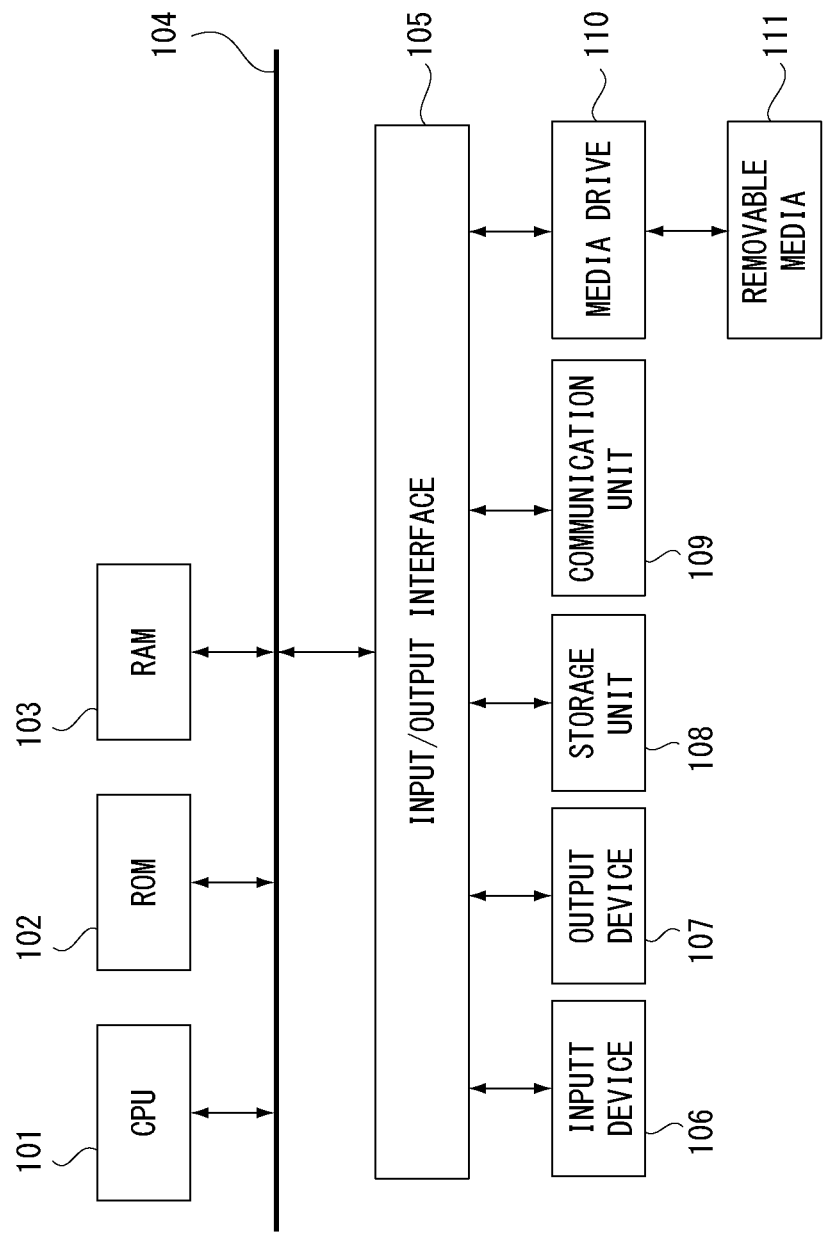
FIG. 7 is a block diagram of a computer of the present embodiment.

FIG. 7 is a view exemplifying hardware of the delivery server 2, user terminal 3 and shop terminal 4 depicted in FIG. 1 as well as the user DB 50, shop DB 51, menu DB 52 and webpage DB 53. A CPU (Central Processing Unit) 101 of a computer device in each of the server and the terminals executes various processes in accordance with a program stored in a ROM (Read Only Memory) 102 or a program loaded from a storage unit 108 into a RAM (Random Access Memory) 103. In the RAM 103, data and so forth necessary for the CPU 101 to execute various processes are also stored as needed.

The CPU 101, ROM 102 and RAM 103 are connected to each other by a bus 104. In addition, an input/output interface 105 is connected to the bus 104.

To the input/output interface 105, an inputting device 106, which includes a keyboard, a mouse, a touch panel or the like, and an outputting device 107, which includes a display configured from an LCD (Liquid Crystal Display), a CRT (Cathode Ray Tube), an organic EL (Electroluminescence) panel or the like and a speaker or the like, are connected. A storage unit 108, which include an HDD (Hard Disk Drive), a flash memory device or the like, and a communication unit 109 for performing a communication process or inter-device communication through the communication network 5 are also connected to the input/output interface 105.

To the input/output interface 105, a media drive 110 is connected as occasion demands, and a removable media 111 such as a magnetic disk, an optical disk, a magneto-optical disk or a semiconductor memory is mounted as needed on the input/output interface 105 such that writing or reading out information into or from the removable media 111 is performed.

In such a computer device as described above, uploading and downloading of data or a program are performed by communication through the communication unit 109. Further, transfer of data or a program can be performed through the removable media 111.

When the CPU 101 performs processing operation on the basis of various programs, information processing or communication, which will be described later, is executed in each of the delivery server 2, user terminals 3, shop terminals 4, user DB 50, shop DB 51, menu DB 52 and webpage DB 53.

Further, an information processing device which configures each of the delivery server 2, user terminals 3, shop terminals 4, user DB 50, shop DB 51, menu DB 52 and webpage DB 53 may not be configured solely from such a computer device as depicted in FIG. 7 but may be configured as a system of a plurality of computer device. The plurality of computer device may be configured as a system using a LAN or may be placed at remote places in a communicable state by a VPN (Virtual Private Network) or the like which uses the Internet or the like.

3. DB

The various DBs managed by the delivery server 2 are described.

3-1. User DB

In the user DB 50, information of a user who receives a delivery service provided by the delivery system 1 is stored. For example, for one user ID (Identification) by which one user can be specified, personal information such as a login password, a name, an age, a sex, an address, an email address, an annual income, a hobby and so forth is stored in association. In addition, an order history, favorite registration information of a menu, taste food information and so forth are stored. Accordingly, the user DB 50 functions also as an order history database.

Further, in the user DB 50, a first condition and a second condition for each user are stored.

3-2. Shop DB

In the shop DB 51, information of shops by which products (dishes) are sold utilizing a delivery service is stored. For example, for a shop ID based on which each shop can be identified uniquely, various kinds of information such as a login password, a shop name, a shop logo, delivery range information, business-hours information, a menu ID for each dish, a shop page URL, a price for each dish, contact information (a telephone number, an email address or the like) and so forth are stored in association.

The shop page URL is a URL applied to each webpage a shop has.

Information of the shop logo may be image data itself or may be link information (URL information) or the like of stored image data.

Further, information of cooking category delivery time (waiting time) may be stored. The cooking category delivery time varies depending upon the number of users who utilize the delivery service. Every time the cooking category delivery time varies, the cooking category delivery time information of the shop DB 51 is updated.

3-3. Menu DB

In the menu DB 52, information of dishes which can be purchased with a delivery service through the delivery service is stored. For example, for a menu ID with which a dish can be identified uniquely, a cooking category, a dish image, shop information, foodstuff materials, quantity information and so forth are stored in association.

Information of the dish image may be image data itself or may be link information (URL information or the like) of the stored image data.

3-4. Webpage DB

In the webpage DB 53, data of various webpages which are provided to users or sellers by the delivery server 2 are stored. In particular, webpage data such as shop pages or details pages of dishes or user pages are stored.

As the webpage data, URL information of a webpage and information of a placement or display mode (position or size, color or the like) of an object (image, text, banner or the like) placed on each webpage are stored.

Further, the information stored in the webpage DB 53 may be stored in the form of a structured document file, for example, of an HTML file or the like.

4. Flow of Processing

4-1. Flow of First Embodiment

In a first embodiment, an example in which attribute information (taste information, history information or the like) of a user is not used is described with reference to FIG. 8.

Figure 8:
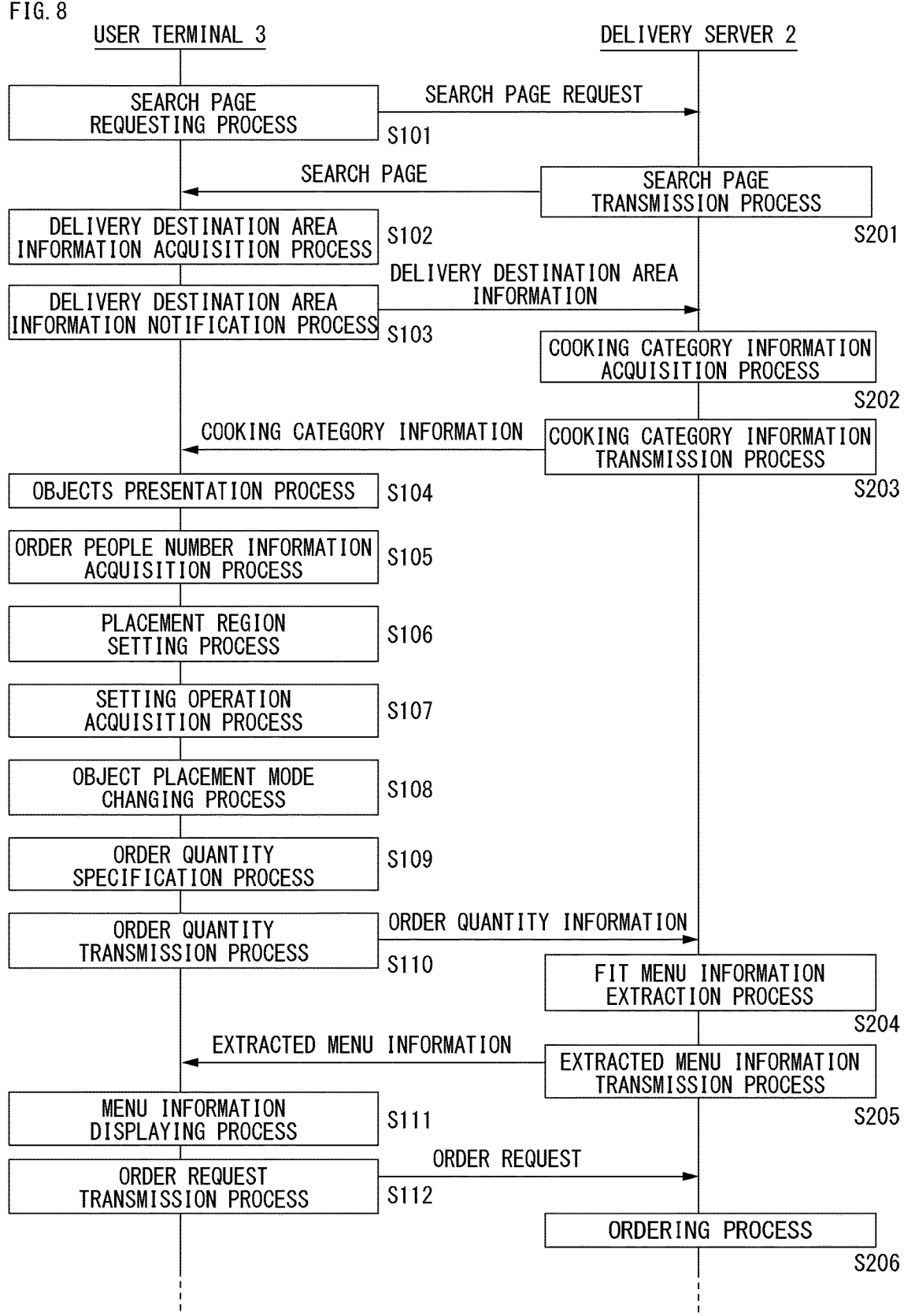
FIG. 8 is a view illustrating a general flow of a first embodiment.

To be noted, in FIG. 8, various processes performed by the delivery server 2 and the user terminal 3 provided in the delivery system 1 and various kinds of information to be transmitted and received between the delivery server 2 and the user terminal 3 are illustrated.

In regard to the user terminal 3, a case in which a user performs various operations on a web browser 6 installed in the user terminal 3 is taken as an example.

First, the user terminal 3 executes, at step S101, a process for requesting a search page to the delivery server 2. By this process, a search page request is transmitted to the delivery server 2. This process is executed, for example, when a user selects a search page for utilizing the delivery service from various webpages registered in favorites.

The delivery server 2 receiving the search page request executes, at step S201, a process for acquiring webpage data of the search page from the webpage DB 53 and transmitting the webpage data to the user terminal 3 from which the request has been received. By this process, the webpage data is transmitted as search page information to the user terminal 3, and the search page is displayed on the user terminal 3.

The user terminal 3 having the search page displayed on the web browser 6 executes, in response to an input of delivery destination area information by the user, a process for acquiring the delivery destination area information at step S102. This process is a process for acquiring character string information, for example, inputted to the delivery area input field 14 of FIG. 3.

Subsequently, the user terminal 3 executes a process for transmitting the delivery destination area information to the delivery server 2 at step S103.

The delivery server 2 receiving the delivery destination area information executes a process for acquiring cooking category information at step S202.

In this process, the delivery server 2 acquires shop information capable of delivering in the delivery destination area from the shop DB 51 on the basis of the delivery destination area information received from the user terminal 3. Then, the delivery server 2 designates a cooking category on the basis of deliverable dishes from the shop information.

In particular, if dishes which can be delivered by an A shop which is a chain shop of pizzas are a "○○pizza" and a "ΔΔ salad," then "pizza" and "salad" are specified as cooking categories from information of the dishes (menu information). In this manner, a plurality of pieces of cooking category information may be tied with one shop.

Furthermore, cooking categories capable of being delivered may be preliminarily stored in association with each delivery destination area in a database. In this case, the process at step S202 is a process for acquiring cooking category information from the database on the basis of the delivery destination area information received from the user terminal 3.

Then at step S203, the delivery server 2 executes a process for transmitting the cooking category information to the user terminal 3.

The user terminal 3 receiving the cooking category information executes, at step S104, a process for presenting an object in accordance with the cooking category information on the web browser 6.

In particular, the objects 11, 11, 11, . . . depicted in FIG. 3 correspond to the presented objects.

Furthermore, in FIG. 3, an example in which the cooking categories capable of being delivered in the "Higashi-Shinagawa" district are "pizza," "sushi," "salad," "ramen" and "doughnut," and as the objects displayed on the webpage display portion 10, only the cooking categories capable of being delivered are indicated.

In contrast, all cooking categories capable of being delivered in the delivery service provided by the delivery system 1 may be displayed such that only the cooking categories capable of being delivered in the "Higashi-Shinagawa" district are displayed with a setting operation permitted. In other words, a cooking category which does not include a dish capable of being delivered in the "Higashi-Shinagawa" district is displayed on the webpage display portion 10 but in a state in which a setting operation is not permitted thereof.

Then at step S105, the user terminal 3 executes a process for acquiring order people number information. This process is a process for acquiring, for example, people number information inputted to the people number input field 15 by the user in FIG. 3.

Then at step S106, the user terminal 3 executes a placement region setting process. The placement region setting process is a process for placing a placement region 12 on the webpage display portion 10 of the web browser 6 (in FIG. 3 and so forth).

Since the placement region 12 is not displayed until after the user inputs people number information, the user can be prevented from performing a later operation without inputting people number information.

Further, the placement region setting process may be performed together with the object presentation process at step S104 of FIG. 8.

Then at step S107, the user terminal 3 executes a setting operation acquisition process.

This process is executed every time the user performs a setting operation for an object, together with processes at steps S108 and S109 hereinafter described.

The setting operation acquisition process at step S107 is a process for acquiring information relating to a setting operation performed by the user.

Examples of the setting operation are described with reference to FIG. 3 to FIG. 7.

A placement operation for dragging an object 11 into the placement region 12 in the state of FIG. 3 is an example of a setting operation. After the placement, a state, for example, illustrated in FIG. 4 is established.

An enlargement operation performed by dragging one end of the object 11A (placement icon 13A) of "pizza" placed in the placement region 12 in the state of FIG. 4 is another example of the setting operation. After the enlargement, a state, for example, illustrated in FIG. 5 is established.

Further, a changing operation for changing the ratio of "pizza," "salad" and "doughnut" in the placement region 12 from the state illustrated in FIG. 6 is also an example of the setting operation.

In addition, an operation for deleting a placement icon 13 from the placement region 12 or a like operation is also an example of the setting operation.

The user terminal 3 executes, at step S108, a process for changing the object placement mode in response to the setting operation acquired at step S107.

For example, if the acquired operation is an enlargement operation, then the user terminal 3 performs a process for displaying the placement icon 13 of the target in an enlarged scale (process for changing the state illustrated in FIG. 4 to a state illustrated in FIG. 5).

Then at step S109, the user terminal 3 executes an order quantity specification process. In this process, for example, if a state illustrated in FIG. 6 is established by the object placement mode changing process at step S108, then the user terminal 3 specifies an order quantity in accordance with the ratio in area of the placement icons 13A, 13C and 13E in the placement region 12.

Figure 9:
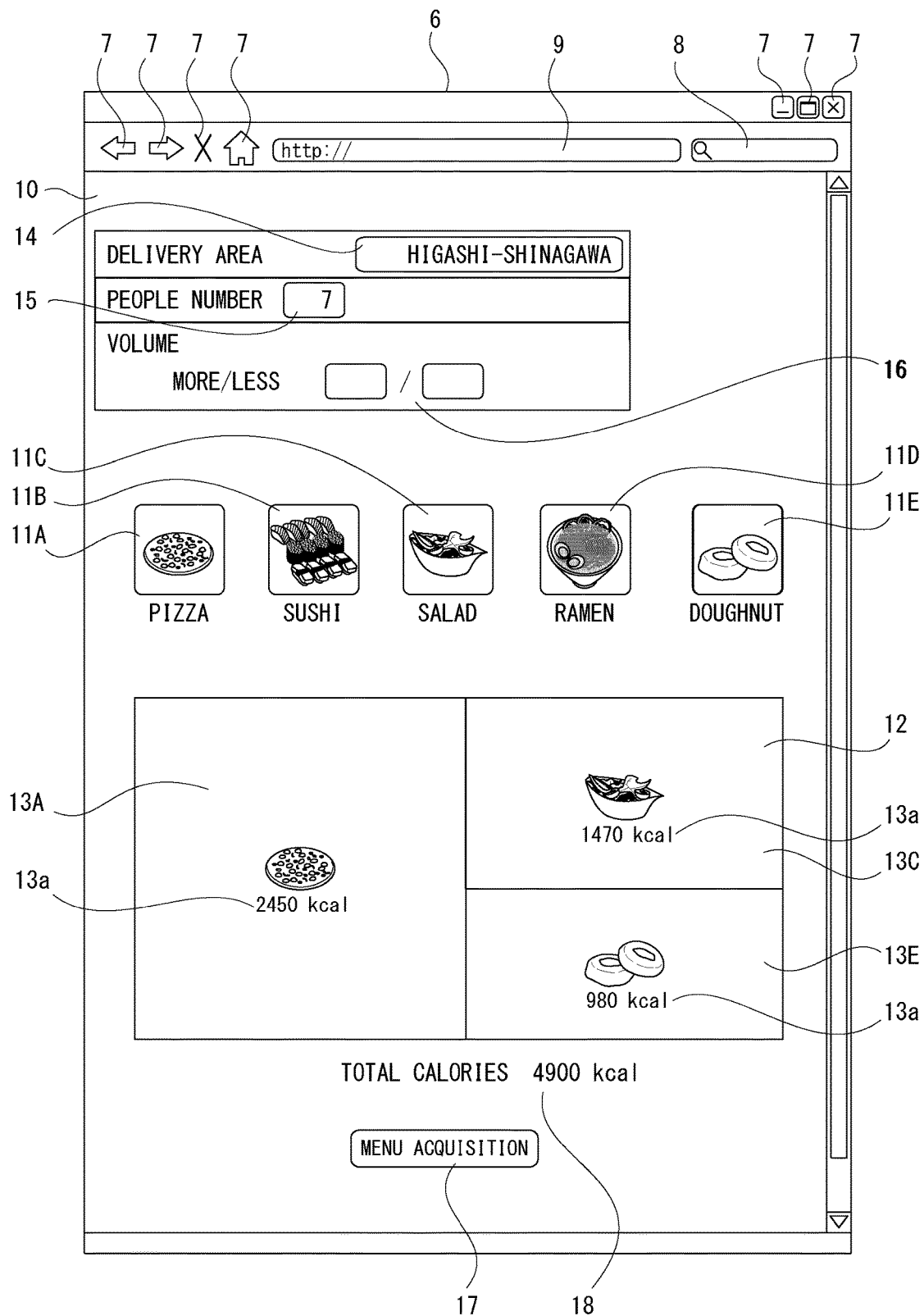
FIG. 9 is a view depicting an example in which an order quantity is displayed on a search page.

At this time, the order quantity in each of the cooking categories may be displayed such that it can be recognized readily, for example, as depicted in FIG. 9. FIG. 9 illustrates a state same as the state illustrated in FIG. 6, the quantities for the individual cooking categories and the total order quantity are displayed in a readily recognizable state to users. In particular, calorie information is presented as order quantity information 13a for each placement icon 13. In particular, 2450 kcal is displayed as an order quantity of the cooking category "pizza;" 1470 kcal is displayed as an order quantity of "salad;" and 980 kcal is displayed as an order quantity of "doughnut."

Further, at a location below the placement region 12, 4900 kcal is displayed as total order quantity information 18. This order quantity is a value where 700 kcal is ordered per one person. This value may be changed in response to a time zone (namely, morning, daytime, and evening).

It is to be noted that the object placement mode changing process at step S108 and the order quantity specification process at step S109 are hereinafter described in connection with several examples.

Every time the user performs a setting operation, the respective processes at steps S107 to S109 of FIG. 8 are executed by the user terminal 3.

Then, in response to depression of the menu acquisition button 17 of the search page (for example, FIG. 9) by the user, the user terminal 3 executes an order quantity transmission process at step S110. By this process, order quantity information for each cooking category is transmitted to the delivery server 2.

Furthermore, if the placement mode of a placement icon 13 is changed to specify an order quantity in response to a setting operation of the user (such as a placement operation or an enlargement operation of a placement icon 13), the specified order quantity may be notified automatically to the delivery server 2. In other words, every time a setting operation for a placement icon 13 is performed without the user depressing the menu acquisition button 17, order quantity information may be automatically notified to the delivery server 2.

The delivery server 2 receiving the order quantity information for each cooking category executes a fit menu information extraction process at step S204.

In the fit menu information extraction process, the delivery server 2 extracts menu information from the menu DB 52 in response to the order quantity information received from the user terminal 3. At this point of time, the delivery server 2 has specified a cooking category from the delivery destination area information received at step S103 and also has already specified the shop information of a shop capable of delivering to the delivery destination area for each cooking category (namely, dishes which can be delivered).

Accordingly, the menu information extracted in the fit menu information extraction process is menu information adapted for the user, which is of the cooking category which includes the dish capable of being delivered and has been designated by the user.

It is to be noted that, at this time, a combination of dishes which satisfy the order quantity designated by the user (or proximate to the order quantity) may be extracted. In other words, for example, a combination of dishes whose calorie is proximate to 2450 kcal from among the dishes belonging to the cooking category of "pizza" may be extracted.

Then, at step S205, the delivery server 2 executes a process for transmitting the menu information extracted formerly to the user terminal 3. This process may be a process for acquiring HTML data including the extracted menu information from the webpage DB 53 and transmitting the HTML data to the user terminal 3.

Figure 10:
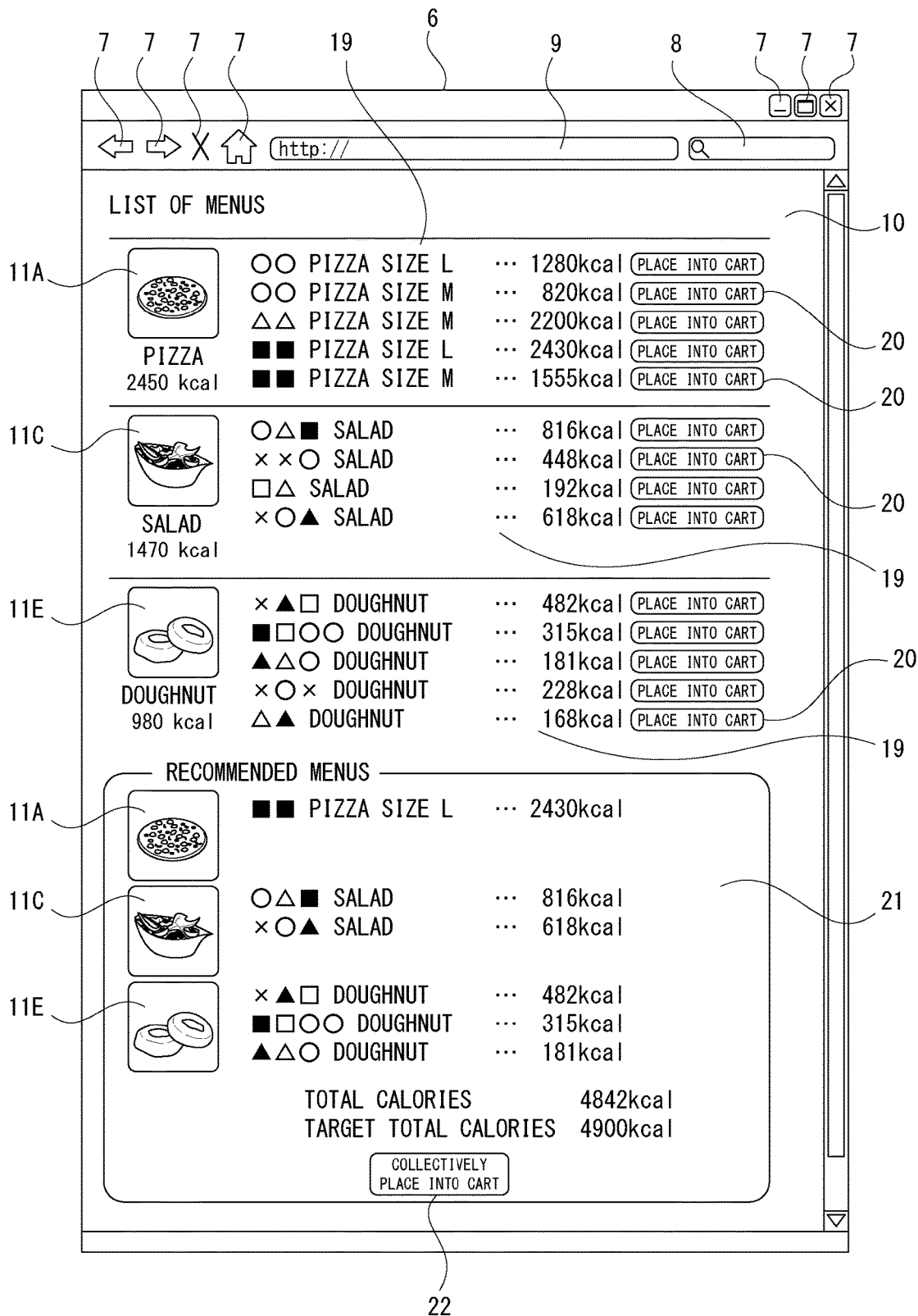
FIG. 10 is a view depicting an example of a menu information presentation page.

The user terminal 3 receiving the extracted menu information executes, at step S111, a process for displaying a menu information presentation page for presenting the received menu information to the user on the user terminal 3. The received menu information is used to present an extracted menu associated with the cooking category designated by the user, for example, as depicted in FIG. 10. At this time, the quantity of an extracted menu corresponding to the order quantity for each cooking category designated by the user may be displayed.

In particular, as depicted in FIG. 10, an object 11 indicative of a cooking category, menu information 19 of dishes and a cart button 20 for placing a dish into a cart are displayed for each cooking category. In the menu information 19, information of intake calories for each dish is presented as quantity information.

Further, at a lower portion of the menu information presentation page depicted in FIG. 10, a combination of dishes extracted by the delivery server 2 is presented as recommendable menu information 21. The combination of dishes in the recommendable menu information 21 is made by the delivery server 2 such that the condition of the order quantities of the cooking categories designated by the user may become proximate to the condition of the total order quantity.

Below the recommendable menu information 21, a "collectively-placing-into-cart" button 22 for placing a set of recommended menus as it is into a cart is placed.

It is to be noted that the order quantity (total calories in the figure) of the recommendable menu and the order quantity (target total calories in the figure) designated by the user may be presented as indices for allowing the user to determine whether or not the recommendable menu is to be selected.

Figure 11:
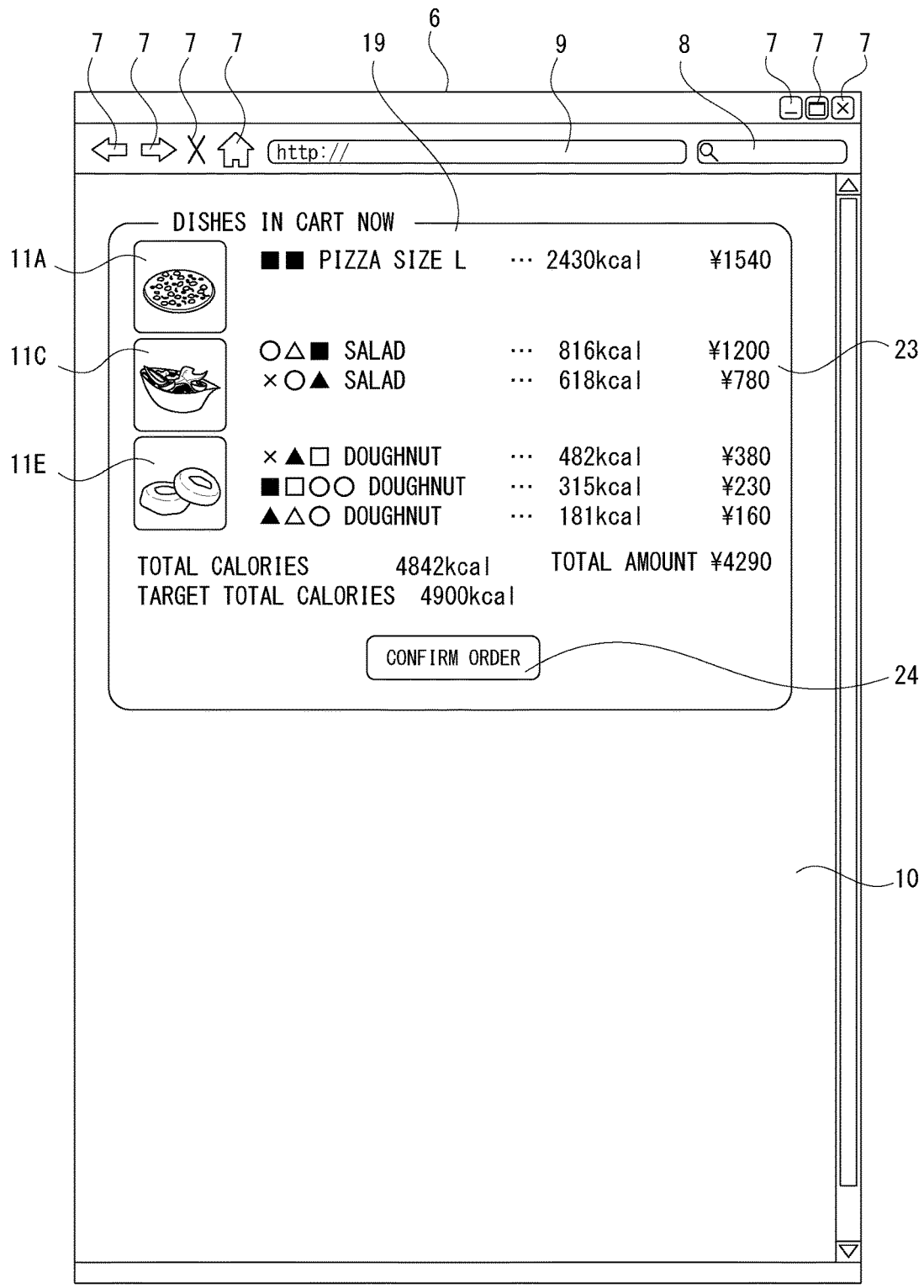
FIG. 11 is a view depicting an example of a cart page.

If the user performs an operation for adding a dish into a cart, then such a cart page as depicted in FIG. 11 is displayed on the user terminal 3.

On the cart page, an object 11 indicative of each cooking category, menu information 19, price information 23 indicative of the price of each dish, and an order confirmation button 24 for actually ordering the dishes in the cart, are displayed.

If the user depresses the order confirmation button 24, then the user terminal 3 executes an order request transmission process at step S112. By this process, the information of the dishes in the cart is notified as order menu information to the delivery server 2.

The delivery server 2 receiving the order request executes an ordering process at step S206. The ordering process includes a process for issuing an actual order to a shop which cooks each dish and a process for acquiring information of the ordering user (delivery destination address or the like) from the user DB 50 and notifying the information to a shop. Further, the ordering process may include a process for notifying to the user by an electronic mail or the like that the order is accepted.

As each of the user terminal 3 and the delivery server 2 executes the respective series of processes illustrated in FIG. 8, the user can utilize the delivery service while grasping the order quantity for each cooking category desired by the user itself.

Further, where a portable terminal or the like in which a dedicated application for utilizing the delivery service is installed is used as the user terminal 3, it is also possible for the user terminal 3 to execute the respective processes at steps S102 and S103 as initialization of the application. In this case, when the application is activated, the portable terminal as the user terminal 3 may execute its process beginning with step S104 of FIG. 8.

4-2. Process Example 1 Relating to Setting Operation

An example of processing of the object placement mode changing process at step S108 and the order quantity specification process at step S109, in a case where a deformation operation for a placement icon 13 is performed at step S107 of FIG. 8 described above, is described with reference to FIG. 12.

Figure 12A:
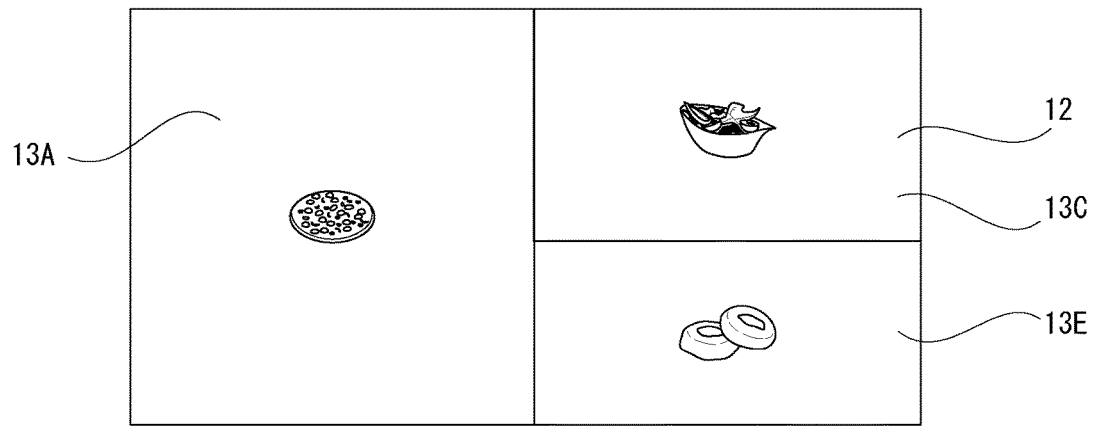
FIG. 12 is a view illustrating a manner in which the placement mode is changed in response to an operation of a user.

FIG. 12A illustrates a state in which the placement icon 13A indicative of the cooking category of "pizza," placement icon 13C indicative of the cooking category of "salad" and placement icon 13E indicative of the cooking category of "doughnut" are placed in the placement region 12 of a search page (for example, FIG. 3).

Here, if the user performs an operation for reducing the placement icon 13A in the leftward and rightward direction (FIG. 12B), then in the object placement mode changing process at step S108, a process is executed as follows. The process implies displaying the placement icon 13A in a reduced scale (FIG. 12B) and displaying the placement icons 13C and 13E in an enlarged scale such that the blank region caused by the reduction of the placement icon 13A is filled up with the placement icons 13C and 13E (FIG. 12C). At this time, the placement icon 13C and the placement icon 13E are displayed in an enlarged scale without changing the ratio between them.

The process at subsequent step S109 is similar to that described hereinabove with reference to FIG. 8, and therefore, detailed description of the process is omitted herein.

Consequently, since a blank region where no placement icon 13 is placed does not appear in the placement region 12, it is easy for the user to grasp the order quantity for each cooking category.

4-3. Process Example 2 Relating to Setting Operation

Another example of the object placement mode changing process at step S108 and the order quantity specification process at step S109, in a case where a changing operation for an placement icon 13 is performed at step S107 of FIG. 8 described hereinabove, is described with reference to FIG. 12.

Figure 12B:
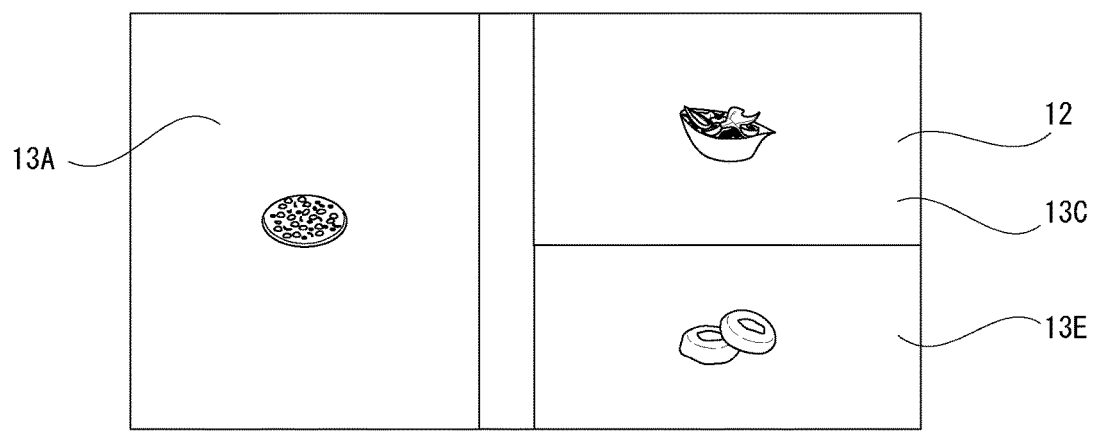
Figure 12C:
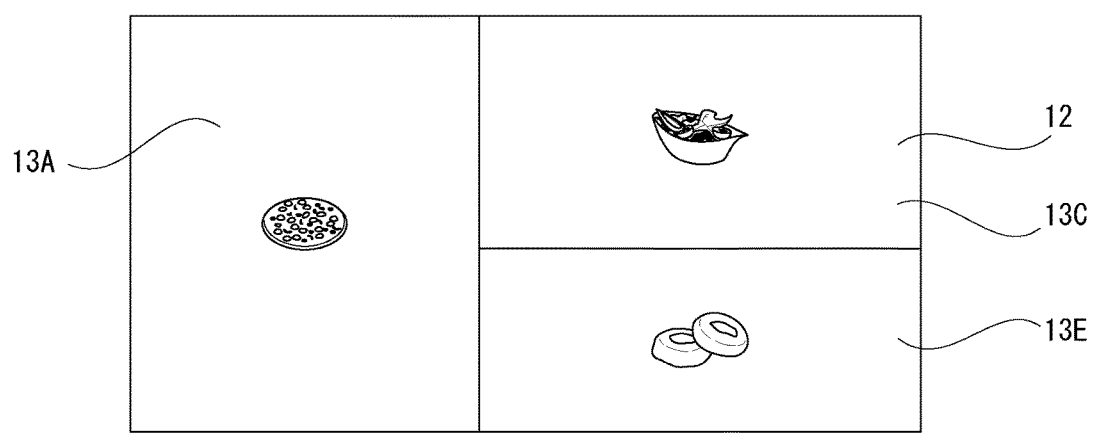

If the user performs an operation for reducing the size of the placement icon 13A in the leftward and rightward direction in the state illustrated in FIG. 12A (FIG. 12B) similarly as in the process example 1, then in the object placement mode changing process at step S108, the placement icon 13A is displayed in a reduced scale (FIG. 12B). However, the placement mode of the placement icons 13C and 13E is not changed. In particular, a blank region where no placement icon 13 is placed appears.

In the order quantity specification process at subsequent step S109, the order quantity for each cooking category is calculated without taking the blank region into consideration. In particular, where the total order quantity is 4900 kcal and the order quantity for the cooking category of "pizza" changes from 50% to 40% of the total order quantity while the order quantity for the cooking category of "salad" is 30% of the total order quantity and the order quantity for the cooking category of "doughnut" is 20% of the total order quantity, the order quantity for the cooking category of "pizza" is totaling, 2178 kcal (=4900×40/(40+30+20)). Meanwhile, the order quantity for the cooking category of "salad" is 1633 kcal (=4900×30/(40+30+20)), and the order quantity for the cooking category of "doughnut" is 1089 kcal (=4900×20/(40+30+20)).

Consequently, since the size of the other placement icons 13C and 13E which are not the operation target does not vary, it is easy for the user to grasp the balance in order quantity among the cooking categories during an operation.

Meanwhile, the order quantity for each cooking category may be calculated by subtracting the blank region from the total order quantity. In particular, the total order quantity may be regarded as 4410 kcal (=4900×90/100).

4-4. Flow of Second Embodiment

In a second embodiment, an example in which attribute information of a user (taste information, history information or the like) is used is described with reference to FIG. 13.

Figure 13:
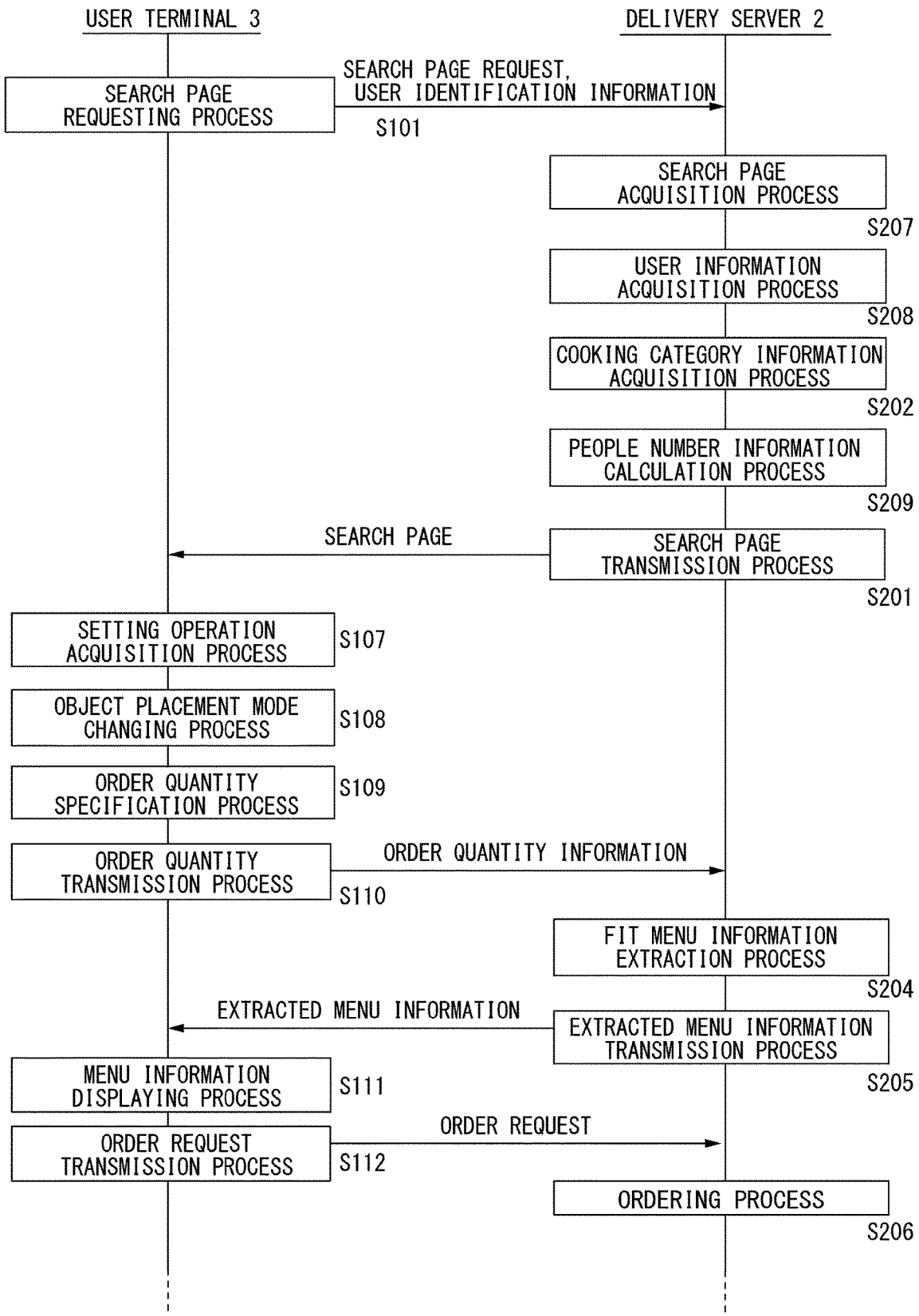
FIG. 13 is a view illustrating a general flow of a second embodiment.

It is to be noted that FIG. 13 illustrates processes performed by the delivery server 2 and a user terminal 3 provided in the delivery system 1 and information transferred between the delivery server 2 and the user terminal 3.

As regards the user terminal 3, a case in which a user performs various operations on the web browser 6 installed in the user terminal 3 is taken as an example.

Further, like processes to those in the first embodiment are denoted by like reference symbols and overlapping description of them is omitted herein suitably.

First, the user terminal 3 executes a process for performing a search page request at step S101. In this process, a search page request is transmitted. It is to be noted that, at this time, also identification information of a user (for example, a user ID) who uses the user terminal 3 is transmitted simultaneously. In later processes, the delivery server 2 executes processing using the attribute information unique to the user relating to the received user identification information.

The delivery server 2 receiving the search page request and the user identification information executes, at step S207, a process for acquiring webpage data of the search page from the webpage DB 53.

Then at step S208, the delivery server 2 executes a process for acquiring the attribute information of the user based on the user identification information from the user DB 50. The attribute information of the user acquired at this time includes delivery destination area information based on a district (address) in which the user lives and the order history information of the user.

Then at step S202, the user terminal 3 executes a cooking category information acquisition process. In this process, as described above, the delivery server 2 acquires shop information available for delivery in the delivery destination area from the shop DB 51 and specifies a cooking category on the basis of dishes which can be delivered from the shop.

At step S209, the delivery server 2 executes a people number information calculation process. The people number information include an order people number, a number of people who would eat more, a number of people who would eat less, a correction order people number or the like.

In this process, the delivery server 2 acquires average order people number information when a user orders using the order history information acquired from the user DB 50 at step S208. At this time, an average order people number may be calculated simply from the order information of orders having been ordered by a user till then or an order people number within a predetermined latest period may be calculated. An order people number may also be calculated utilizing position information of the user terminal 3 (for example, position information determined using a satellite positioning system) (for example, from order information issued from the same position information).

Further, in the people number information calculation process, an average value of a number of people who eat more and a number of people who eat less (namely, information inputted to the volume information input field 16 of the search page of FIG. 3 or the like) is acquired from the order history information.

Then, a correction order people number is calculated from the average order people number information, the number of people who eat more and the number of people who eat less. In particular, for example, where the average order people number is 5 and the "more" people number is 2 while the "less" people number is 1, the correction order people number is 5.8 (2+2×1.5+1×0.8).

Then at step S201, the delivery server 2 executes a process for changing the webpage data of the search page acquired already to webpage data into the webpage data in a state in which information based on the user information is inputted. Then the delivery server 2 transmits the changed page data to the user terminal 3.

In particular, to the webpage data of the search page, the delivery destination area information to be inputted to the delivery area input field 14, the order people number information to be inputted to the people number input field 15, the "more" people number and the "less" people number to be inputted to the volume information input field 16, the objects 11, 11, . . . based on the cooking category information and information to be displayed in the total order quantity information 18 of FIG. 9 are added. The total order quantity information is calculated from the correction order people number. In particular, 5.8 people×700=4060 kcal.

Figure 14:
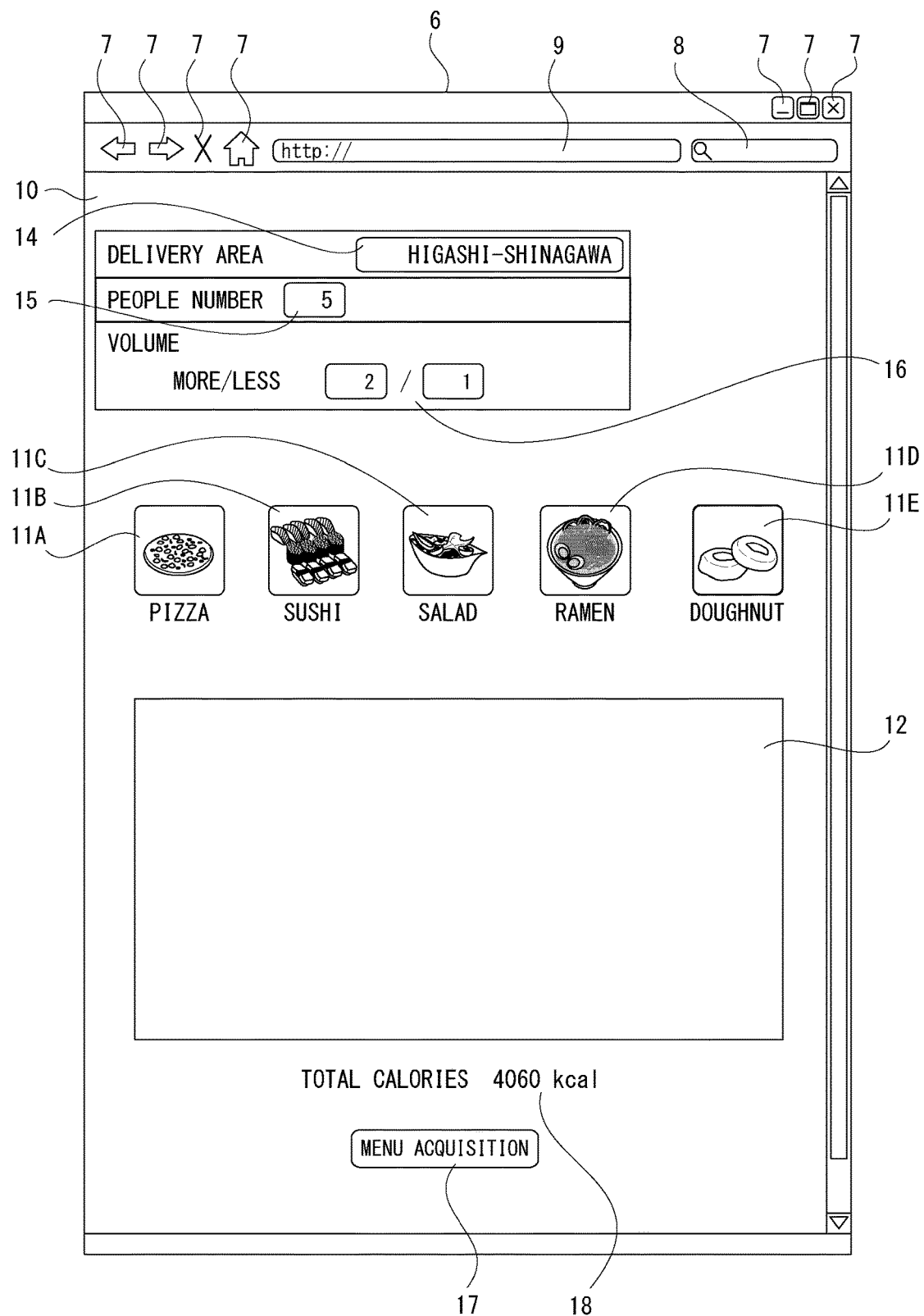
FIG. 14 is a view depicting a search page in a state in which predetermined information based on attribute information of a user is inputted.

Consequently, the search page in a state in which predetermined information based on the attribute information of the user is inputted in advance is displayed on the user terminal 3 (FIG. 14).

Subsequently, at step S107, the user terminal 3 executes a setting operation acquisition process, and then executes, at step S108, an object placement mode changing process in response to an operation of the user.

The object placement mode changing process at step S108 is hereinafter described in connection with several examples.

Then at step S109, the user terminal 3 performs an order quantity specification process. The series of processes at steps S107 to S109 is executed every time the user performs a setting operation for a placement icon.

In response to depression of the menu acquisition button 17 of the search page by the user, the user terminal 3 executes an order quantity transmission process (step S110).

Since later processes at steps S204 to S206 of the delivery server 2 and processes at steps S111 and S112 of the user terminal 3 are similar to those in the first embodiment, description of them is omitted herein.

It is to be noted that, where a portable terminal in which a dedicated application for utilizing the delivery service is installed is used as the user terminal 3, it is also possible for the user terminal 3 to execute the processes at steps S101, S207, S208, S202, S209 and S201 of FIG. 13 as initialization of the application. In this case, when the application is activated, the portable terminal as the user terminal 3 may execute its process beginning with step S107 of FIG. 13.

4-5. Process Example 3 Relating to Setting Operation

A process example 3 relating to the setting operation is described with reference to FIG. 4 and FIG. 13.

The description is given of a case in which a user performs an operation for selecting one of the objects 11 in a search page.

In this case, the user terminal 3 acquires information relating to the operation in the setting operation acquisition process at step S107 of FIG. 13 and executes a process for placing a pertaining object 11 into the placement region 12 as depicted in FIG. 4 in the object placement mode changing process at step S108.

In particular, for example, in response to that the user clicks one of the objects 11, the object 11 is automatically placed as a placement icon 13 into the placement region 12 of the search page (for example, FIG. 4).

Consequently, the user performs only a selection operation and the object 11 is placed automatically. Accordingly, the processing burden on the user is reduced.

4-6. Process Example 4 Relating to Setting Operation

A process example 4 relating to the setting operation is described with reference to FIG. 5 and FIG. 13.

The description is given of a case in which a user performs a placement operation for placing one of the objects 11 of the search page into the placement region 12.

In this case, the user terminal 3 acquires information relating to the pertaining operation in the setting operation acquisition process at step S107 of FIG. 13 and executes a process of placing the pertaining object 11 into the placement region 12 in the object placement mode changing process at step S108.

At this time, in response to an order history of the user, the user terminal 3 places, the pertaining object 11 in a state in which the location at which the object 11 is placed as the placement icon 13 and the size, shape and so forth coincide with those of the object 11 when the object 11 was placed previously (for example, FIG. 5).

Consequently, since the object placement mode changing process taking an operation which will be performed by the user from now on into consideration is executed, the operation burden on the user is reduced.

4-7. Process Example 5 Relating to Setting Operation

A process example 5 relating to the setting operation is described with reference to FIG. 13 and FIG. 15.

The description is given of a case in which a user performs a placement operation for placing one of the objects 11 of a search page into the placement region 12.

In this case, the user terminal 3 acquires information relating to the pertaining operation in the setting operation acquisition process at step S107 of FIG. 13 and executes a process for placing the pertaining object 11 into the placement region 12 in the object placement mode changing process at step S108.

At this time, the user terminal 3 changes the placement mode of the object 11 taking the turn at which the object 11 of the target of the placement operation is placed in a placement region 12 into consideration.

Figure 15A:
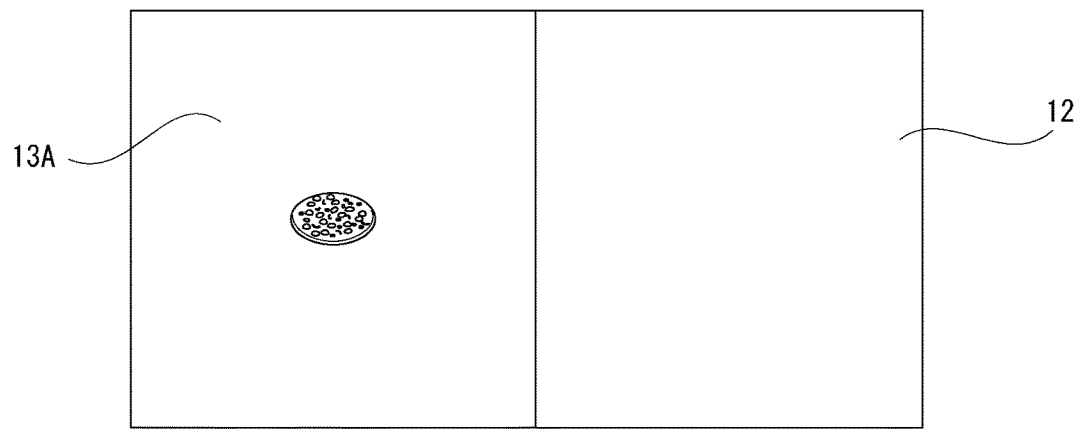
FIG. 15 is a view illustrating an example in which a change of the placement mode is performed taking a placement order of placement icons into consideration.

For example, the object 11A is placed as the first placement icon 13A, which is to be placed into the placement region 12, into the placement region 12 as illustrated in FIG. 15A. In such a case, the user terminal 3 refers to an order history when the object 11A of "pizza" was placed into the placement region 12 as the first placement icon 13A into the placement region 12 from among the order histories corresponding to the user who orders, and decides a placement mode (position, size, shape and so forth) in response to the history of the placement mode of the placement icon 13A and then places the placement icon 13A into the placement region 12.

Figure 15B:
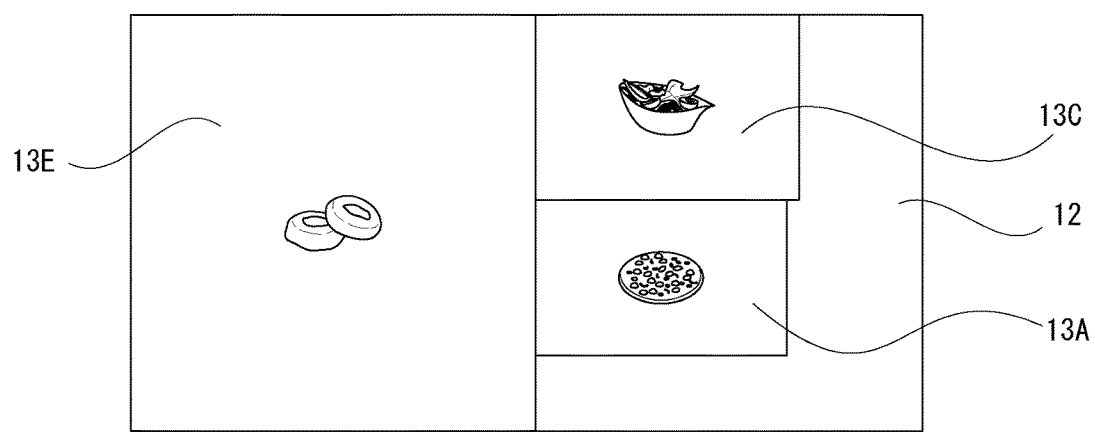

On the other hand, the object 11A is placed as the third placement icon 13A, which is to be placed into the placement region 12, into the placement region 12 as depicted in FIG. 15B. In such a case the user terminal 3 refers to an order history when the object 11A of "pizza" was placed into the placement region 12 as the third placement icon 13A into the placement region 12 from among the order histories corresponding to the user who orders, and decides a placement mode in response to the history of the placement mode of the placement icon 13A and then places the placement icon 13A into the placement region 12.

In particular, a deformation process of each placement icon 13 is performed taking it into consideration that, even if the placed placement icon 13 is the same placement icon 13, the order quantity of the placement icon 13, which is placed as a first icon in sequence and is estimated as a main menu, and the order quantity of the placement icon 13, which is placed as a third icon in sequence and is estimated as a sub menu, are different from each other.

4-8. Process Example 6 Relating to Setting Operation

A process example 6 relating to the setting operation is described with reference to FIG. 13 and FIG. 16.

The description is given of a case in which the user performs a placement operation for placing one of the objects 11 of a search page into the placement region 12.

In this case, the user terminal 3 acquires information relating to the operation in the setting operation acquisition process at step S107 of FIG. 13 and executes a process for placing the object 11 into the placement region 12 in the object placement mode changing process at step S108.

At this time, the user terminal 3 in the present example automatically performs a process for placing also the other objects 11, 11, . . . into the placement region 12.

When a combination of cooking categories ordered at the same time is specified from the order history information of the user and the object 11 relating to a certain cooking category included in the combination of cooking categories is placed into the placement region 12, also the other cooking categories included in the combination of cooking categories (cooking categories except the objects 11 relating to the certain cooking category selected earlier) are automatically placed into the placement region 12 together.

Figure 16A:
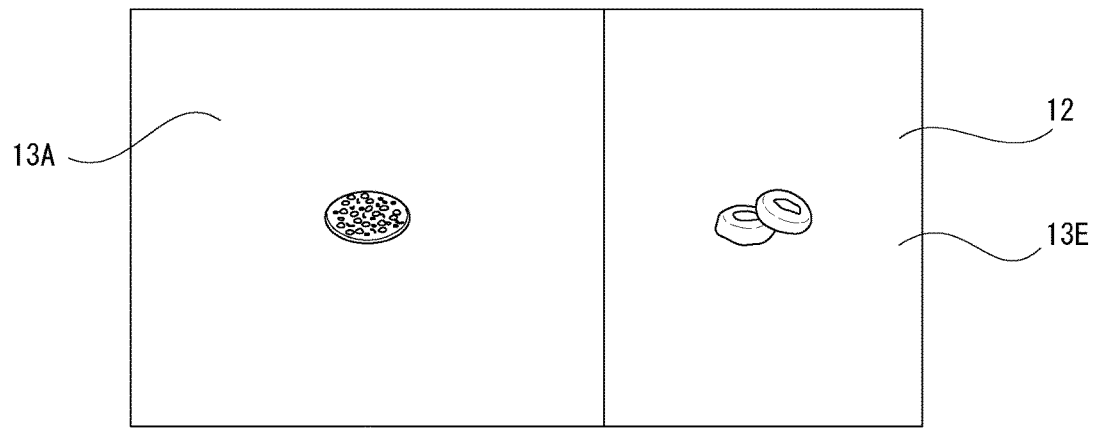
FIG. 16 is a view illustrating an example in which a different placement icon is placed automatically in response to a placement operation of a user.

In particular, if the combination of "pizza" and "doughnut" is specified, then in response to placement of the object 11A relating to the cooking category of "pizza" into the placement region 12 by the user, the user terminal 3 executes a process for placing the object 11E relating to the cooking category of "doughnut" into the placement region 12. That is, the placement region 12 is placed into a state in which the placement icons 13A and 13E are placed therein (FIG. 16A).

Figure 16B:
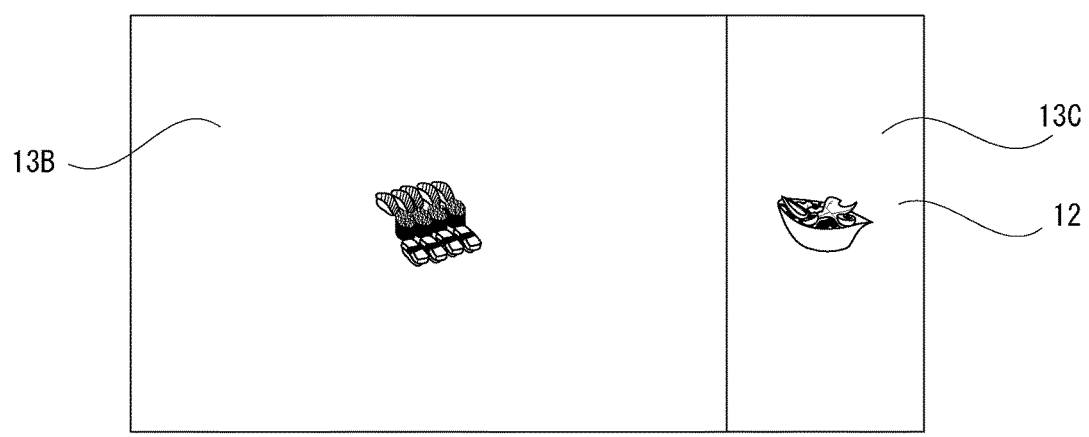

On the other hand, if the combination of "sushi" and "salad" is specified, then in response to placement of the object 11B relating to the cooking category of "sushi" into the placement region 12 by the user, the user terminal 3 executes a process for placing the object 11C relating to the cooking category of "salad" into the placement region 12. In particular, the placement region 12 is placed into a state in which the placement icons 13B and 13C are placed therein (FIG. 16B).

At this time, the user terminal 3 may place, in response to an order history of the user, the pertaining object 11 in a state in which the location at which the object 11 is placed as the placement icon 13 and the size, shape and so forth coincide with those of the object 11 when the object 11 was placed previously.

4-9. Process Example 7 Relating to Setting Operation

A process example 7 relating to the setting operation is described with reference to FIG. 13 and FIG. 17.

The description is given of a case in which a user performs a setting operation for making one of the placement icons 13A, 13C and 13E placed in the placement region 12 of a search page (for example, the placement icon 13A) smaller.

In this case, the user terminal 3 acquires information relating to the operation in the setting operation acquisition process at step S107 of FIG. 13 and executes a process for displaying the placement icon 13A in a reduced scale in the placement region 12 in the object placement mode changing process at step S108.

Further, the user terminal 3 in the present example executes a process for filling up a blank region by automatically enlarging the other placement icons 13C and 13E.

At this time, while the process example 1 relating to the setting operation described above is an example in which the placement icon 13C and the placement icon 13E are displayed in an enlarged scale without changing the ratio between them, in the present example, the placement icon 13C and the placement icon 13E are displayed in an enlarged scale in response to the order history of the user.

For example, a case is supposed in which the ratio in order quantity between the cooking category of "salad" and the cooking category of "doughnut" when the order quantity of the cooking category of "pizza" is greatest and the ratio in order quantity between the cooking category of "pizza" and the order quantity of the cooking category of "salad" when the order quantity of the cooking category of "doughnut" is the greatest are different from each other.

In particular, it is assumed that a result of calculation of a ratio of typical order quantities from the order history of the user indicates that a configuration that the order quantity of the cooking category of "pizza" is 50%; the order quantity of the cooking category of "salad" is 30%; and the order quantity of the cooking category of "doughnut" is 20% and another configuration that the order quantity of the cooking category of "doughnut" is 60%; the order quantity of the cooking category of "pizza" is 20%; and the order quantity of the cooking category of "salad" is 20% are obtained.

Figure 17A:
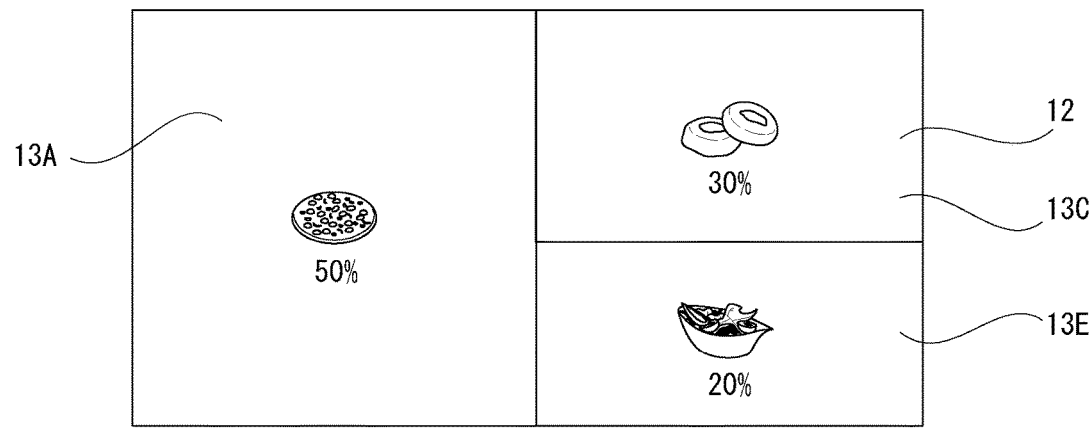
FIG. 17 is a view illustrating an example in which the size of a placement icon is changed in response to an order history of a user.
Figure 17B:
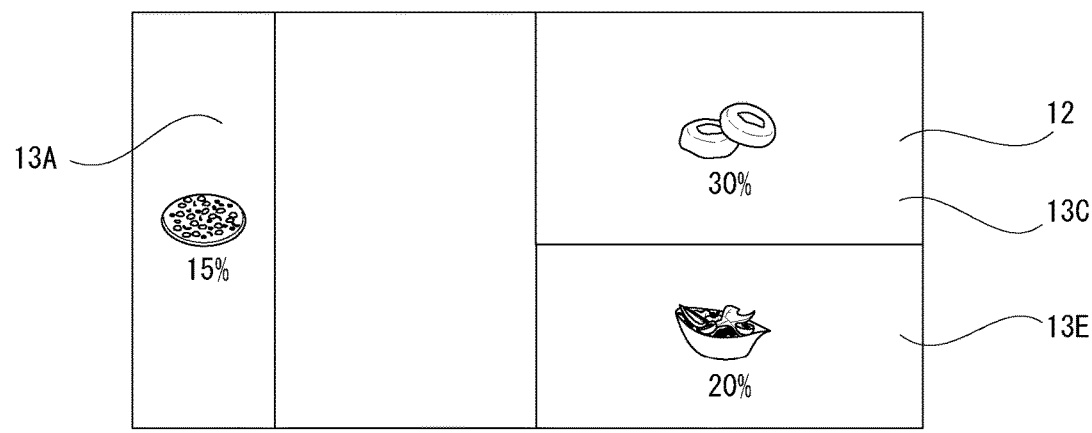
Figure 17C:
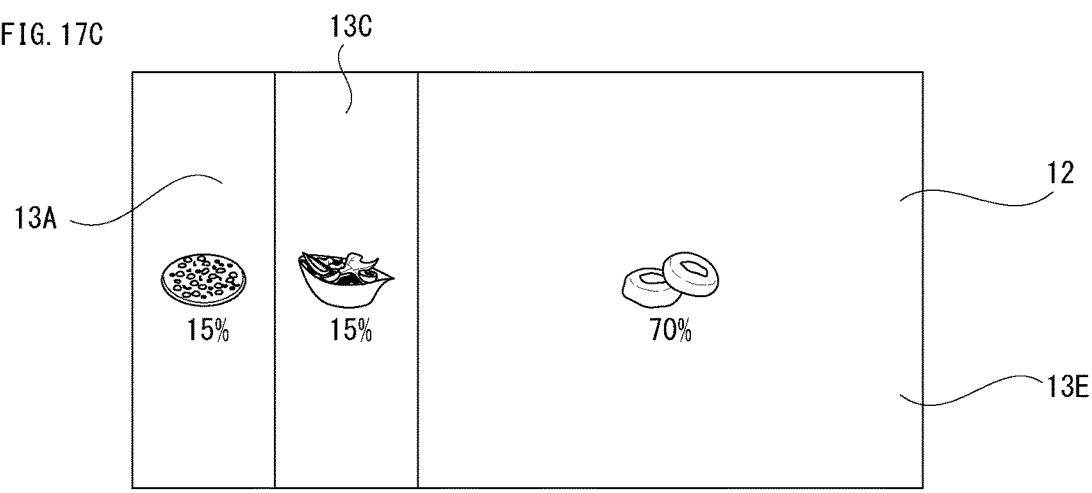

At this time, if the placement mode of the objects is changed from the state in which the order quantity of the cooking category of "pizza" illustrated in FIG. 17A is greatest (pizza=50%; salad=20%; and doughnut=30%) to the state in which the order quantity of the cooking category of "doughnut" illustrated in FIG. 17B is greatest (pizza=15%; salad=20%; and doughnut=30%) in response to an operation of the user, then the user terminal 3 changes the placement mode to a state depicted in FIG. 17C (pizza=15%; salad=15%; and doughnut=70%). That is, in the state in which the order quantity of the cooking category of "doughnut" is greatest, since it has been found that the order quantities of the cooking categories of "pizza" and "salad" are equal to each other, the user terminal 3 executes an object placement mode changing process for setting, in response to decrease of the order quantity of the cooking category of "pizza" to 15%, the order quantity of the cooking category of "salad" to 15% and allocating the remaining 70% to the order quantity of the cooking category of "doughnut."

Further, attention may be paid to a ratio between the placement icons 13 which are not an object of an operation of the user (in this example, the ratio in size of the placement icons 13C and 13E). In particular, since the ratio between the placement icons 13C and 13E calculated from the order history is 1:3, the placement icons 13C and 13E may be placed such that the region of 85% except 15% of the order quantity of the cooking category of "pizza" is divided to 1:3 between the placement icons 13C and 13E.

5. Modifications to First and Second Embodiments 5-1. Modification 1

Figure 18:
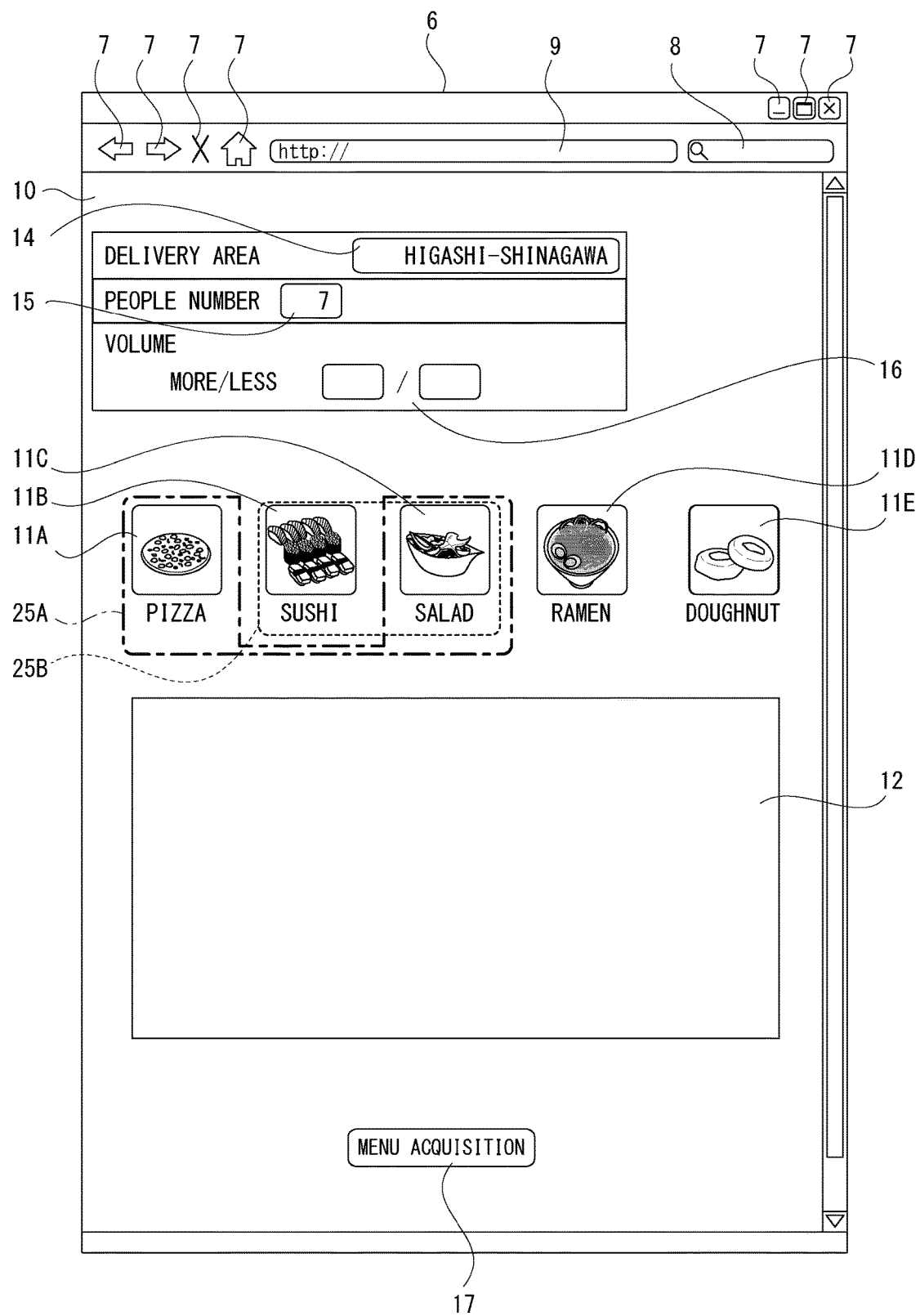
FIG. 18 is a view depicting a search page from which shops available for delivery can be recognized collectively.

In display of the objects 11, 11, 11, . . . in FIG. 3 (namely, the object presentation process at step S104 of FIG. 8), a combination of objects relating to a shop from which they can be delivered collectively may be made identifiable. For example, where a shop A can deliver dishes belonging to the cooking categories of "pizza" and "salad" and another shop B can deliver dishes belonging to the cooking categories of "sushi" and "salad," the objects 11A and 11C relating to the cooking categories of "pizza" and "salad" are surrounded collectively by an enclosing line 25A as depicted in FIG. 18. Further, the objects 11B and 11C relating to the cooking categories of "sushi" and "salad" are surrounded collectively by another enclosing line 25B.

Furthermore, objects 11, 11, . . . relating to a shop which can deliver them collectively may also be surrounded by a frame of a same color or a same shape. Further, the color or the font of characters placed below an object 11 may be changed for the objects 11, 11, . . . relating to a shop which can deliver them collectively.

5-2. Modification 2

In the foregoing description of the order people number information acquisition process at step S105 of FIG. 8, information inputted to the volume information input field 16 of FIG. 3 is not mentioned. However, this information may be used to calculate correction order people number information. For example, when in FIG. 3, 3 is inputted as the people number for "more" and 1 is inputted as the people number for "less" inputted among the 7 of order people number the correction order people number 8.3 (details are described in the foregoing description of the order people number information acquisition unit 1e) is calculated.

Figure 19:
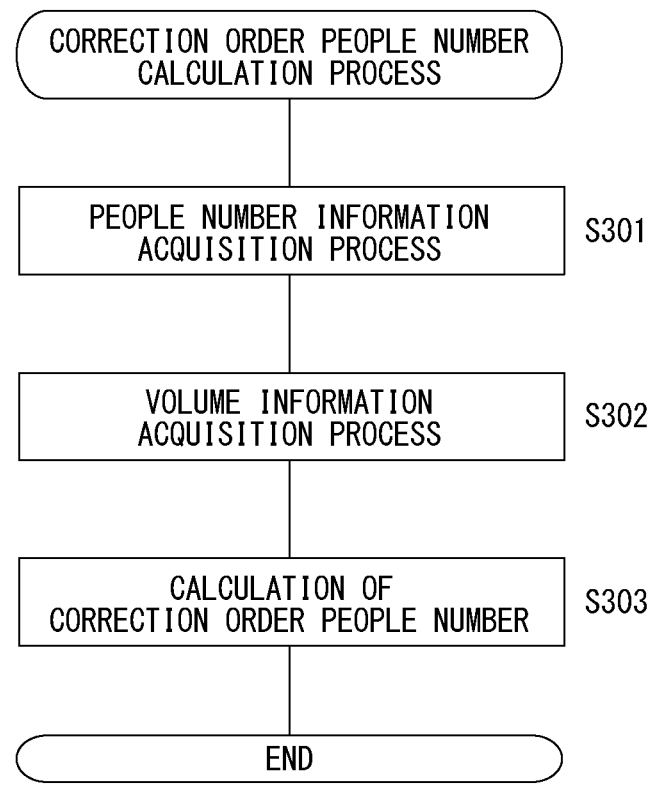
FIG. 19 is a flow chart of a correction order people number calculation process.

A specific process is illustrated in FIG. 19.

Each process in FIG. 19 is executed every time the numerical value inputted to the people number input field 15 or the volume information input field 16 of FIG. 3 changes.

First at step S301, the user terminal 3 acquires people number information inputted to the people number input field 15. This process may be a process similar to the process at step S105 of FIG. 8.

Then at step S302, the user terminal 3 acquires volume information inputted to the volume information input field 16.

Thereafter, the user terminal 3 calculates a correction order people number at step S303.

When the correction order people number calculation process is executed, in the order quantity specification process at step S109 of FIG. 8, specification of an order quantity based on the correction order people number information is executed.

5-3. Modification 3

In the description of a modification 3, an example in which search for a dish (menu) is performed with a margin provided to an order quantity for each cooking category is described.

The description is given of a case in which, in the state of the search page of FIG. 9, the user performs an operation for providing a margin to the order quantity for the cooking category of "pizza."

Figure 20:
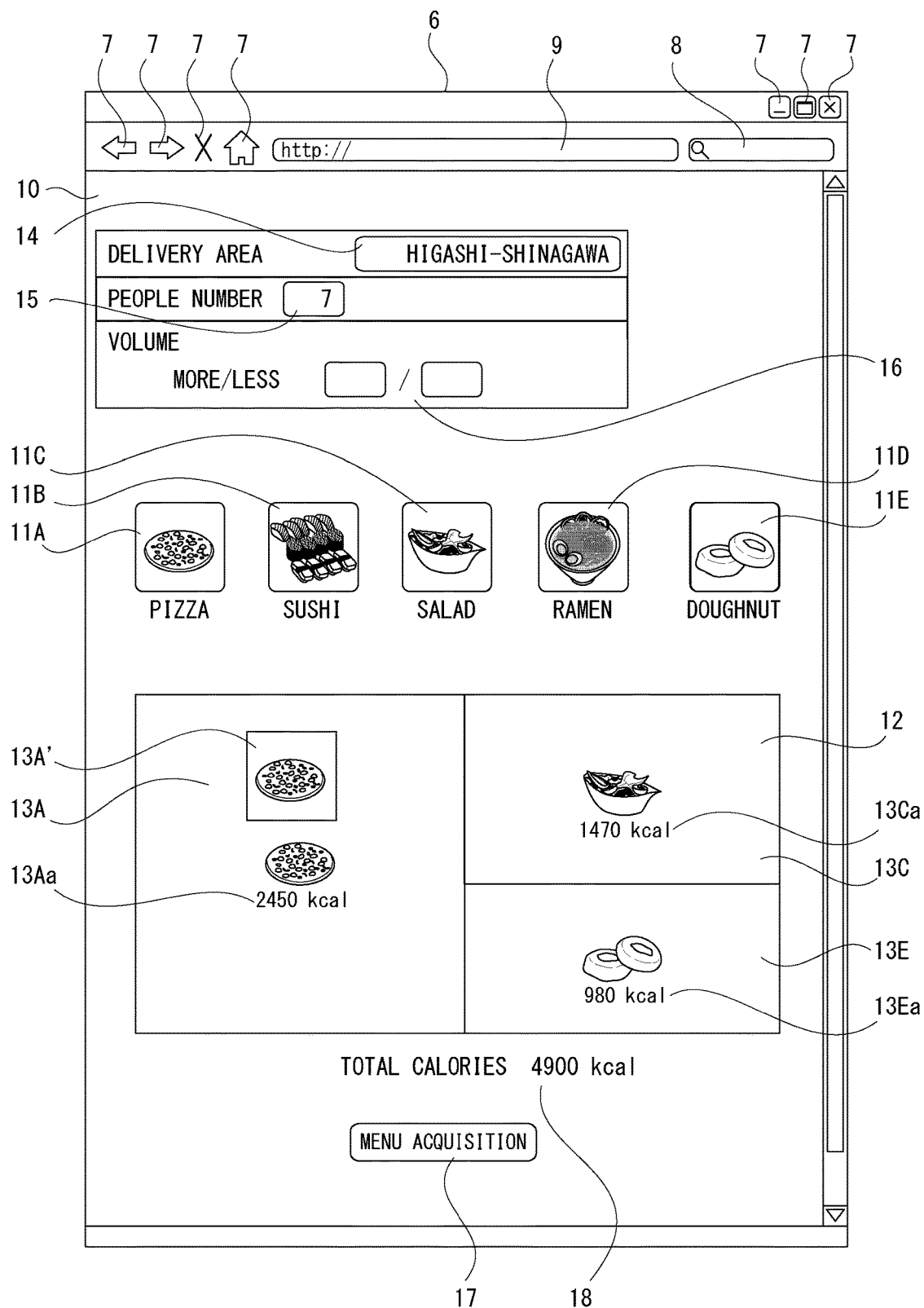
FIG. 20 is a view depicting an example of a search page when an order is issued with a margin provided to an order quantity for each cooking category.

In the state of the search page depicted in FIG. 9, the user would perform an operation for placing the object 11A relating to the cooking category of "pizza" on the placement icon 13A relating to the cooking category of "pizza" so as to overlap with each other. The overlapping placement icon is denoted by 13A' (FIG. 20).

Then, the user would perform an operation for changing the size of the placement icon 13A'. In response to this operation, the user terminal 3 performs the processes at steps S107 and S108 described hereinabove to execute a process for causing the placement icon 13A' to be displayed in an enlarged scale (FIG. 21).

Figure 21:
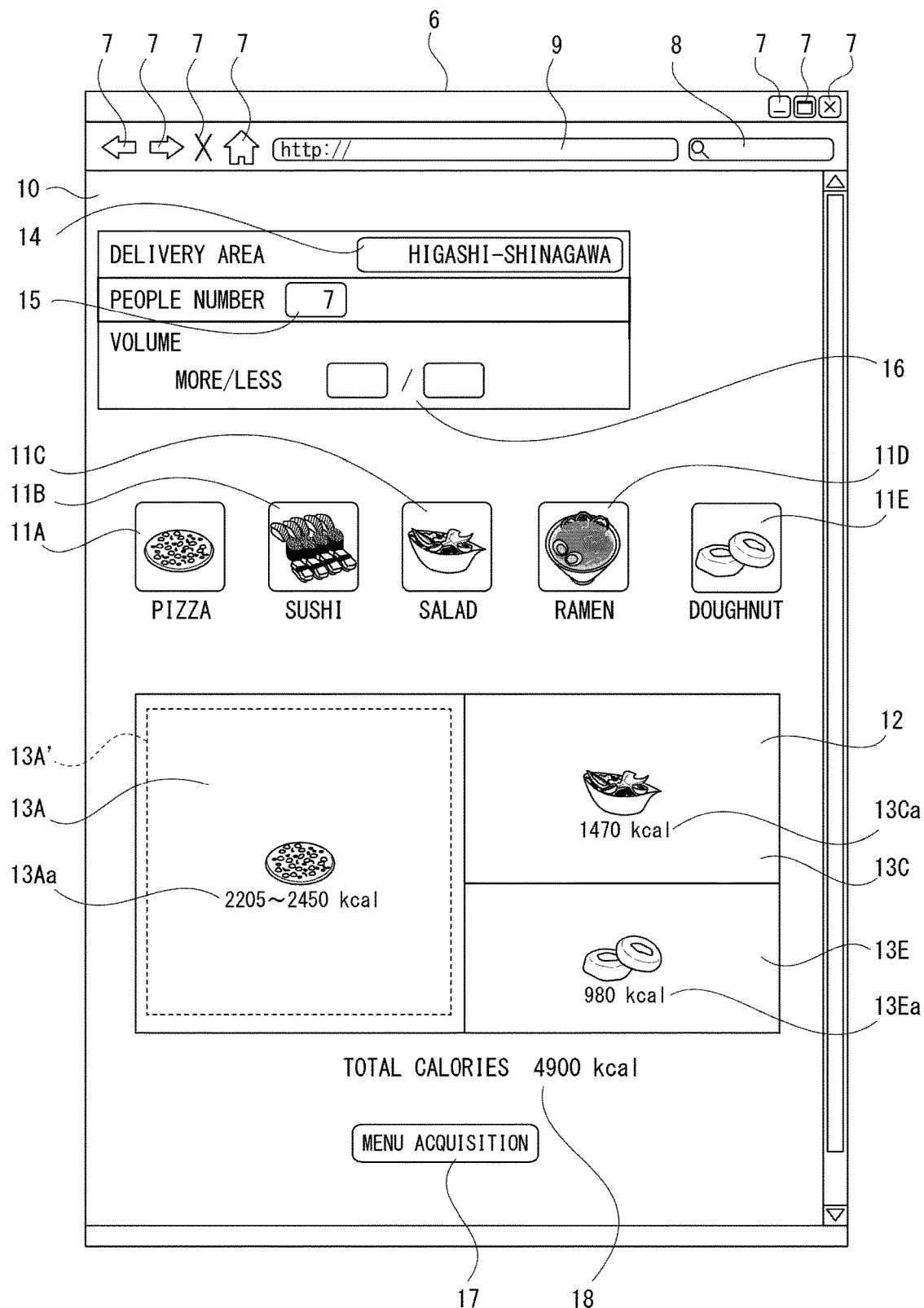
FIG. 21 is a view depicting another example of a search page when an order is issued with a margin provided to an order quantity for each cooking category.

At this time, an outer frame of the placement icon 13A' may be indicated by a broken line or the like so as to facilitate recognition by the user (FIG. 21). Further, a lower limit value (2205 kcal) to the order quantity calculated from the size of the placement icon 13A' (size occupying 45% of the placement region 12) may be indicated as order quantity information 13Aa as depicted in FIG. 21.

Where a lower limit value and an upper limit value are set to provide a margin to the order quantity of a cooking category in such a manner as in the present modification, the number of types of dishes as a search result to be presented to the user can be increased.

Furthermore, the order quantity of shortage arising from the fact that the order quantity is smaller than the upper limit value may be compensated for by increasing the order quantity of a different cooking category. Naturally, the order quantity of the different cooking category may not be changed.

5-4. Modification 4

In the description of a modification 4, another example in which search for a dish (menu) is performed with a margin provided to an order quantity for each cooking category is described.

In the present modification, although the search page when an upper limit value and a lower limit value to the order quantity of a cooking category are set does not vary from that of FIG. 21, the operation method of the user until a display state of the search page is established differs. Here, the description is given of an example in which an upper limit value and a lower limit value to an order quantity are set by operating a predetermined place on the display screen of the user terminal 3 with a finger.

Figure 22:
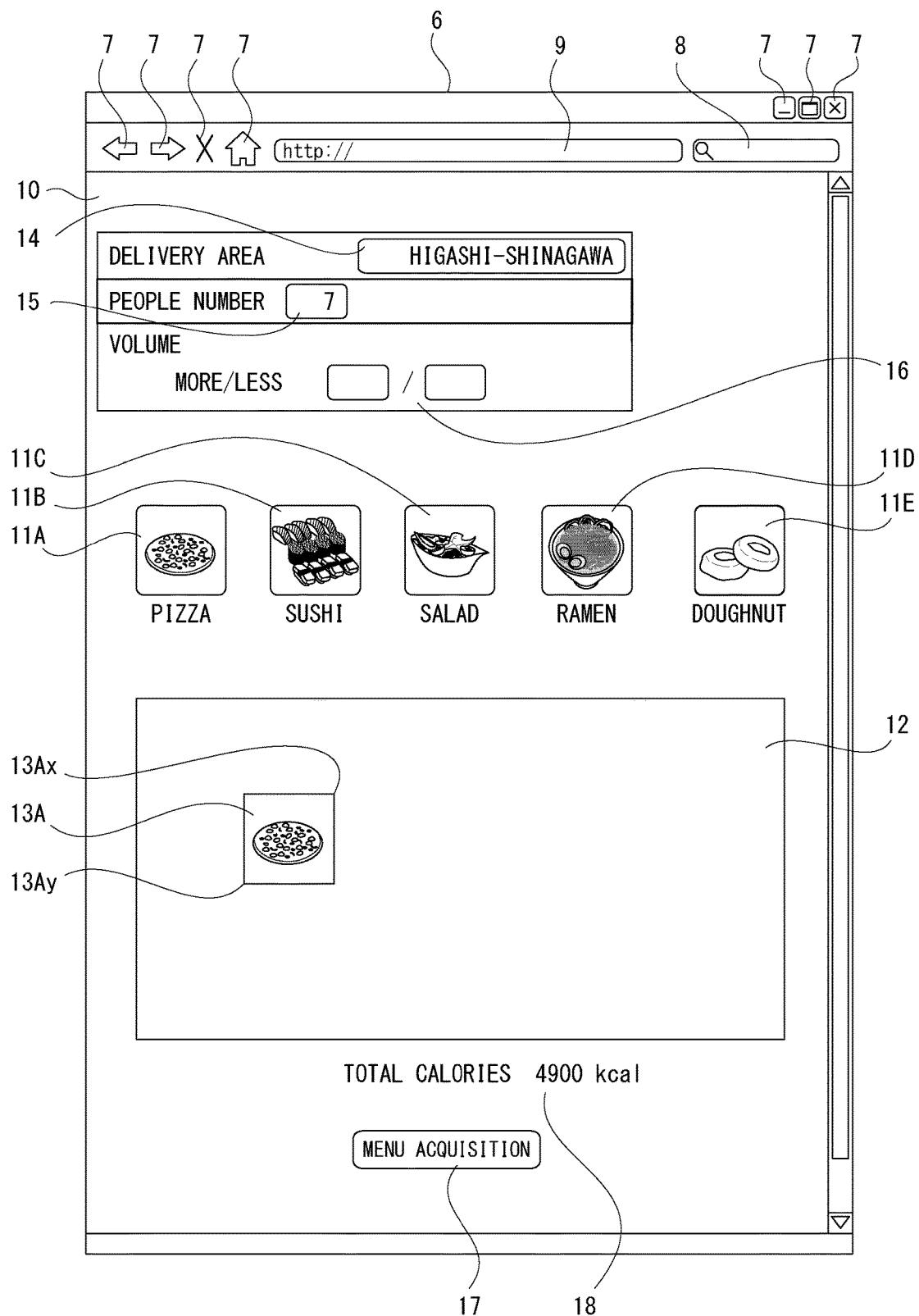
FIG. 22 is a view illustrating an example of an operation when an order is issued with a margin provided to an order quantity for each cooking category.

For example, the user would place the placement icon 13A by dragging the object 11A relating to the cooking category of "pizza" into the placement region 12 as depicted in FIG. 22.

Then, the user would place the middle finger and the thumb thereof into contact, for example, with the positions of a right upper corner 13Ax and a left lower corner 13Ay of the placement icon 13A and slidably move the middle finger and the thumb in directions in which they are spaced away from each other on the screen. Consequently, a state illustrated in FIG. 23 in which the placement icon 13A is enlarged is established.

Figure 23:
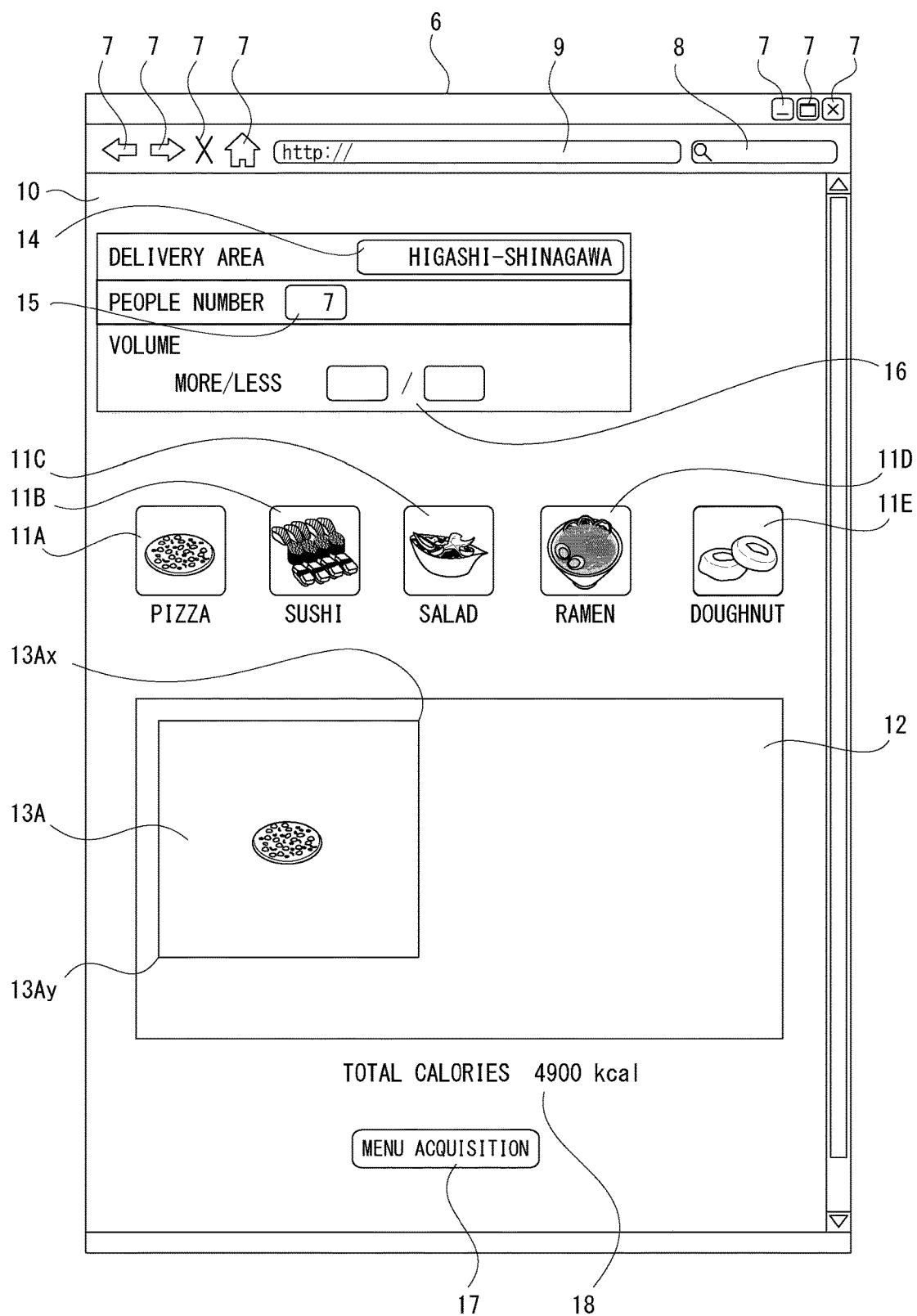
FIG. 23 is a view illustrating an example of an operation when an order is issued with a margin provided to an order quantity for each cooking category.
Figure 24:
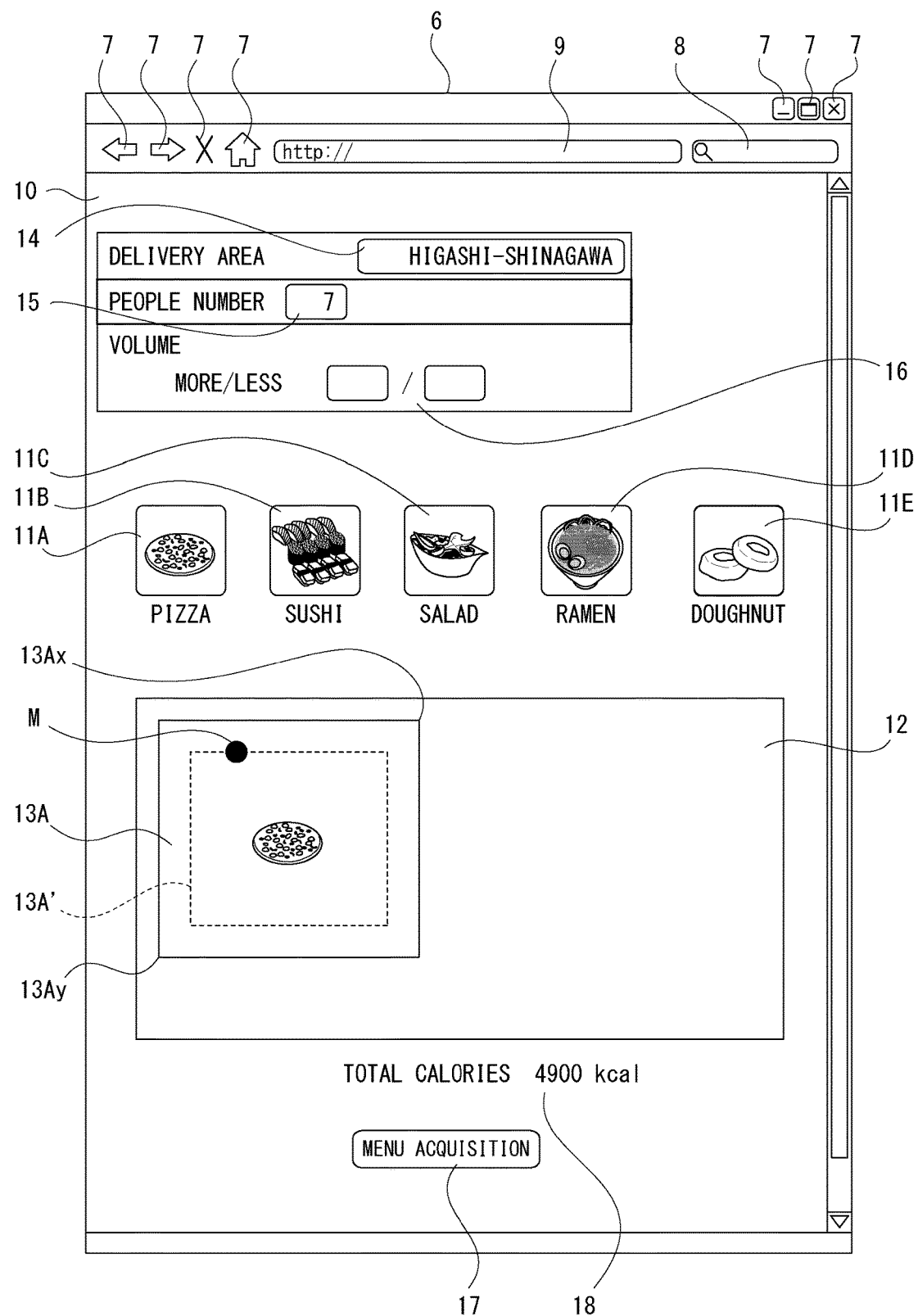
FIG. 24 is a view illustrating an example of an operation when an order is issued with a margin provided to an order quantity for each cooking category.

In the state of FIG. 23, the user would perform an operation for placing the forefinger thereof into contact with any position within the region of the placement icon 13A while the thumb and the middle finger are kept contact with the screen. In FIG. 24, it is assumed that the forefinger is placed into contact with a point M.

When the user terminal 3 detects this operation, it displays a placement icon 13A' which passes the point M and besides has a frame (indicated by a broken line in FIG. 24) slightly smaller than the placement icon 13A in the placement region 12.

By this, an upper limit value and a lower limit value to the order quantity of the cooking category of "pizza" can be set by simple and easy operations.

Further, while the foregoing description relates to an example in which the inside of the region of the placement icon 13A is touched by the forefinger to set a lower limit value, an upper limit value may be set by touching an outside of the region of the placement icon 13A with the forefinger. In this case, the placement icon 13A indicates the lower limit value.

Furthermore, the fingers to be used in the present example may be any fingers, or a tool such as a touch pen other than the fingers may be used.

5-5. Modification 5

In the description of a modification 5, a further example in which search for a dish is performed with a margin provided to an order quantity for each cooking category is described.

The search page when an upper limit value and a lower limit value to an order quantity for a cooking category are set is same as that of FIG. 21 described hereinabove. The present modification is different from the modification 4 described hereinabove in the operation method of the user when an upper limit value and a lower limit value to an order quantity are set.

Here, an example wherein the display screen of the user terminal 3 is operated at predetermined locations by figures to set an upper limit value and a lower limit value to an order quantity is described.

In the present modification, an operation for expanding the placement icon 13A until the size of the placement icon 13A exhibits such a state as depicted in FIG. 23 is performed by operating the placement icon 13A depicted in FIG. 22 with a middle finger and the thumb.

Further, in the present modification, in the course of this operation (namely, during the operation for slidably moving the thumb and the middle finger in directions away from each other on the screen), an operation for touching the screen with the forefinger is performed twice. That is, from a first state in which the two fingers (thumb and middle finger) touch the screen, a second state in which the three fingers (thumb, middle finger and forefinger) touch the screen is reached. Then, a third state in which one finger (forefinger) is spaced away from the screen and the remaining two fingers (thumb and middle finger) remain touching with the screen from the first state is established, and finally, a fourth state in which the three fingers (thumb, middle finger and forefinger) touch the screen is established. During the transition in state, the two fingers including the thumb and the middle finger keep the state in which they always touch the screen.

In this process, the user terminal 3 acquires a shape of a placement icon 13A'' (indicated by a broken line in FIG. 25) designated by the thumb and the middle finger when the second state in which the three fingers touch the screen is established and a shape of a placement icon 13A''' (indicated by a solid line in FIG. 25) designated by the thumb and the middle finger when the fourth state in which the three fingers similarly touch the screen is established.

Figure 25:
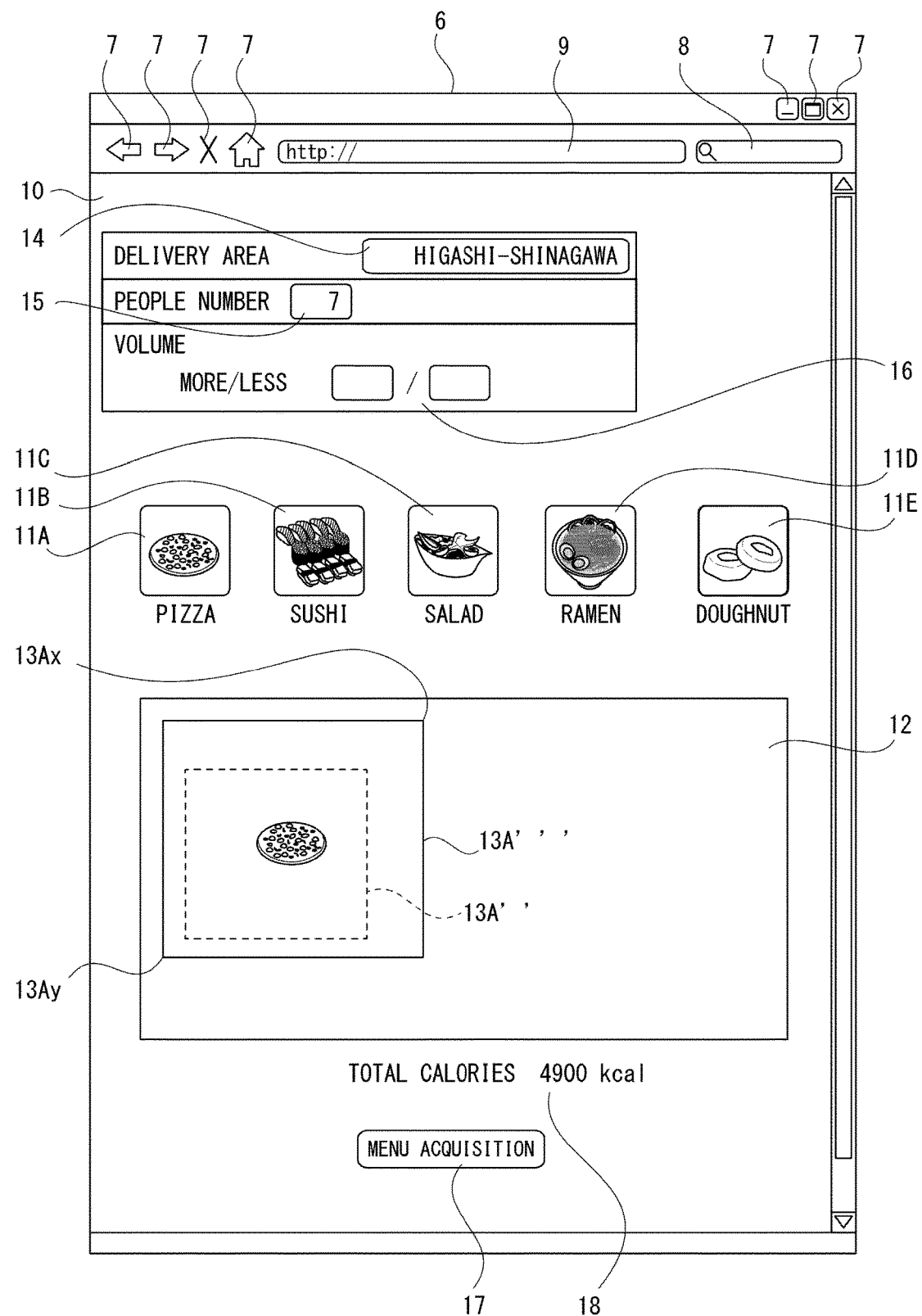
FIG. 25 is a view illustrating another example of an operation when an order is issued with a margin provided to an order quantity for each cooking category.

Then, the user terminal 3 compares the placement icon 13A'' and the placement icon 13A''' with each other in size (magnitude of the area), and sets an upper limit value to the order quantity on the basis of the area of the placement icon 13 having a relatively large area (in FIG. 25, the placement icon 13A'''). Meanwhile, the user terminal sets a lower limit value to the order quantity on the basis of the area of the placement icon 13 having a relatively small area (in FIG. 25, the placement icon 13A'').

Consequently, an upper limit value and a lower limit value to an order quantity for the cooking category of "pizza" can be set by simple operations.

Further, although an example wherein an upper limit value and a lower limit value to an order quantity are set in the course of expansion of the placement icon 13 is described above, an upper limit value and a lower limit value to an order quantity may be set in the course of reduction of the placement icon 13 in size. An upper limit value and a lower limit value to an order quantity may also be set in the course of repetitions of expansion and reduction of a placement icon 13.

Furthermore, if, after the transition from the first state to the third state described hereinabove, one of the thumb and the middle finger is spaced away from the screen before the forefinger is placed into a state in which it touches the screen again, then the state at the instant at which the thumb or the middle finger is spaced away from the screen is assumed as the fourth state (however, this state is a state in which only the two fingers touch the screen). At this time, the placement icon 13A''' indicates a shape (size) designated by the two touching fingers.

Further, the fingers to be used in the present example may be any fingers, or a tool other than the fingers such as a touch pen may be used.

6. Summary of First and Second Embodiments

The modifications and the process examples described above can be applied suitably not only to the first and second embodiments but also to third and fourth embodiments hereinafter described.

The delivery system 1 which includes the delivery server 2 and the user terminal 3, the system includes an object presentation unit 1a for presenting the object 11 corresponding to each of a plurality of cooking categories on the user terminal 3, the placement region setting unit 1b for setting the placement region 12, in which the object 11 is to be placed, on a display unit of the user terminal 3, and the object placement mode changing unit 1c for accepting a setting operation for the placement icon 13 as the object 11 placed in the placement region 12 and making a change to a placement mode of the placement icon 13. The system further includes the delivery destination area information acquisition unit 1d for acquiring delivery distribution area information, the order people number information acquisition unit 1e for acquiring order people number information, the order quantity specification unit 1f for specifying an order quantity for each cooking category in response to a ratio of the placement con 13 occupying the placement region 12 and the order people number information, and the presentation unit 1g for acquiring a dish in accordance with the specified order quantity and the delivery area information from the menu DB 52 and presenting the dish on the user terminal 3.

At a preceding stage before a dish to be an order target is decided, that is, also when only a cooking category is decided (for example, a state in which only it is decided to order a "pizza" but what pizza is to be ordered is not decided), an order quantity for each cooking category is presented to the user.

Accordingly, an order quantity for each cooking category can be grasped.

Further, since valuable information is presented efficiently in a limited presentation region (for example, of a monitor or the like) of a user terminal 3 utilized by a user, resources of the user terminal 3 can be utilized effectively.

As described hereinabove in connection with step S104 of FIG. 8, in presentation of the object 11, only the object 11 corresponding to delivery destination area information is presented in a state in which it can be a target of a setting operation.

Consequently, the objects 11 relating to products which cannot be delivered to the delivery destination area are not presented in a state in which a setting operation thereof is permitted.

In particular, since only a placement operation for an object 11 which can be delivered in the delivery destination area, it is easy for the user to grasp a target of a setting operation, and the burden on the user can be reduced.

As described hereinabove in connection with the modification 1, the object presentation unit 1a identifiably presents a combination of objects 11 relating to a shop which is capable of delivering them collectively.

Consequently, a combination of shops which can deliver at a time can be identified by the user.

Accordingly, the delivery efficiency on the shop side can be raised and the convenience to the user can be anticipated.

As described hereinabove in connection with the process example 4 relating to a setting operation, the object placement mode changing unit 1c performs changing of an object 11 (placement icon 13) on the basis of an order quantity estimated using an order history of the ordering user.

In particular, in response to an order history of the user, changing of each placement icons 13 placed in the placement region 12 (for example, deformation in shape) is performed automatically.

Consequently, the labor for inputting of the user can be saved.

As described hereinabove in connection with the process example 5 relating to a setting operation, the object placement mode changing unit 1c performs changing of an object 11 (placement icon 13) on the basis of an order quantity estimated using from among one or more order histories, the order history in which at least part of a placement sequence of each object 11 is same.

An order quantity of a cooking category relating to each object 11 (placement icon 13) sometimes differs depending upon the placement sequence of the object 11. For example, an object 11 selected first is likely to be a product the user wants to eat most.

In such a case as just described, the order quantity of each cooking category is estimated from an order history in which the placement sequence is same as that of the objects 11 (placement icons 13) the user tries to order at present.

Accordingly, the estimated taste of the user is reflected on the placement mode of the placement icons 13.

Consequently, the labor for inputting of the user can be omitted.

As described hereinabove in connection with the process example 6 relating to the setting operation, when an object 11 is placed as a placement icon 13 in the placement region 12, the object placement mode changing unit 1c estimates another object 11 to be added to the placement region 12 in response to the estimated order quantity and places the other object 11 as placement icon 13 in the placement region 12.

Before the user performs an operation for placing the other object 11, the object 11 are placed as placement icon 13 into the placement region 12.

In other words, the labor for an input of the user can be omitted.

As described hereinabove in connection with the process example 7 relating to the setting operation, when the object placement mode changing unit 1c accepts a setting operation for changing the placement mode of one placement icon 13 from among a plurality of placement icons 13 placed in the placement region 12, the object placement mode changing unit 1c changes the placement mode of the remaining placement icons 13 in response to the estimated order quantity.

Consequently, in response to a changing operation performed for one placement icon 13 by the user, the other placement icons 13 are changed automatically as well.

Accordingly, the labor for an input of the user can be omitted.

As described hereinabove in connection with the modification 3, the object placement mode changing unit 1c accepts, as a setting operation for setting both of an upper limit value and a lower limit value to the ratio of the placement icon 13 occupying the placement region 12, an operation for placing same placement icons 13 on one another in an overlapping relationship with each other in the placement region 12.

Even where a strict order quantity is not decided for each cooking category, the user can decide the placement mode of each placement icon 13 in response to an approximate order quantity. The operation to be performed by the user at this time is an operation for placing different ones of the same placement icon 13 having different sizes from each other in an overlapping relationship with each other.

Consequently, an approximate order in which an order quantity has some margin can be performed by a simple operation.

As described hereinabove in connection with the modification 4 and the modification 5, the object placement mode changing unit 1c acquires range information of the ratio of the placement icon 13 occupying the placement region 12 from the sizes of the two different placement icons 13A and 13A' set by two contact points detected on the display screen of the user terminal 3 and the third contact detected additionally.

Even where a precise order quantity is not decided for each cooking category, the user can decide a placement mode for each placement icon 13 in response to a rough order quantity. At this time, the operation to be performed by the user is, for example, an operation for causing three fingers to touch at extremities thereof with the screen to perform range designation. That is, the operation is simple and operable with one hand.

Accordingly, a rough order in which an order quantity has some margin can be performed by a simple operation.

As described hereinabove in connection with the modification 2, the order quantity specification unit 1f calculates correction order people number information by correction of the order people number information using an order history of an ordering user and specifies an order quantity using the correction order people number information.

Consequently, an order quantity is corrected automatically in response to an order history of the user. In particular, since an order quantity with the taste of the user taken into consideration is set, the labor for an input of the user can be omitted.

7. Different Example of Flow of Processing

7-1. Flow of Third Embodiment

In regard to a third embodiment, a case in which dishes for one serving are ordered is described with reference to FIG. 26. It is to be noted that, in regard to the third embodiment and a fourth embodiment hereinafter described, an example in which allocation quantities for individuals are presented to a user before ordering is performed. The user can decide whether or not the order quantities are to be changed by confirming the allocation quantities.

First at step S401, the user terminal 3 transmits an order request including a user ID as identification information of the ordering user and a menu ID as identification information of a dish to be ordered to the delivery server 2.

This process is executed, for example, by selecting an arbitrary dish from a deliverable dish table searched out from a search page and depressing the order button. The search page may be a search page as described hereinabove in connection with the first or second embodiment or a search page from which dishes deliverable to a delivery destination designated by the user on the basis of merely on a search keyword can be searched in table.

The delivery server 2 receiving the order request executes, at step S501, a process for acquiring order menu information from the menu DB 52 on the basis of the menu ID included in the order request.

By the process, the delivery server 2 acquires quantity information (information of calorie or weight), nutrient information (information of content of salt, sugar content, fat and so forth), foodstuff information and so forth as the order menu information. Further, all of the mentioned information may not necessarily be acquired and information to be acquired may be selected in accordance with the user.

Then at step S502, the delivery server 2 executes a process for acquiring restriction information of the user, information of a browsing history of the user and so forth as user information.

The restriction information of the user is information of foodstuff which cannot be taken in by the user, a nutrient whose intake is limited (or restricted) or foodstuff the user dislikes, and is information unique to the ordering user.

Such user information may be acquired from the user DB 50, or restriction information which was set upon ordering in the past may be acquired from an order history. In this case, the information is acquired on the basis of the user ID.

Further, as the user information, information inputted on a search page or an order page by the user may be acquired. For example, information selected by the user from among prepared choices such as "diabetes," "high blood pressure" or "on a diet," or information such as "salt not more than 2 g" may be inputted directly by the user. In this case, since the user ID is unnecessary, the order request received at step S401 may not include identification information of the ordering user.

Then at step S503, the delivery server 2 executes a process of acquiring a restriction condition. The restriction condition is acquired from the restriction information described above. For example, from the restriction information of "salt not more than 2 g," the conditions of "salt" and "not more than 2 g" are acquired. Further, from such information as "diabetes" selected by the user, a combination of a nutrient which may be taken in by the user who suffers from diabetes and an upper limit to the nutrient (or a nutrient which must not be taken in) is acquired as a restriction condition from a database.

Then at step S504, the delivery server 2 acquires a demand condition of the user. The demand condition is, for example, quantity information of an order menu for allowing the user to satisfy or the like. The demand condition is hereinafter referred to as satisfaction condition.

The quantity information is a numerical value targeting intake calorie or weight, or the like. Accordingly, the satisfaction condition is a condition for a quantity such as, for example, "weight 1.2 times" or "calories half"

The conditions mentioned may be acquired from the user DB 50, or satisfaction information set upon ordering in the past may be acquired from an order history. Information inputted or selected on a search page or an order page by the user may also be acquired. Further, the conditions may be acquired in response to an order history of a different user who has ordered the same order menu till then.

Then at step S505, the delivery server 2 executes a process for setting an allocation quantity to the user for each order menu.

In the present example in which dishes for one person are ordered, an allocation quantity (namely, a quantity which may be eaten) to the ordering user is set for each order menu.

As regards the allocation quantity setting process, several examples are hereinafter described.

Then at step S506, the delivery server 2 executes a process for presenting the allocation quantity for each order menu set by the process described above.

By this process, the allocation quantity information for each order menu is transmitted to the user terminal 3, and the information is displayed on the user terminal 3.

Figure 27:
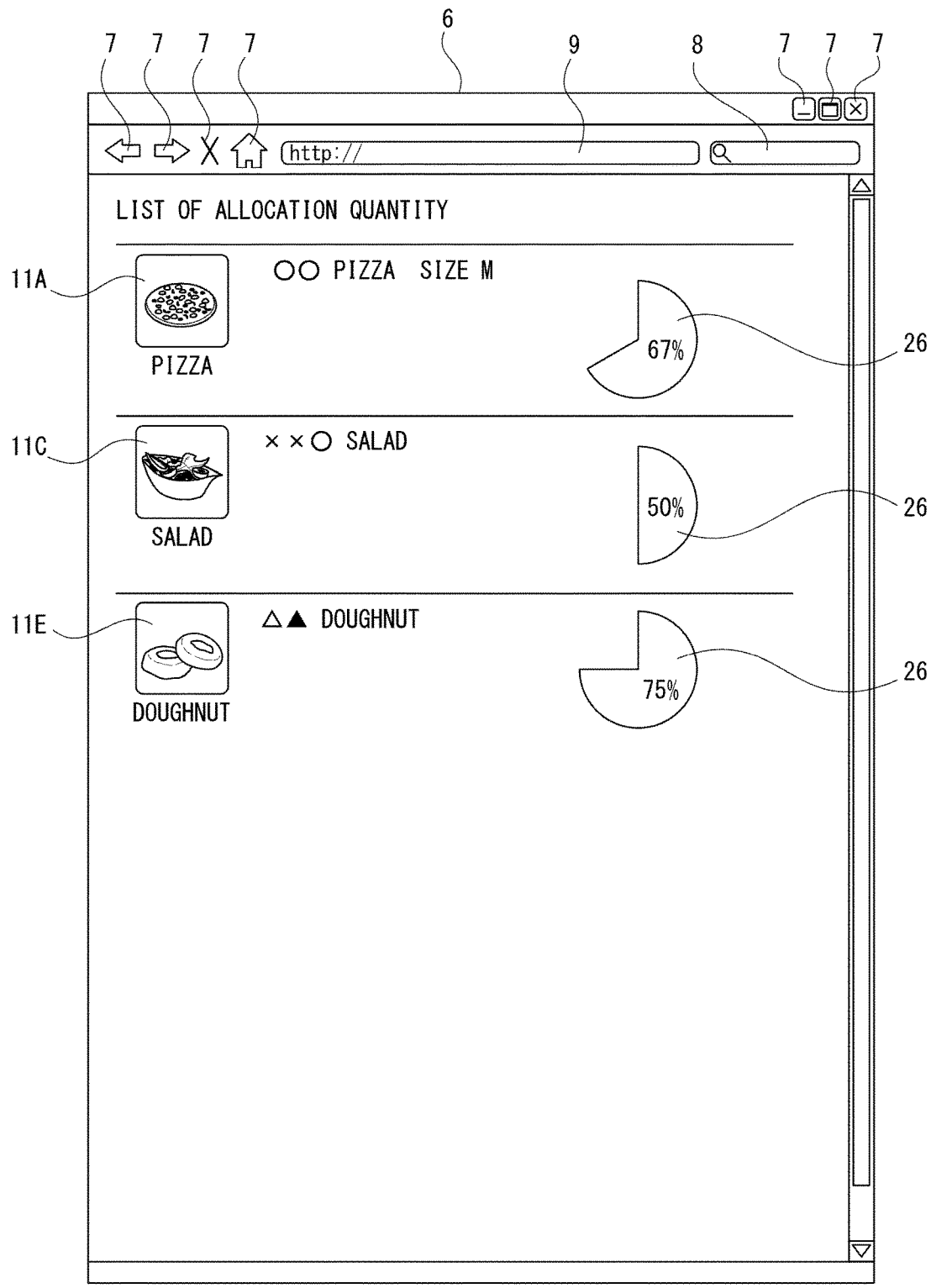
FIG. 27 is a view depicting an example of an allocation quantity presentation page.

An example of an allocation quantity presentation page on which an allocation quantity is presented is depicted in FIG. 27.

On the allocation quantity presentation page, a quantity which may be taken in by the user is presented as an allocation quantity for each order menu selected by the user. For example, for an order menu of "○○ pizza M size," an allocation quantity displaying icon 26 indicative of an allocation quantity of 67% is displayed; for an order menu of "xx○ salad," an allocation quantity displaying icon 26 indicative of an allocation quantity of 50% is displayed; and for an order menu of "△▲ doughnut," an allocation quantity displaying icon 26 indicative of an allocation quantity of 75% is displayed.

After the process at step S506, though not depicted, the user who confirms the order menu and the allocation quantity information would perform an operation for finally confirming the order at a favorable timing. Consequently, ordering of the dishes to the shops is performed actually.

7-2. Example of Satisfaction Condition Acquisition Process

Another example of the satisfaction condition acquisition process described hereinabove in connection with step S504 is described with reference to a flow chart of FIG. 28. The present example is an example in which a satisfaction condition in a current order is estimated from the difference between an order history and the current order of a user. Further, a satisfaction condition of at least an ordering user who actually performs ordering is estimated from among users relating to the order. In addition, a satisfaction condition relating to other users who relate to the order may be estimated.

First at step S601, the delivery server 2 specifies an order history similar to a current order from among order histories acquired at preceding step S502. The similar order is, for example, an order common in cooking category (for example, "pizza," "sushi" or the like) or an order common in shop.

Then at step S602, the delivery server 2 executes a process for extracting the difference between the specified order history and the current order history. The difference extracted is a difference in quantity information.

Then at step S603, the delivery server 2 executes a process for estimating a satisfaction condition in the current order from the satisfaction condition and difference information of the specified order history.

For example, if it is assumed that, while, in the specified order history, the total calories of the ordered dishes are 1000 kcal for one serving (an average for one serving is 700 kcal) and the satisfaction condition is "more," in the current order, the total calories are 500 kcal for one serving, then it is estimated that the satisfaction condition in the current order is "less."

Figure 28:
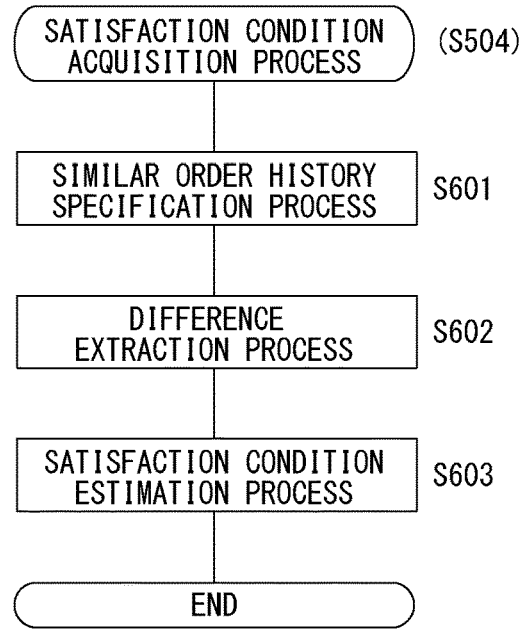
FIG. 28 is a flow chart illustrating an example of a satisfaction condition acquisition process.

The satisfaction condition estimated by executing the series or processes of FIG. 28 is acquired as a satisfaction condition in the current order.

7-3. First Example of Allocation Quantity Setting Process

The first example of the allocation quantity setting process (step S505 of FIG. 26) is an example in which priority degrees are applied to order menus and a greater allocation quantity is allocated to an order menu having a high priority degree.

Figure 29:
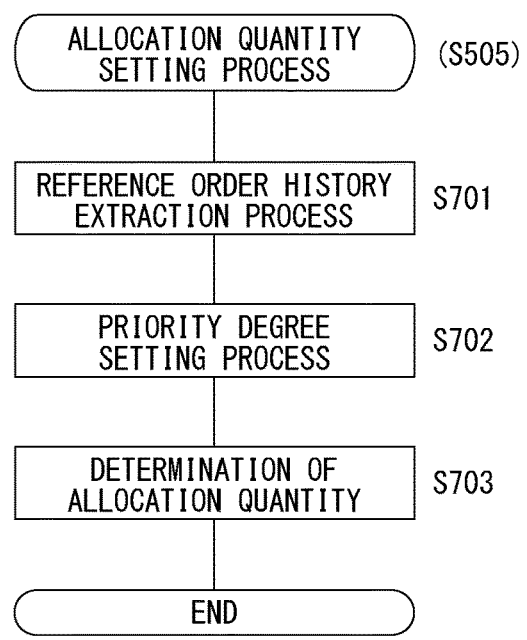
FIG. 29 is a flow chart illustrating an example of an allocation quantity setting process.

An example of a flow of particular processing is illustrated in FIG. 29.

At step S701, the delivery server 2 executes a process for extracting an order history which is to be used as a reference for applying a priority degree from the order histories acquired at step S502 described hereinabove.

The order history to be used as a reference is, for example, an order history which is same in configuration of products as the current order, an order history which is same in configuration of cooking categories, an order history to the same shop or the like.

Further the priority degree between order menus may be inputted by the user.

Then at step S702, the delivery server 2 executes a process for setting a priority degree to each order menu. As the priority degree, a high value is set, for example, to an order menu of a great order quantity in the order history for reference, an order menu which appears frequently in order histories, an order menu whose order frequency is relatively high or the like.

Finally at step S703, the delivery server 2 executes a process for deciding an allocation quantity. To be noted, what is decided by this process is an allocation quantity but not an order quantity. An allocation quantity is set on the basis of priority degrees of the order menus set in the preceding process. In particular, a greater allocation quantity is set for a menu of a high priority degree.

Figure 26:
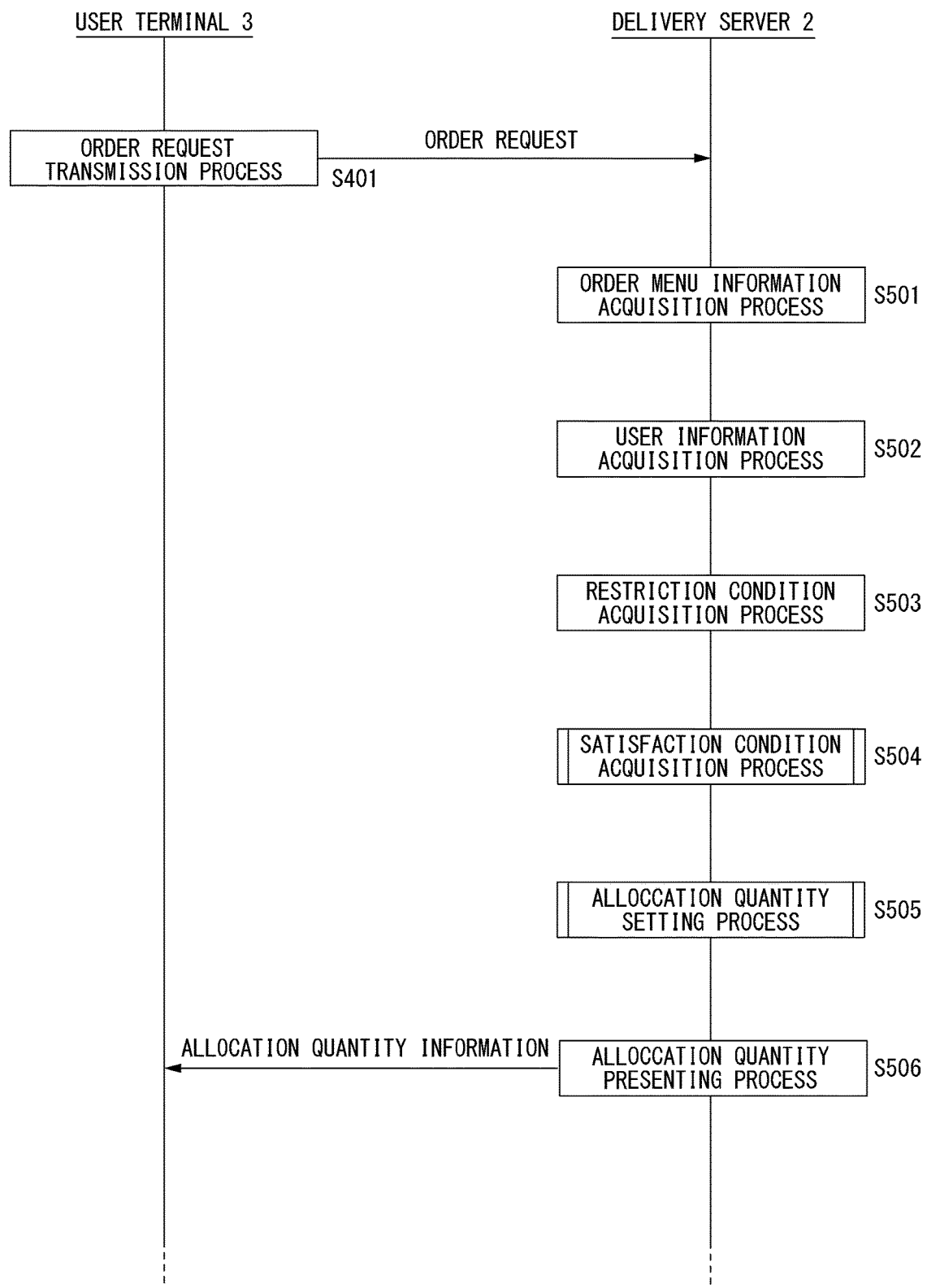
FIG. 26 is a view illustrating a general flow of a third embodiment.

However, that the allocation quantities are decided such that the restrictive condition acquired at step S503 of FIG. 26 is satisfied. Specifically, if, from between "○○ pizza" and "△△ pizza," "○○ pizza" has a higher priority degree and besides an allocation quantity of totaling 1000 kcal is set, then it is conceivable to set the allocation quantity to "○○ pizza" to 600 kcal and set the allocation quantity to "△△ pizza" to 400 kcal. However, if a restrictive condition of "salt not more than 2 g" is set together, then the allocation quantity is adjusted so as to satisfy "salt not more than 2 g." Accordingly, the allocation quantity of "○○ pizza" having a high priority degree may possibly become smaller than the allocation quantity of "△△ pizza."

Thereafter, the allocation quantity for each order menu is presented to the user by the process at step S506 of FIG. 5. Further, although the present embodiment is an example in which dishes for one serving are ordered, the allocation quantity may be smaller than the order quantity. In this case, according to the order quantity and the allocation quantity, part of the order menus becomes surplus to the user.

7-4. Second Example of Allocation Quantity Setting Process

The second example of the allocation quantity setting process (step S505 of FIG. 26) is an example in which an allocation quantity of an order menu based on a restrictive condition and an order quantity cannot be set.

Figure 30:
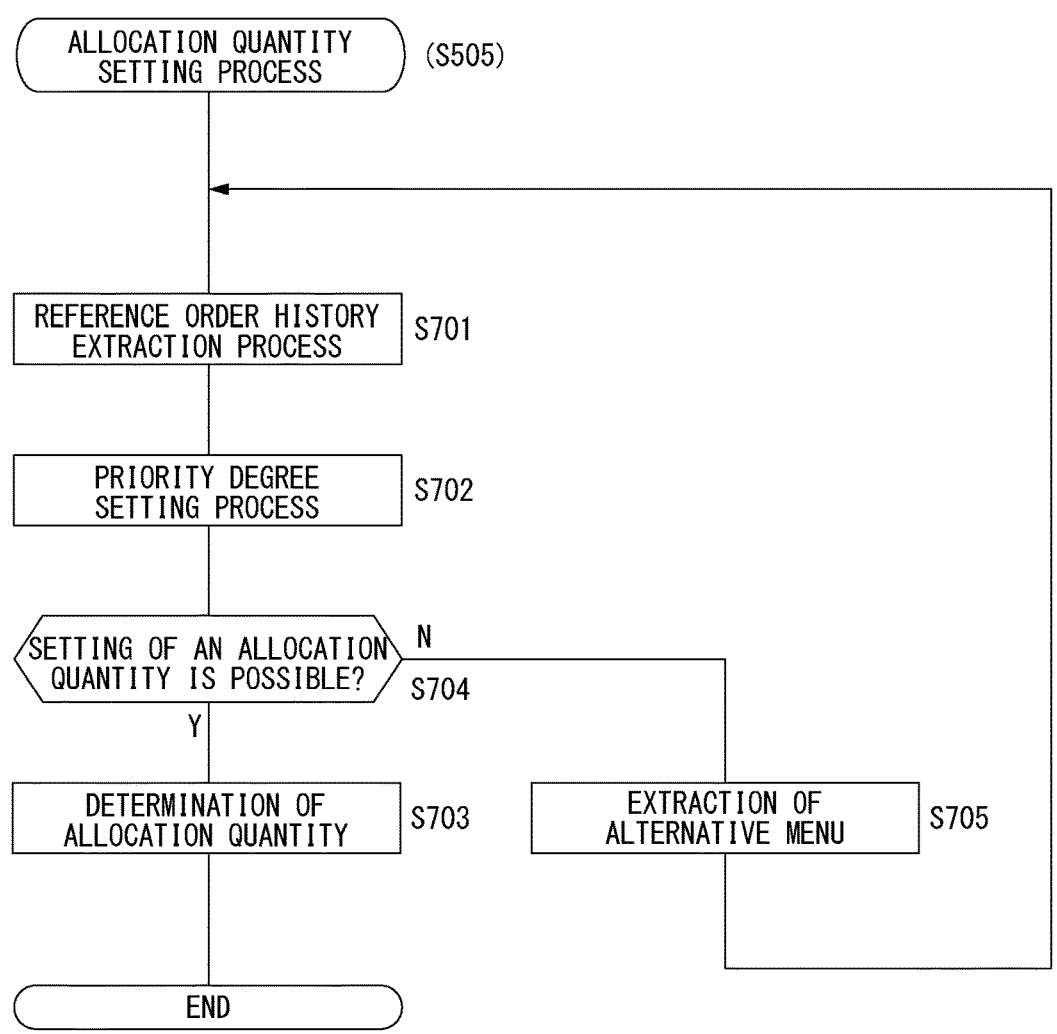
FIG. 30 is a flow chart illustrating an example of the allocation quantity setting process.

The present example is described with reference to FIG. 30 which includes several processes added to those of the first example.

At step S701, the delivery server 2 acquires an order history to be made a reference, and at step S702, the delivery server 2 sets a priority degree for each order menu, whereafter the delivery server 2 performs, at step S704, decision of whether or not setting of an allocation quantity is possible. The case in which setting of an allocation quantity is impossible, refers to a case where description is given in connection with the preceding case, a cooking category which satisfies a combination of allocation quantities having totaling 1000 kcal and besides which satisfies "salt not more than 2 g" is not available or a like case.

In such a case as described above, the delivery server 2 performs a process for extracting an alternative menu at step S705. The alternative menu is sometimes selected from among cooking menus for delivery, for example, provided by the same shop, or is sometimes selected from cooking menus in the same cooking category.

After extraction of an alternative menu, the delivery server 2 executes the processes at steps S701, S702 and S704 again.

On the other hand, if it is determined at step S704 that setting of an allocation quantity is possible, then the delivery server 2 executes a process at step S703.

Furthermore, if the menu is changed over from the cooking menu designated by the user to the alternative menu by execution of step S705, then at step S506, preferably the delivery server 2 not only presents the allocation quantity but also issues a notification that an alternative menu is extracted. Consequently, such a situation can be prevented that the user decides the order without noticing that the order menu selected by the user itself has changed to the alternative menu.

7-5. Flow of Fourth Embodiment

Figure 31:
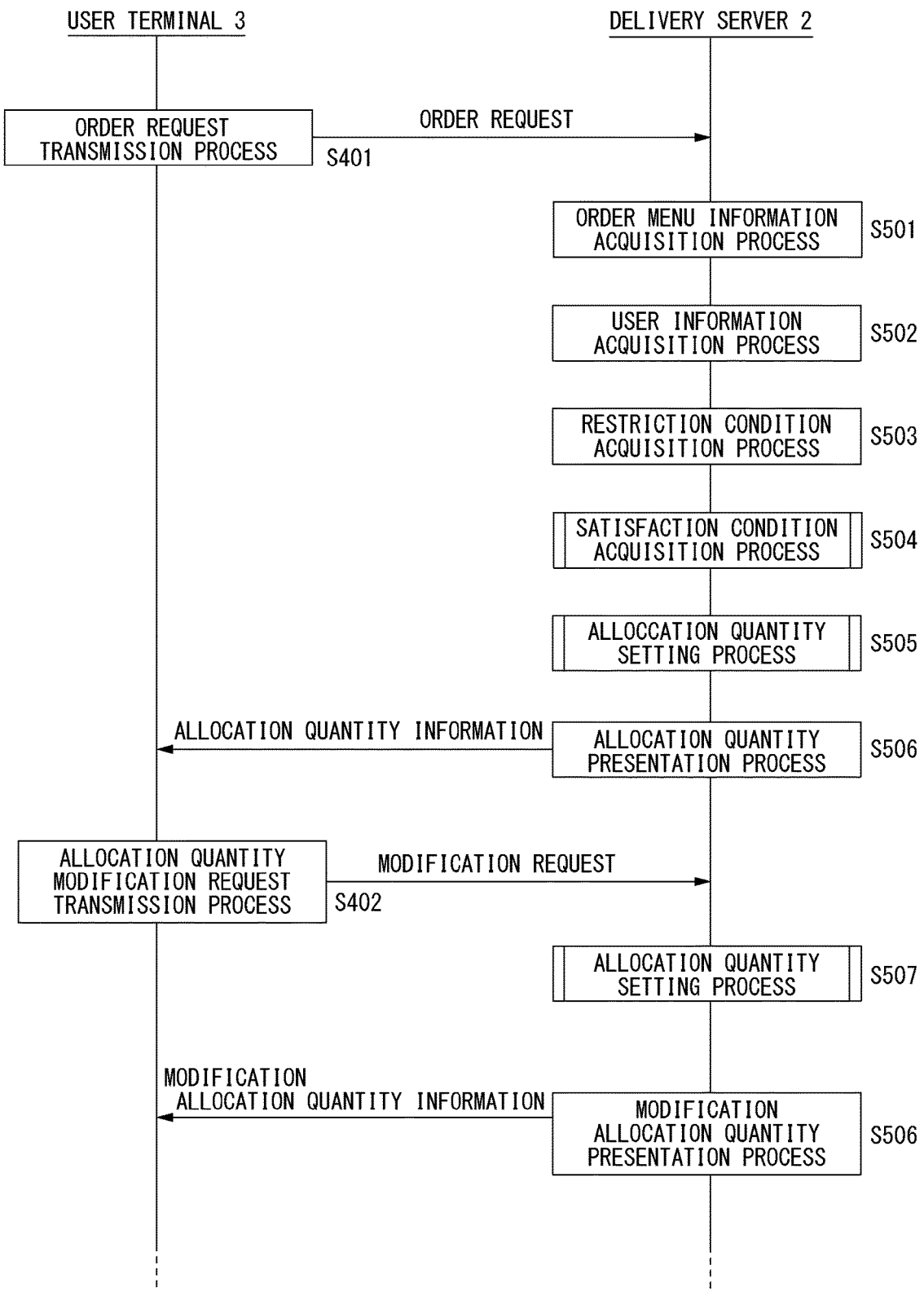
FIG. 31 is a view depicting a general flow of a fourth embodiment.

A fourth embodiment is described in connection with a case in which dishes for a plurality of servings with reference to FIG. 31. Specifically, in the description of the fourth embodiment, an example in which a modification request to a presented allocation quantity is accepted is described.

It is to be noted that a basic flow in the fourth embodiment is similar to that in the third embodiment, and therefore, particulars thereof described in the description of the third embodiment are omitted suitably.

First at step S401, the user terminal 3 transmits an order request which includes a user ID as identification information of each user involved in an order, a menu ID as identification information of each dish to be ordered and an order people number as information of a number of people who are to share the dishes to the delivery server 2. Notably, the user involved in an order includes not only a user who actually performs ordering but also users who are to share the ordered dishes.

The delivery server 2 receiving the order request executes, at step S501, a process for acquiring order menu information based on the menu IDs from the menu DB 52.

Then at step S502, the delivery server 2 executes a process for acquiring user information. The user information to be acquired here is restriction information or a browsing history of the users.

Particularly, in the description of the present example, a case is described in which the order request received at step S401 includes not only the user ID of the ordering user but also at least part of the user IDs of the other users who are to share the dishes (hereinafter referred to as other users).

Accordingly, the user information acquired at step S502 includes also restriction information or browsing histories of the other users who are to share the dishes.

At next step S503, the delivery server 2 executes a process for acquiring a restrictive condition. The restrictive condition is acquired from the restriction information described above. The restrictive condition is acquired as much as possible in regard not only to the ordering user but also to the other users who are to share the dishes.

Furthermore, the restrictive condition has an importance degree applied thereto. The importance degree is set higher as the restrictive condition requires stricter observance. For example, a high importance degree is set to a restrictive condition for preventing an allergic reaction from being cause, a restrictive condition for medical treatment, a restrictive condition based on religion and so forth. On the other hand, to a restrictive condition regarding foodstuff which is merely disliked, a low importance degree is set.

Then at step S504, the delivery server 2 executes a satisfaction condition acquisition process. The satisfaction condition to be acquired here may be a satisfaction condition of all of the ordering user and the other users (for example, that five persons desire an ordering quantity for six servings) or may be satisfaction conditions of the ordering user and the other users ("more" for a user A, "less" for a user B or the like).

Then at step S505, the delivery server 2 executes a process for setting an allocation quantity for each ordered menu on the basis of the restrictive conditions, satisfaction conditions and order quantities.

Figure 32:
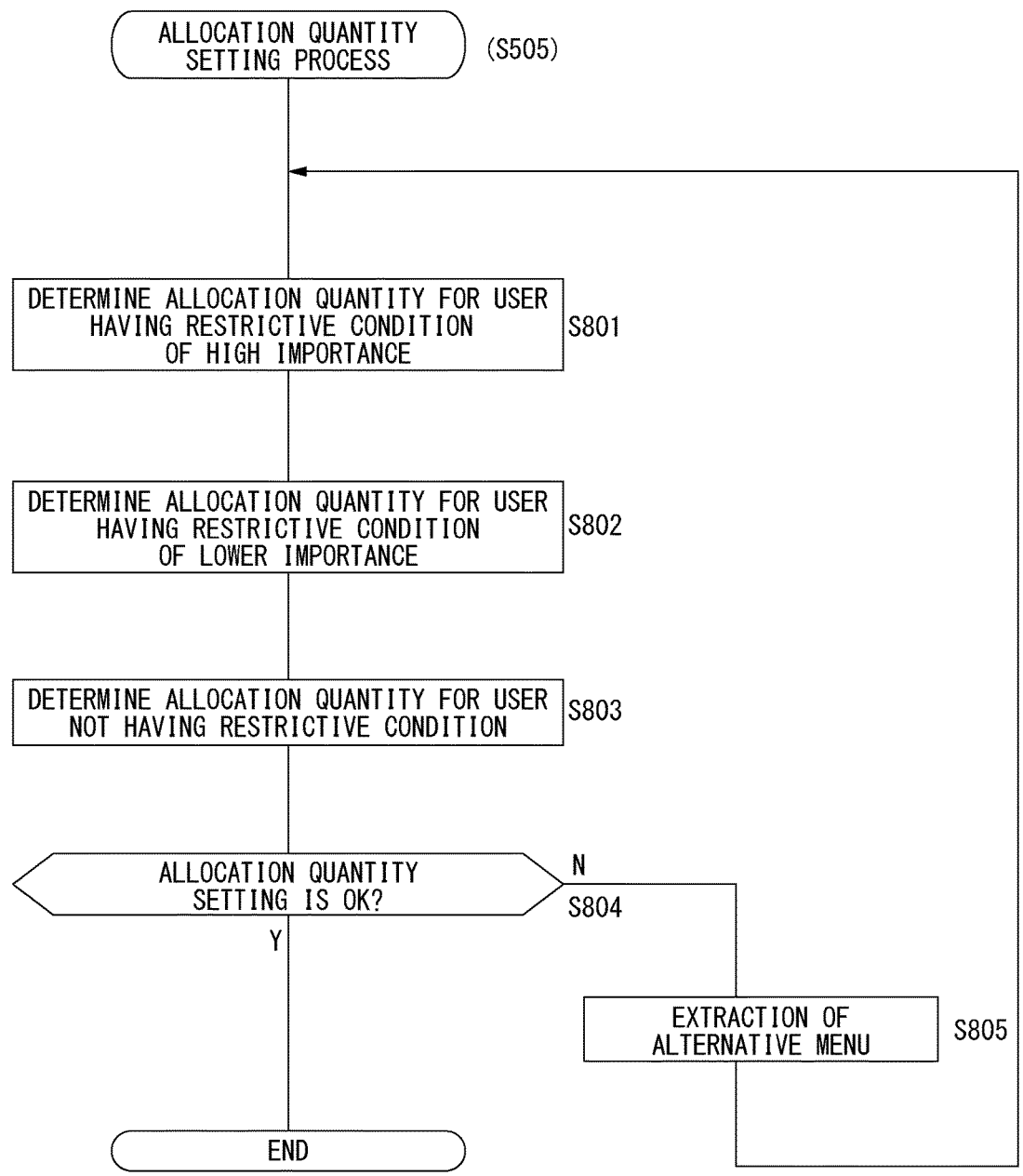
FIG. 32 is a flow chart illustrating an example of an allocation quantity setting process.

Here, an example of the allocation quantity setting process is described with reference to FIG. 32. Particularly, the description is given of an example in which the importance degree of a restrictive condition is represented by two levels.

First at step S801, the delivery server 2 executes a process for decidining an allocation quantity for a user to whom a restrictive condition of the high importance is set. That is, the delivery server 2 determines the importance degree for each of the restrictive conditions acquired at step S503 described hereinabove and decides an allocation quantity of a user who has a restrictive condition of the high importance degree (restrictive condition to which the higher importance degree from between the two levels is applied).

Then at step S802, the delivery server 2 executes a process for deciding an allocation quantity to a user to whom a restrictive condition of the lower importance is set. That is, the delivery server 2 determines the importance degree for each of the restrictive conditions acquired at step S503 described hereinabove and decides an allocation quantity to a user who has a restrictive condition of the lower importance degree (restrictive condition to which the lower importance degree from between the two levels is applied).

By the processes at step S801 and S802, an allocation quantity for each order menu to each of the users to whom a restriction is set is decided.

Then at step S803, the delivery server 2 executes a process for deciding an allocation quantity to a user who does not have a restrictive condition.

By this process, allocation quantities to all users including the ordering user and the other users (namely, all users who are to share the dishes) are decided.

Further, if setting of an allocation quantity cannot be performed (for example, the dishes do not include any dish which can be eaten by the person A), the delivery server 2 determines at next step S804 that there is a problem in allocation quantity setting, and then executes, at step S805, a process for extracting an alternative menu. The process at step S805 is same as the process at step S705 of FIG. 30.

The description is given with reference back to FIG. 31.

At step S506, the delivery server 2 ending the allocation quantity setting process performs an allocation quantity presentation process. By this process, the allocation quantity information for each order menu is transmitted to the user terminal 3, and the information is displayed on the user terminal 3.

It is to be noted that the presentation of the allocation quantities may be performed only to the ordering user or may be performed to the other users in addition to the ordering user.

An example of an allocation quantity presentation page on which allocation quantities are displayed is described.

The allocation quantity presentation page may be a page on which only allocation quantity information is described for each user, for example, as depicted in FIG. 27 described hereinabove.

Figure 33:
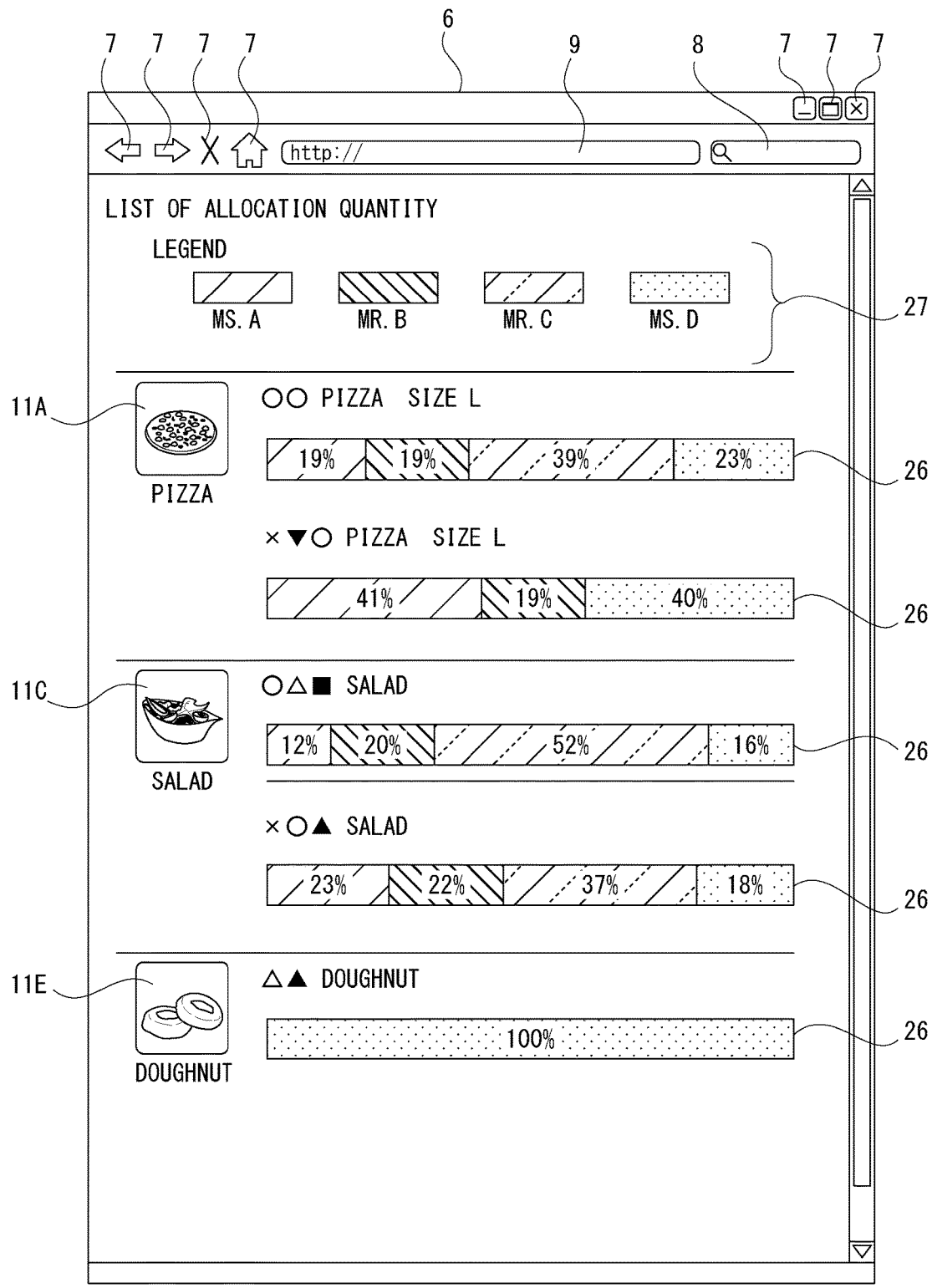
FIG. 33 is a view depicting an example of an allocation quantity presentation page.

The allocation quantity presentation page may also be configured including allocation information of the other users as depicted in FIG. 33.

The allocation quantity presentation page depicted in FIG. 33 presents allocation quantity information for five order menus. For the allocation quantity displaying icon 26 indicative of allocation quantity information, a circular graph may be used as depicted in FIG. 27, a 100-% stacked chart may be used as depicted in FIG. 33, or some other display form may be used.

Further, legend information 27 is displayed above the allocation quantity information. Since the legend information 27 is displayed, the allocation quantity for each user can be recognized easily. Further, in place of display of the legend information 27, a user name may be indicated additionally for each allocation quantity.

On the allocation quantity presentation page, a menu consumed only by part of the users like "x▼○ pizza size L" (in FIG. 33, the allocation quantity to the user C is 0%), a menu consumed only by one user like "Δ▲ doughnut" (in FIG. 33, the allocation amount to the user D is 100%), or the like is displayed.

The user receiving the allocation quantity information may finally confirm the order as it is on the basis of the presented allocation quantity or may perform an operation for modifying the allocation quantity and issue a modification request. Here, an example in which a modification request is issued is described. Further, if presentation of allocation quantity information is performed to the ordering user and the other users, each of the users can issue a modification request. Where each user issues a modification request, preferably the user issues a modification request for an allocation quantity to the user itself (namely, no user issues a modification request for an allocation quantity to the other users).

A user who is to issue a modification request would perform an operation for modifying the allocation quantity on the user terminal 3. This operation may be, for example, an operation for changing the ratio of a circular graph by which a presented allocation quantity for each order menu is indicated, an operation for changing the display size of an icon indicative of an allocation quantity, an operation for inputting a numerical value (for example, increase by 200 g or 30%) or a like operation.

In response to such an operation as described above, the user terminal 3 performs a process for transmitting an allocation quantity modification request at step S402.

The delivery server 2 receiving the allocation quantity modification request executes an allocation quantity modification process at step S507.

Figure 34:
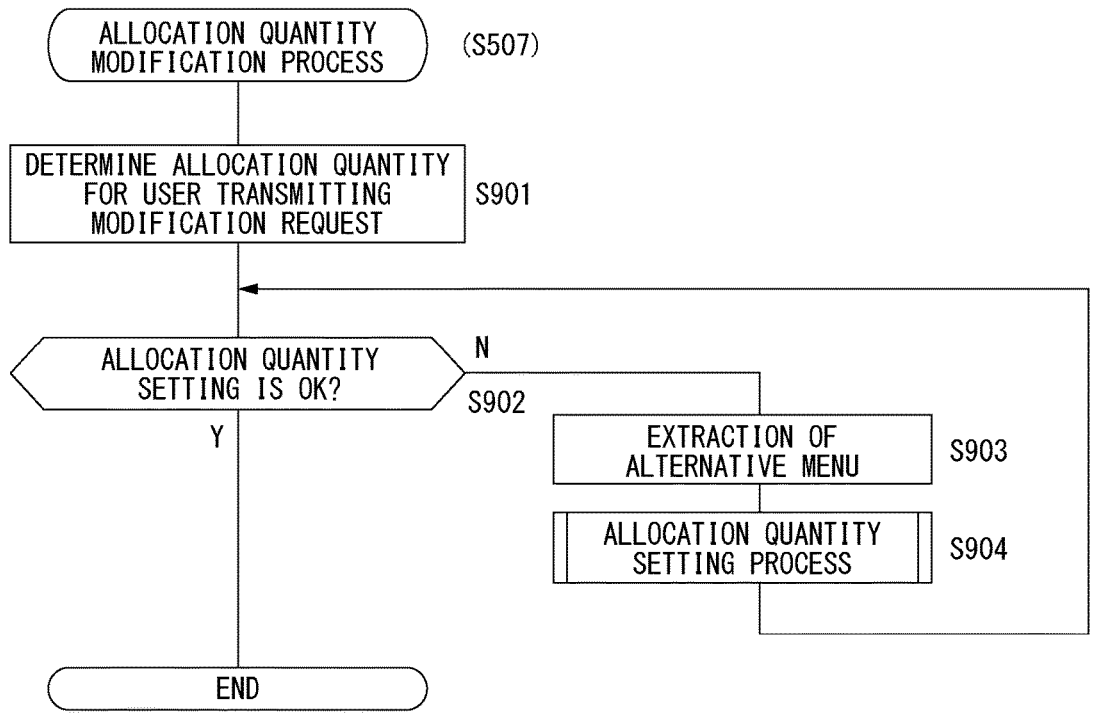
FIG. 34 is a flow chart illustrating an example of an allocation quantity modification process.

An example of the allocation quantity modification process is described with reference to FIG. 34.

First at step S901, the delivery server 2 executes a process for deciding an allocation quantity to the user (target user) from which the modification request is received. At this time, for example, in the case of a process for increasing the allocation quantity of the target user, the allocation quantity to a user different from the target user is decreased instead. On the other hand, in the process of decreasing the allocation quantity to the target user, the allocation quantity to a user different from the target user is increased instead.

Then at step S902, the delivery server 2 executes a process for determining whether or not the allocation quantity setting has some problem. If the allocation quantity setting has no problem, then the allocation quantity modification process is ended.

On the other hand, if it is determined that the allocation quantity has some problem (where the allocation quantity to someone is extremely small or in a like case), the delivery server 2 executes a process for extracting an alternative menu at step S903. This process is same as the process at step S705 of FIG. 30. Then at step S904, the delivery server 2 executes an allocation quantity setting process. In this process, since the order menu has been changed, the allocation quantity setting process illustrated in FIG. 32 is executed again.

After the alternative menu extraction process, the delivery server 2 executes the process at step S902 again.

Description is given now with reference back to FIG. 31.

The delivery server 2 executing the allocation modification process executes a modification allocation quantity presentation process at step S506. By this process, the modification allocation quantity information for each order menu is transmitted to the user terminal 3, and the information is displayed on the user terminal 3.

Further, this presentation of the modification allocation quantity may be performed only to the ordering user and the user from whom the modification request has been issued or to all users including the other users.

The example described in connection with the fourth embodiment corresponds to a case where it is desired to decide, in advance, dishes to be prepared in a meeting of several persons scheduled a few days later, or the like. With the present example, the allocation quantity for each order menu allocated to each user can be grasped, and further, a modification request to the allocation quantity can be issued. Therefore, such a situation can be prevented that some dishes become short (or become surplus) at the day of the meeting.

7-6. Different Example of Allocation Quantity Modification Process

A different example of the allocation quantity modification process is described with reference to FIG. 35.

In the different example of the allocation quantity modification process, when an allocation quantity modification request from a user is not acceptable, a compromise allocation quantity approximated as far as possible to the allocation quantity modification request is set.

In particular, the delivery server 2 receiving an allocation quantity modification request decides, at step S901, an allocation quantity to a user for which the modification request is received (simultaneously performs adjustment of the allocation quantities of the other users). Then at next step S902, the delivery server 2 executes a process for deciding whether or not there is a problem in the setting of the allocation quantity.

Figure 35:
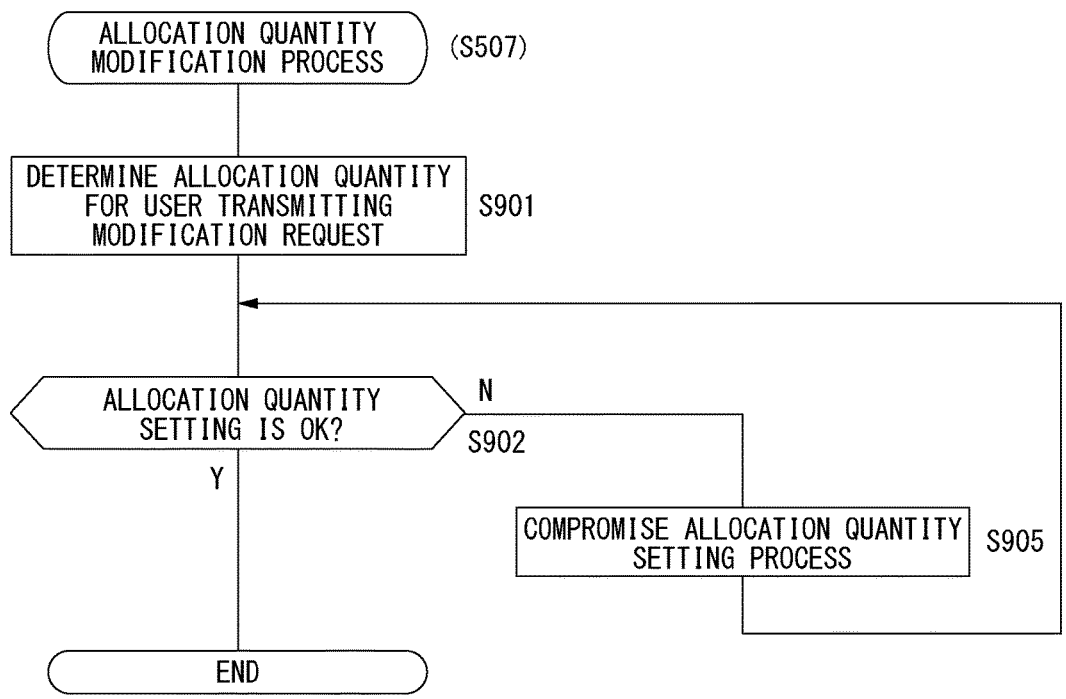
FIG. 35 is a flow chart illustrating another example of the allocation quantity modification process.

If it is determined at step S902 that there is no problem, then the delivery server 2 ends the allocation quantity modification process of FIG. 35.

On the other hand, if it is determined that there is a problem, then the delivery server 2 executes a process for setting a compromise allocation quantity at step S905.

Further, in the compromise allocation quantity setting process, preferably the compromise degree is decided in response to the importance degree of a restrictive condition as described hereinabove in connection with step S505 of FIG. 31 described above. In particular, the compromise allocation quantity is set such that such a restrictive condition of a high importance degree as is set for health reasons is satisfied without fail. Further, in this case, it may be prioritized to achieve a restrictive condition by achieving a modification condition designated from the user.

Here, a particular example in which a modification request for an allocation quantity is not acceptable is described.

For example, a case is considered in which four users A, B, C and D issue a modification request for an order menu X. If the user A requests to increase the allocation quantity of the order menu X by 200 g, the user B requests to increase the allocation quantity of the order menu X by 50 g, the user C requests to decrease the allocation quantity of the order menu X by 50 g and the user D requests to decrease the allocation quantity of the order menu X by 50 g, then the increasing amount of the total allocation quantity is 250 g while the decreasing amount of the total allocation quantity is 100 g. Therefore, increase of the entire order menu X by 150 g is requested. At this time, if the order quantity of the order menu X scheduled originally is exceeded by the increase by 150 g, it is determined that the modification request is not acceptable.

Meanwhile, the delivery server 2 determines the modification request is acceptable if the allocation quantity of respective users has been set with a margin of 200 g. Also, the delivery server 2 determines that a modification request is acceptable when decrease in quantity is requested by the modification request.

Further, an example of the compromise allocation quantity is described. Here, a case is described in which a restrictive condition is not set for each user.

Assume that the user A requests increase by 200 g, the user B requests increase by 50 g, the user C requests decrease by 50 g and the user D requests decrease by 50 g as the allocation quantity of the order menu X. Then, the decreasing amount of 100 g requested by the users C and D is distributed to the users A and B.

At this time, the allocation quantities for the user A and the user B may be increased equally by 50 g or may be set at a ratio of the increasing amounts desired by the user A and the user B (in particular, at the ratio of 4:1 because the user A requests increase by 200 g and the user B requests increase by 50 g) (namely, an increase by 80 g for the user A and an increase by 20 g for the user B are accepted).

8. Summary of Third and Fourth Embodiments

The process examples described hereinabove can be applied suitably in the first, second, third and fourth examples.

The delivery system 1 which includes the delivery server 2 and the user terminal 3 includes the order request acquisition unit 1h configured to acquire an order request including a menu ID of an order menu, order quantity information and a user ID of a user involved in an order, the order product information acquisition unit 1i configured to acquire order menu information of the order menu on the basis of the menu ID of the order menu from the menu DB 52, the user information acquisition unit 1j configured to acquire user information including a first condition as a restrictive condition of the user involved in the order request and a second condition as a demand condition of the user, the allocation quantity setting unit 1k configured to set an allocation quantity of the order menu on the basis of the first condition and the second condition, and the presentation unit 1g configured to cause the user terminal 3 to present the set allocation quantity of the order menu.

Consequently, when there is some restriction when the user selects a product, order quantities of a plurality of products for satisfying the restriction and the allocation quantity to the user from among the order quantities are presented.

Accordingly, in order to satisfy the restriction, by which quantity a product is to be ordered and which allocation quantity is to be allocated to the user itself from within the quantity to be ordered can be grasped by the user before the product is ordered.

As descried hereinabove in connection with the example of the satisfaction condition acquisition process, the delivery system 1 further includes the condition estimation unit 1m configured to acquire an order request in the past on the basis of the user ID of the user involved in the order from the user DB 50 in which the order history is stored and estimate the second condition on the basis of comparison between the acquired order request in the past and the order request of the current order, and the user information acquisition unit 1j acquires the estimated second condition.

Consequently, the second condition is estimated without intervention of an input of the second condition by the user.

Accordingly, the labor for inputting by the user can be omitted.

As described hereinabove in connection with the first example of the allocation quantity setting process, the allocation quantity setting unit 1k sets the allocation quantity on the basis of priority degree information set for each order menu such that the allocation quantity of an order menu having a relatively high priority degree is greater than the allocation quantity of a different order menu.

For example, where an order menu is to be shared by a plurality of people, a greater allocation quantity is distributed to a user having a high priority degree for the order menu. Further, where a plurality of order menus are to be allocated in a mixed manner by a fixed amount to a single user, a greater allocation quantity is distributed from an order menu having a higher priority degree for the user.

In particular, since an appropriate allocation quantity based on a priority degree obtained from taste information or the like of a user, appropriate distribution of an order menu in accordance with a situation for each user can be performed.

As described hereinabove in connection with the fourth embodiment, when a plurality of order menus are to be allocated to a plurality of users, the allocation quantity setting unit 1k performs setting of an allocation quantity preferentially to a user who has a first condition having a high importance degree.

Where an important restrictive condition and a less important restrictive condition are available, the setting can be performed beginning with the setting of an allocation quantity using the important restrictive condition.

Consequently, even where restrictive conditions of various importance degrees are set, setting of an appropriate allocation quantity can be performed.

As described hereinabove in connection with the allocation quantity modification process of FIG. 34, the delivery system 1 further includes the modification condition acquisition unit 1n configured to acquire a modification condition for modifying an allocation quantity of an order menu, and the allocation quantity setting unit 1k modifies the allocation quantity of the order menu on the basis of the modification condition.

Consequently, an allocation quantity after modification on which requests of individual persons are reflected can be set without changing the order menu.

Accordingly, an allocation quantity on which situations of individual persons are suitably reflected can be set.

As described hereinabove in connection with the allocation quantity modification process of FIG. 34, when the allocation quantity setting unit 1k determines that setting of an allocation quantity of an order menu which satisfies all of the first condition and the second condition is impossible, the presentation unit 1g presents an alternative product which substitutes for the order menu.

An alternative product is presented on the basis of various conditions designated by the user.

Consequently, the operation burden when the user selects an order menu again can be reduced.

As described hereinabove in connection with the different example of the allocation quantity modification process, when the allocation quantity setting unit 1k determines that setting of an allocation quantity of an order menu which satisfies all of the first condition, the second condition, and a modification condition is impossible, the allocation quantity setting unit 1k sets a modification allocation quantity of an order menu which preferentially satisfies the first condition and the second condition but does not satisfy at least part of the modification condition.

Consequently, an allocation quantity is set such that the allocation quantity preferentially satisfies the first condition and the second condition, and satisfies various conditions as far as possible.

Accordingly, setting of an appropriate allocation quantity can be performed without changing the order menu designated by the user.

9. Program

A program in the first embodiment and the second embodiment is a program for causing an arithmetic processing device (CPU or the like) provided in the delivery system 1 to execute the processes in the first embodiment and the second embodiment.

This program causes the arithmetic processing device to execute a delivery destination area information acquisition procedure for acquiring delivery destination area information.

Further, the program causes the arithmetic processing device to execute an order people number information acquisition procedure for acquiring order people number information.

Further, the program causes the arithmetic processing device to execute an object presentation procedure for presenting an object corresponding to respective product categories of a plurality of product categories on a terminal device.

Furthermore, the program causes the arithmetic processing device to execute a placement region setting procedure for setting a placement region for placing an object therein on a display unit of a terminal device.

In addition, the program causes the arithmetic processing unit to execute an object placement mode changing procedure for accepting a setting operation for an object placed in the placement region and making a change in the placement mode of the object.

Then, the program causes the arithmetic processing device to execute an order quantity specification procedure for specifying an order quantity for each product category in response to a ratio of an object occupying the placement region and the order people number information.

Further, the program causes the arithmetic processing device to execute a presentation procedure for acquiring a product corresponding to the specified order quantity and the delivery area information from a database and presenting the product on the terminal device.

In short, the program is a program for causing the arithmetic processing device to execute the processes described hereinabove with reference to FIG. 8, FIG. 13 and FIG. 19.

By such a program as described above, the delivery system 1 in the first embodiment and the second embodiment can be implemented.

Such a program as described above can be stored in advance in an HDD as a storage media built in a device such as a computer device, a ROM in a microcomputer having a CPU and so forth. The program can also be stored (recorded) temporarily or permanently in a removable storage media such as a semiconductor memory, a memory card, an optical disk, a magneto-optical disk or a magnetic disk. Such a removable storage media can be provided as so-called package software.

Further, such a program as described above can be installed from a removable storage media into a personal computer or the like and can also be downloaded from a download site through a network such as a LAN or the Internet.

A program in the third embodiment and the fourth embodiment is a program for causing an arithmetic processing unit (CPU or the like) provided in the delivery system 1 to execute the processes in the third embodiment and the fourth embodiment.

This program causes the arithmetic processing device to execute an order request acquisition procedure for acquiring an order request including product identification information for identifying an order product, order quantity information indicative of an order quantity of the order product and user identification information for identifying a user involved in an order of the product.

Further, the program causes the arithmetic processing device to execute an order product information acquisition procedure for acquiring product information of the order product on the basis of product identification information of the order product from a product information database in which product information is stored.

Further, the program causes the arithmetic processing device to execute a user information acquisition procedure for acquiring user information including a first condition as a restrictive condition of the user involved in an order request and a second condition as a demand condition of the user.

Furthermore, the program causes the arithmetic processing device to execute an allocation quantity setting procedure for setting an allocation quantity of the order product on the basis of the first condition and the second condition.

In addition, the program causes the arithmetic processing device to execute a presentation procedure for causing a terminal device to present the set allocation quantity of the order product.

In short, the program is a program for causing the arithmetic processing device to execute the various processes described hereinabove with reference to FIG. 19, FIG. 26 and FIG. 35.

The delivery system 1 according to the third embodiment and the fourth embodiment can be implemented by such a program as described above.

Such a program as described above can be stored in advance in an HDD as a storage media built in a device such as a computer device, a ROM in a microcomputer having a CPU and so forth. The program can also be stored temporarily or permanently in a removable storage media such as a semiconductor memory, a memory card, an optical disk, a magneto-optical disk or a magnetic disk. Such a removable storage media can be provided as package software.

Further, such a program as described above can be installed from a removable storage media into a personal computer or the like and can also be downloaded from a download site through a network such as a LAN or the Internet.

REFERENCE SIGNS LIST

1 Delivery system, 1a Object presentation unit, 1b Placement region setting unit, 1c Object placement mode changing unit, 1d Delivery destination area information acquisition unit, 1e Order people number information acquisition unit, 1f Order quantity specification unit, 1g Presentation unit, 1h Order request acquisition unit, 1i Order product information acquisition unit, 1j User information acquisition unit, 1k Allocation quantity setting unit, 1m Condition estimation unit, 2 Delivery server, 2a Webpage data generation unit, 2b Webpage data transmission unit, 3 User terminal, 4 Shop terminal, 5 Communication network, 50 User DB, 51 Shop DB, 52 Menu DB, 53 Webpage DB

The invention claimed is:
1. An information processing system which includes a server device and a terminal device, comprising:
   an object presentation unit configured to present an object corresponding to each of a plurality of product categories on the terminal device;
   a placement region setting unit configured to set a placement region for placing the object therein on a display unit of the terminal device;
   an object placement mode changing unit configured to accept a setting operation for the object placed in the placement region and make a change in a placement mode of the object;
   a delivery destination area information acquisition unit configured to acquire delivery destination area information;
   an order people number information acquisition unit configured to acquire order people number information;
   an order quantity specification unit configured to specify an order quantity for each product category in response to a ratio of the object occupying the placement region and the order people number information; and
   a presentation unit configured to acquire a product in accordance with the specified order quantity and the delivery area information from a database and cause the terminal device to present the product.
2. The information processing system according to claim 1, wherein
   in the presentation of the object, only the object corresponding to the delivery destination area information is presented in a state where the object is capable of being a target of the setting operation.
3. The information processing system according to claim 1, wherein
   the object presentation unit identifiably presents a combination of the objects relating to a shop which is capable of delivering the objects collectively.
4. The information processing system according to claim 1, wherein
   the object placement mode changing unit performs changing of the object on the basis of an order quantity estimated using an order history of an ordering user.
5. The information processing system according to claim 4, wherein
   the object placement mode changing unit performs the changing of the object on the basis of an order quantity estimated using, from among one or more order histories, the order history in which at least part of a placement sequence of the objects is same.
6. The information processing system according to claim 4, wherein
   the object placement mode changing unit estimates, when the object is placed into the placement region, another object to be added to the placement region in response to the estimated order quantity and places the other object into the placement region.
7. The information processing system according to claim 4, wherein
   the object placement mode changing unit changes, when a setting operation for changing the placement mode of one of the plurality of objects placed in the placement region is accepted, the placement mode of the remaining objects in response to the estimated order quantity.
8. The information processing system according to claim 1, wherein
   the object placement mode changing unit accepts, as a setting operation for setting both of an upper limit value and a lower limit value to a ratio of the object occupying the placement region, an operation for placing the same objects on one another in an overlapping relationship with each other in the placement region.
9. The information processing system according to claim 1, wherein
   the object placement mode changing unit acquires range information of a ratio of the object occupying the placement region from sizes of two kinds of the object set by two contact points detected on a display screen of the terminal device and a third contact detected additionally.
10. The information processing system according to claim 1, wherein
   the order quantity specification unit calculates correction order people number information by correction of the order people number information using an order history of the ordering user and specifies the order quantity using the correction order people number information.
11. An information processing device, comprising:
   a webpage data generation unit configured to generate webpage data including a program for causing a terminal device to execute
      an object presentation process for presenting an object corresponding to each of a plurality of product categories,
      a placement region setting process for setting a placement region for placing the object therein on a display unit of a terminal device,
      an object placement mode changing process for accepting a setting operation for the object placed in the placement region and making a change in a placement mode of the object in response to information of the setting operation,
      a delivery destination area information acquisition process for acquiring delivery destination area information,
      an order people number information acquisition process for acquiring order people number information,
      an order quantity specification process for specifying an order quantity for each product category in response to a ratio of the object occupying the placement region and the order people number information, and a presentation process for causing a product in accordance with the specified order quantity and the delivery area information to be presented; and a webpage data transmission unit configured to transmit the webpage data to the terminal device.

12. An information processing method for causing an information processing system to execute:

a delivery destination area information acquisition step of acquiring delivery destination area information;

an order people number information acquisition step of acquiring order people number information;

an object presentation step of presenting an object corresponding to respective each of a plurality of product categories on a terminal device;

a placement region setting step of setting a placement region for placing the object therein on a display unit of the terminal device;

an object placement mode changing step of accepting a setting operation for the object placed in the placement region and making a change to a placement mode of the object;

an order quantity specification step of specifying an order quantity for each product category in response to a ratio of the object occupying the placement region and the order people number information; and a presentation step of acquiring an product in accordance with the specified order quantity and the delivery area information from a database and causing the terminal device to present the product.

* * * * *